(12) United States Patent
Kawazuishi et al.

(10) Patent No.: US 10,807,036 B2
(45) Date of Patent: Oct. 20, 2020

(54) METHOD FOR SEPARATING CARBON DIOXIDE

(71) Applicant: MITSUBISHI CHEMICAL CORPORATION, Chiyoda-ku, Tokyo (JP)

(72) Inventors: Kenichi Kawazuishi, Yokohama (JP); Masayuki Iwamura, Yokohama (JP)

(73) Assignee: MITSUBISHI CHEMICAL CORPORATION, Chiyoda-Ku, Tokyo (JP)

(*) Notice: Subject to any disclaimer, the term of this patent is extended or adjusted under 35 U.S.C. 154(b) by 122 days.

(21) Appl. No.: 15/966,441

(22) Filed: Apr. 30, 2018

(65) Prior Publication Data

US 2018/0272275 A1 Sep. 27, 2018

Related U.S. Application Data

(63) Continuation of application No. PCT/JP2016/081454, filed on Oct. 24, 2016.

(30) Foreign Application Priority Data

Oct. 29, 2015 (JP) .................................. 2015-213281

(51) Int. Cl.
*B01D 53/22* (2006.01)
*C10L 3/10* (2006.01)
(Continued)

(52) U.S. Cl.
CPC ....... *B01D 53/229* (2013.01); *B01D 53/1475* (2013.01); *C10L 3/10* (2013.01);
(Continued)

(58) Field of Classification Search
CPC .............. B01D 53/1475; B01D 53/228; B01D 53/229; B01D 71/02; B01D 71/028; B01D 2257/504; C10L 3/104
See application file for complete search history.

(56) References Cited

U.S. PATENT DOCUMENTS

2008/0011161 A1* 1/2008 Finkenrath ......... B01D 53/1475
96/4
2010/0116130 A1* 5/2010 Carreon ................. B01D 53/22
95/45
(Continued)

FOREIGN PATENT DOCUMENTS

JP 2008-260739 * 10/2008 ............. B01D 71/02
JP 2008260739 A 10/2008
(Continued)

OTHER PUBLICATIONS

English language machine translation of JP 2008-260739. Retrieved from http://translationportal.epo.org on Oct. 7, 2019. (Year: 2019).*
(Continued)

*Primary Examiner* — Jason M Greene
(74) *Attorney, Agent, or Firm* — Cantor Colburn LLP

(57) ABSTRACT

According to the present invention, in separating carbon dioxide by a membrane separation with a separation membrane system using an inorganic separation membrane from a mixed gas containing methane and carbon dioxide, and then by an acid gas removal process using an absorbent, by specifying the suitable range of the carbon dioxide mole fraction at the outlet on the carbon dioxide non-permeation side $X_{CO2}$ in the membrane separation, which corresponds to an ideal separation factor of the inorganic separation membrane, the proper distribution conditions become feasible. As a result, a method for separating carbon dioxide in which the decrease of the production amount by methane permeation in the membrane separation and the energy loss accompa-
(Continued)

nying the decrease are suppressed, and further the energy consumption in an acid gas removal process using an absorbent, which is a post-process, can be suppressed, is provided.

2 Claims, 100 Drawing Sheets

(51) Int. Cl.
    *B01D 53/14*     (2006.01)
    *B01D 71/02*     (2006.01)
    *B01D 69/02*     (2006.01)

(52) U.S. Cl.
    CPC ............ *C10L 3/104* (2013.01); *B01D 53/228* (2013.01); *B01D 69/02* (2013.01); *B01D 71/02* (2013.01); *B01D 2256/245* (2013.01); *B01D 2325/20* (2013.01); *C10L 2290/548* (2013.01); *Y02C 10/06* (2013.01); *Y02C 10/10* (2013.01)

(56) References Cited

U.S. PATENT DOCUMENTS

| | | | | |
|---|---|---|---|---|
| 2011/0290110 A1* | 12/2011 | Zhou | ................. | B01D 53/1475 95/45 |
| 2012/0111192 A1* | 5/2012 | Nazarko | ............ | B01D 53/1475 95/51 |
| 2014/0144321 A1* | 5/2014 | Sawamura | ............ | B01D 53/22 96/4 |
| 2014/0360938 A1* | 12/2014 | Hayashi | ............... | B01D 71/028 210/638 |
| 2015/0190748 A1* | 7/2015 | Liu | ....................... | B01D 53/229 95/51 |
| 2018/0363978 A1* | 12/2018 | Ballaguet | ............. | B01D 53/229 |

FOREIGN PATENT DOCUMENTS

| | | |
|---|---|---|
| JP | 2012066242 A | 4/2012 |
| JP | 2012149002 A | 8/2012 |
| JP | 2012236134 A | 12/2012 |
| JP | 2012236181 A | 12/2012 |

OTHER PUBLICATIONS

International Preliminary Report on Patentability and Written Opinion of the International Searching Authority corresponding to Application No. PCT/JP2016/081454; dated May 1, 2018.

International Search Report corresponding to Application No. PCT/JP2016/081454; dated Dec. 6, 2016.

Republic of Indonesia Office Action for corresponding Application. No. PID201803622; dated Jul. 2, 2020.

* cited by examiner

| | (1) | (2) | (3) | (4) | (5) |
|---|---|---|---|---|---|
| A | - | - | - | - | - |
| B | - | - | - | - | - |
| C | 110% | 102% | 100% | - | - |
| D | 110% | 105% | 100% | - | - |
| E | 110% | 107% | 100% | - | - |
| F | 110% | 104% | 100% | 101% | - |
| G | 110% | 104% | 100% | 104% | - |

$P_X$: CARBON DIOXIDE NON-PERMEATION SIDE PRESSURE [MPaA]   2.10
$P_Y$: CARBON DIOXIDE PERMEATION SIDE PRESSURE [MPaA]   0.15
$X_{1\_CO2}$: AGR OUTLET $CO_2$ MOLE FRACTION [–]   0.03

($X_{0\_CO2}$: SUPPLY GAS CARBON DIOXIDE MOLE FRACTION 0.20 [–])

(ENERGY RELATIVE VALUE REQUIRED FOR CARBON DIOXIDE RECOVERY IN EACH PLOT)

|   | (1) | (2) | (3) | (4) | (5) |
|---|-----|-----|-----|-----|-----|
| A | 110% | 106% | 100% | 103% | – |
| B | 110% | 104% | 100% | 106% | 110% |
| C | 110% | 104% | 100% | 104% | 110% |
| D | 110% | 103% | 100% | 105% | 110% |
| E | 110% | 104% | 100% | 104% | 110% |
| F | 110% | 103% | 100% | 105% | 110% |
| G | 110% | 103% | 100% | 104% | 110% |

$P_X$: CARBON DIOXIDE NON-PERMEATION SIDE PRESSURE [MPaA]   4.10
$P_Y$: CARBON DIOXIDE PERMEATION SIDE PRESSURE [MPaA]   0.25
$X_{1\_CO2}$: AGR OUTLET $CO_2$ MOLE FRACTION [–]   0.03

($X_{0\_CO2}$: SUPPLY GAS CARBON DIOXIDE MOLE FRACTION 0.20 [–])

(ENERGY RELATIVE VALUE REQUIRED FOR CARBON DIOXIDE RECOVERY IN EACH PLOT)

|   | (1) | (2) | (3) | (4) | (5) |
|---|---|---|---|---|---|
| A | 110% | 106% | 100% | 105% | – |
| B | 110% | 104% | 100% | 106% | 110% |
| C | 110% | 104% | 100% | 104% | 110% |
| D | 110% | 103% | 100% | 105% | 110% |
| E | 110% | 104% | 100% | 104% | 110% |
| F | 110% | 103% | 100% | 105% | 110% |
| G | 110% | 103% | 100% | 104% | 110% |

$P_X$: CARBON DIOXIDE NON-PERMEATION SIDE PRESSURE [MPaA]   4.10
$P_Y$: CARBON DIOXIDE PERMEATION SIDE PRESSURE [MPaA]   0.25
$X_{1\_CO2}$: AGR OUTLET $CO_2$ MOLE FRACTION [–]   0.03

($X_{0\_CO2}$: SUPPLY GAS CARBON DIOXIDE MOLE FRACTION 0.60 [–])

(ENERGY RELATIVE VALUE REQUIRED FOR CARBON DIOXIDE RECOVERY IN EACH PLOT)

|   | (1)  | (2)  | (3)  | (4)  | (5)  |
|---|------|------|------|------|------|
| A | 110% | 102% | 100% | 103% | 110% |
| B | 110% | 102% | 100% | 103% | 110% |
| C | 110% | 102% | 100% | 102% | 110% |
| D | 110% | 102% | 100% | 103% | 110% |
| E | 110% | 102% | 100% | 102% | 110% |
| F | 110% | 102% | 100% | 103% | 110% |
| G | 110% | 102% | 100% | 103% | 110% |

$P_X$: CARBON DIOXIDE NON-PERMEATION SIDE PRESSURE [MPaA]   6.10
$P_Y$: CARBON DIOXIDE PERMEATION SIDE PRESSURE [MPaA]   0.20
$X_{1\_CO2}$: AGR OUTLET $CO_2$ MOLE FRACTION [-]   0.03

($X_{0\_CO2}$: SUPPLY GAS CARBON DIOXIDE MOLE FRACTION 0.40 [-])

(ENERGY RELATIVE VALUE REQUIRED FOR CARBON DIOXIDE RECOVERY IN EACH PLOT)

|   | (1) | (2) | (3) | (4) | (5) |
|---|---|---|---|---|---|
| A | 110% | 104% | 100% | 103% | 110% |
| B | 110% | 103% | 100% | 104% | 110% |
| C | 110% | 103% | 100% | 103% | 110% |
| D | 110% | 102% | 100% | 103% | 110% |
| E | 110% | 103% | 100% | 103% | 110% |
| F | 110% | 102% | 100% | 104% | 110% |
| G | 110% | 103% | 100% | 103% | 110% |

FIG. 101

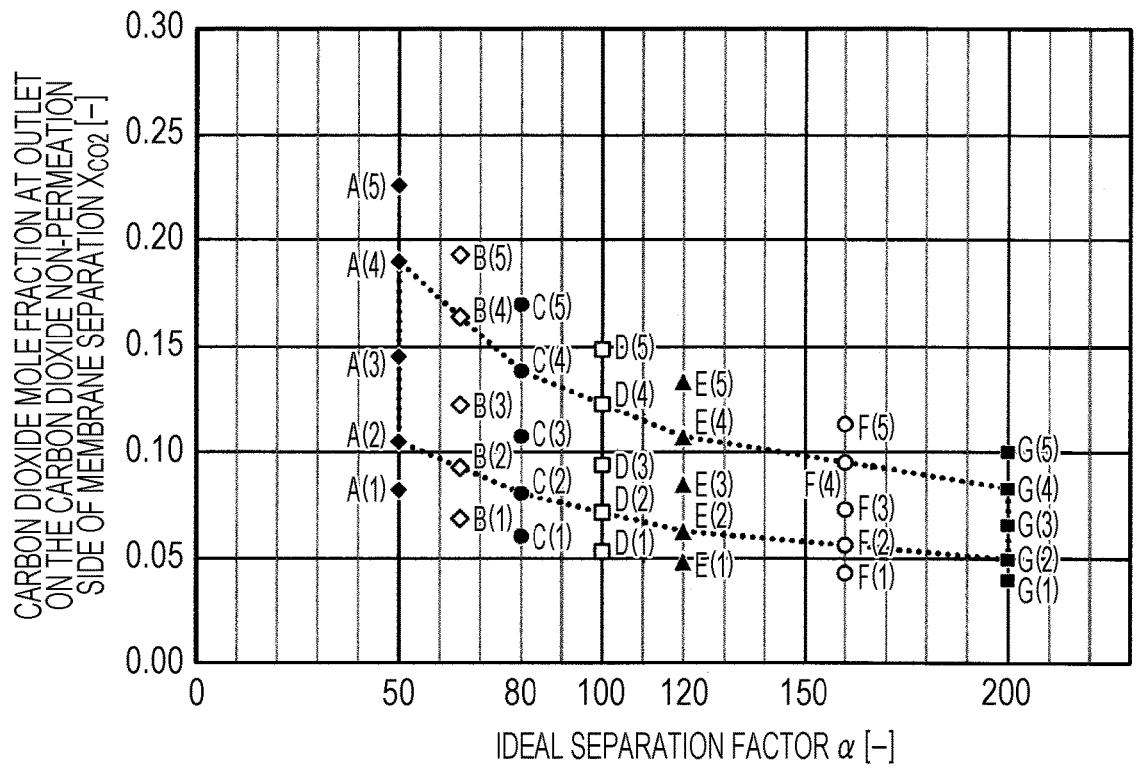

$P_X$: CARBON DIOXIDE NON-PERMEATION SIDE PRESSURE [MPaA]   6.10
$P_Y$: CARBON DIOXIDE PERMEATION SIDE PRESSURE [MPaA]   0.25
$X_{1\_CO2}$: AGR OUTLET $CO_2$ MOLE FRACTION [-]   0.03

($X_{0\_CO2}$: SUPPLY GAS CARBON DIOXIDE MOLE FRACTION 0.40 [-])

Y-axis: CARBON DIOXIDE MOLE FRACTION AT OUTLET ON THE CARBON DIOXIDE NON-PERMEATION SIDE OF MEMBRANE SEPARATION $X_{CO2}$ [-]

X-axis: IDEAL SEPARATION FACTOR $\alpha$ [-]

(ENERGY RELATIVE VALUE REQUIRED FOR CARBON DIOXIDE RECOVERY IN EACH PLOT)

|   | (1) | (2) | (3) | (4) | (5) |
|---|---|---|---|---|---|
| A | 110% | 103% | 100% | 103% | 110% |
| B | 110% | 102% | 100% | 104% | 110% |
| C | 110% | 103% | 100% | 103% | 110% |
| D | 110% | 102% | 100% | 103% | 110% |
| E | 110% | 103% | 100% | 103% | 110% |
| F | 110% | 102% | 100% | 104% | 110% |
| G | 110% | 103% | 100% | 103% | 110% |

US 10,807,036 B2

METHOD FOR SEPARATING CARBON DIOXIDE

CROSS REFERENCE TO RELATED APPLICATIONS

This application is a continuation under 35 U.S.C. § 120 of PCT/JP2016/081454, filed Oct. 24, 2016, which is incorporated herein reference and which claimed priority to Japanese Application No. 2015-213281, filed Oct. 29, 2015. The present application likewise claims priority under 35 U.S.C. § 119 to Japanese Application No. 2015-213281, filed Oct. 29, 2015, the entire content of which is also incorporated herein by reference.

BACKGROUND OF THE INVENTION

1. Field of the Invention

The present invention relates to a method for separating carbon dioxide. More specifically, the present invention relates to a method for separating carbon dioxide, which is performed with a combination of a membrane separation using an inorganic separation membrane and an acid gas removal process using an absorbent.

2. Description of the Related Art

The separation of the carbon dioxide ($CO_2$) contained in a natural gas having methane ($CH_4$) as the main component, using a membrane separation is known as a technique that can reduce energy as compared with the separation of carbon dioxide using an absorbent, which is represented by an acid gas removal (AGR) process using an existing absorbent, and the like. Further, a separation membrane made of a polymer (hereinafter, also referred to as a "polymer membrane"), which has been used as a separation membrane, has a low separation performance, and has a problem in the chemical resistance and the like, therefore, in recent years, a membrane separation (separation membrane system) using an inorganic separation membrane, which is capable of performing a continuous operation, has a high separation performance, and is excellent in the chemical resistance, has been performed. On the other hand, in a case where carbon dioxide is separated until the carbon dioxide concentration becomes low only by a separation membrane system, there has been a problem that the permeation amount of methane is increased and the production amount is decreased.

Herein, it is considered that the problem in a low concentration region in a membrane separation can be solved with a combination of a separation membrane system and a separation operation of carbon dioxide by an acid gas removal process using an absorbent, that is, carbon dioxide is separated by using a separation membrane system in a region having a high concentration of carbon dioxide, with lower energy as compared with that in the separation operation by an acid gas removal process using an absorbent, and carbon dioxide is separated by using an absorbent in a region having a low concentration of carbon dioxide. Such a method for separating carbon dioxide with a combination of a separation membrane system and an acid gas removal process using an absorbent is a suitable method of separating carbon dioxide from a mixed gas containing highly concentrated carbon dioxide until the carbon dioxide concentration becomes low, and in recent years, various techniques are provided (for example, see JP 2012-236134 A and JP 2012-236181 A).

Herein, with a combination of a separation membrane system and an acid gas removal process using an absorbent, when the processing amount of carbon dioxide by a separation membrane is extremely large at the time of separating the carbon dioxide from a natural gas (mixed gas) up to less than the predetermined desired concentration, the permeation amount of methane is also increased and the production amount of methane is decreased, and the utilizing energy from methane is decreased as compared with that in a case of not using a separation membrane. On the other hand, there has been a problem that when the processing amount of carbon dioxide by a separation membrane is extremely small, the processing amount in an acid gas removal system using an absorbent is increased, the processing amount by a membrane separation with relatively high energy saving performance is relatively decreased, therefore, the energy consumption is increased in the entire process.

With the combination of a separation membrane system and an acid gas removal process using an absorbent, it is considered that by performing both in good balance, there are proper distribution conditions under which the required energy is minimized, but in sending the processed mixed gas from a separation membrane system using an inorganic separation membrane having higher separation performance than that of the polymer membrane in a conventional technique into an acid gas removal process using an absorbent, which is a post-process, a technique of selecting carbon dioxide concentration (mole fraction of carbon dioxide $X_{CO2}$) at the outlet on the carbon dioxide non-permeation side of a separation membrane system in which proper distribution conditions can be performed has not been known.

SUMMARY OF THE INVENTION

The present invention has been made to solve the problem as described above, and is to provide a method for separating carbon dioxide in which with a combination of a membrane separation using an inorganic separation membrane and an acid gas removal process using an absorbent, the decrease of the production amount by methane permeation and the energy loss accompanying the decrease are suppressed in a membrane separation, and further the energy consumption in an acid gas removal process using an absorbent, which is a post-process, can be suppressed in separating carbon dioxide from a mixed gas containing methane and the carbon dioxide.

According to the present invention, in order to solve the above problems, there is provided a method for separating carbon dioxide, including: separating carbon dioxide from a mixed gas containing methane and the carbon dioxide, wherein in separating carbon dioxide by a membrane separation using an inorganic separation membrane that is permeated by the carbon dioxide preferentially from the mixed gas, and then by an acid gas removal process using an absorbent, a carbon dioxide mole fraction at an outlet on a carbon dioxide non-permeation side $X_{CO2}$ of the membrane separation, corresponding to an ideal separation factor α of the inorganic separation membrane in the membrane separation is expressed in the range surrounded by $a_1$, $a_2$, $a_3$, $a_4$, $a_5$, $a_6$, $a_7$, and $a_8$ in FIG. 1, (in FIG. 1, α is an ideal separation factor [–] of an inorganic separation membrane, $X_{CO2}$ is a carbon dioxide mole fraction [–] at an outlet on a carbon dioxide non-permeation side of a membrane separation using an inorganic separation membrane, and $X_{CO2}$ in FIG. 1 is expressed by the following Formula (I) with a carbon dioxide non-permeation side pressure $P_X$ [MPaA] and a carbon dioxide permeation side pressure $P_Y$ [MPaA] in the membrane separation),

[Mathematical Formula 1]

$$X_{CO2}=A \cdot P_R+B \quad (I)$$

wherein $P_R$ indicates $P_Y/P_X$, each of A and B in Formula (I) is a value shown in the following Correspondence Table of A and B, corresponding to each ideal separation factor $\alpha$ of $a_1$, $a_2$, $a_3$, $a_4$, $a_5$, $a_6$, $a_7$, and $a_8$.

TABLE 1

(Correspondence Table of A and B)

| | α | A | B |
|---|---|---|---|
| $a_1$ | 50 | 0.7452 | 0.1593 |
| $a_2$ | 50 | 0.7273 | 0.0751 |
| $a_3$ | 80 | 0.7986 | 0.1059 |
| $a_4$ | 80 | 0.7566 | 0.0493 |
| $a_5$ | 120 | 0.8314 | 0.0732 |
| $a_6$ | 120 | 0.7641 | 0.0314 |
| $a_7$ | 200 | 0.8614 | 0.0476 |
| $a_8$ | 200 | 0.7689 | 0.0181 |

According to the method for separating carbon dioxide of the present invention, in obtaining a carbon dioxide mole fraction of 0.03 or less in a gas after separating carbon dioxide by the acid gas removal process using an absorbent, carbon dioxide is separated from a mixed gas by using the inorganic separation membrane having an ideal separation factor $\alpha$ of 50 to 200, in the range of $P_X$ from 2.10 to 6.10 [MPaA], and in the range of $P_Y$ from 0.10 to 0.25 [MPaA].

According to the present invention, in separating carbon dioxide by performing a membrane separation for a mixed gas containing methane and the carbon dioxide with a separation membrane system using an inorganic separation membrane, and then by performing an acid gas removal process using an absorbent, proper distribution conditions become feasible by specifying the suitable range of a carbon dioxide mole fraction at the outlet on the carbon dioxide non-permeation side $X_{CO2}$ of the membrane separation, corresponding to an ideal separation factor of the inorganic separation membrane. Accordingly, a method for separating carbon dioxide in which the decrease of the production amount by methane permeation and the energy loss accompanying the decrease are suppressed in a membrane separation, and further the energy consumption in an acid gas removal process using an absorbent, which is a post-process, can be suppressed is provided.

BRIEF DESCRIPTION OF THE DRAWINGS

FIG. 101 is a diagram showing evaluation results by simulation;

DETAILED DESCRIPTION OF THE INVENTION

Hereinafter, one example of the embodiments of the present invention will be described in detail by using drawings.

Figure 1:
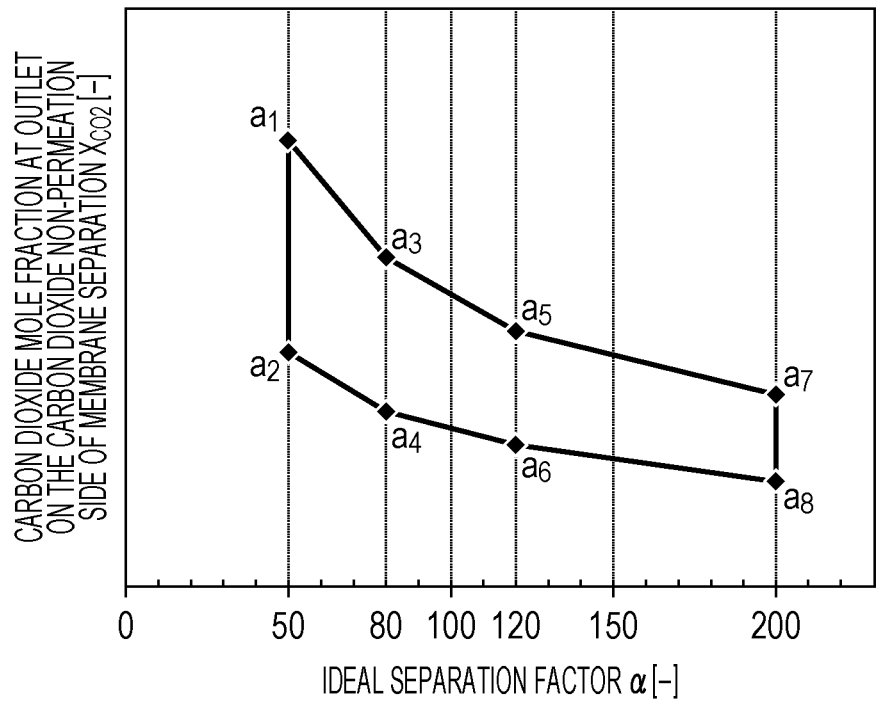
FIG. 1 is a diagram showing the relationship between the ideal separation factor $\alpha$ of an inorganic separation membrane and the carbon dioxide mole fraction at the outlet on the carbon dioxide non-permeation side $X_{CO2}$ of the membrane separation using the inorganic separation membrane.
Figure 6:
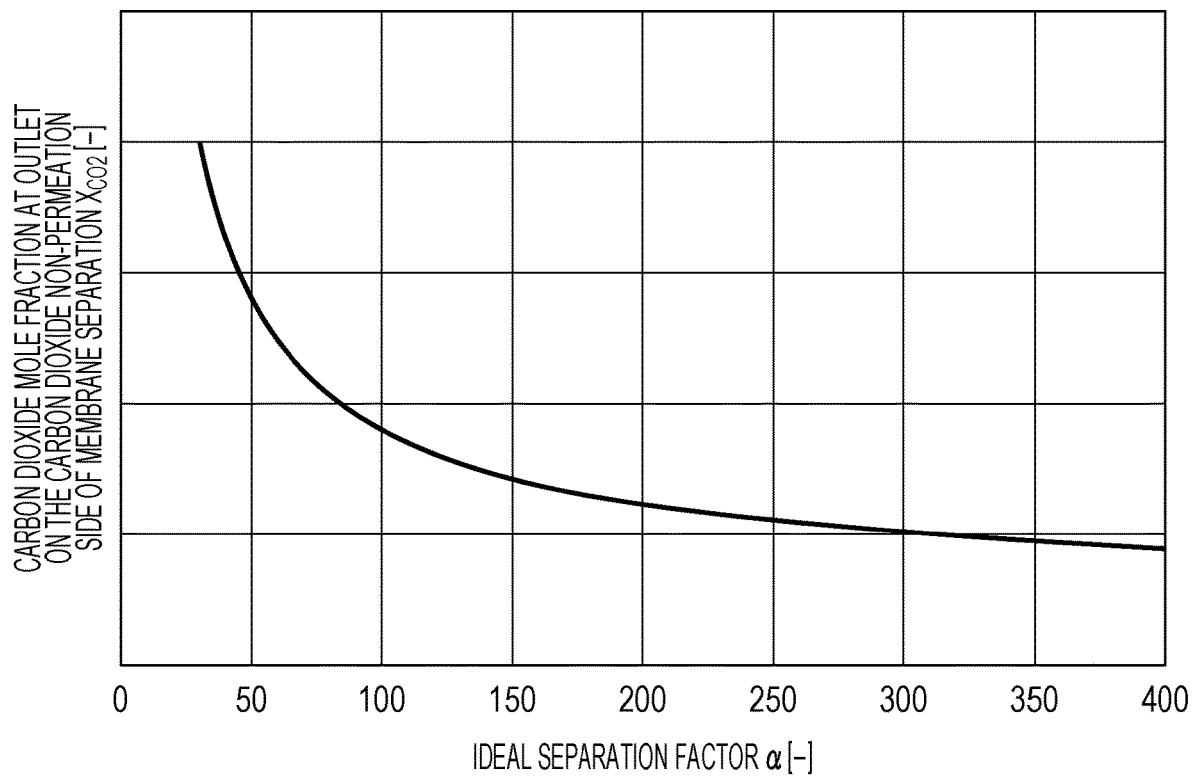
FIG. 6 is a diagram showing one example of the relationship between the ideal separation factor $\alpha$ of an inorganic separation membrane in a membrane separation, which is a pre-process, and the carbon dioxide mole fraction at the outlet on the carbon dioxide non-permeation side $X_{CO2}$ of the membrane separation in which the energy required in the process is minimized, in performing an acid gas removal process using an absorbent.
Figure 102:
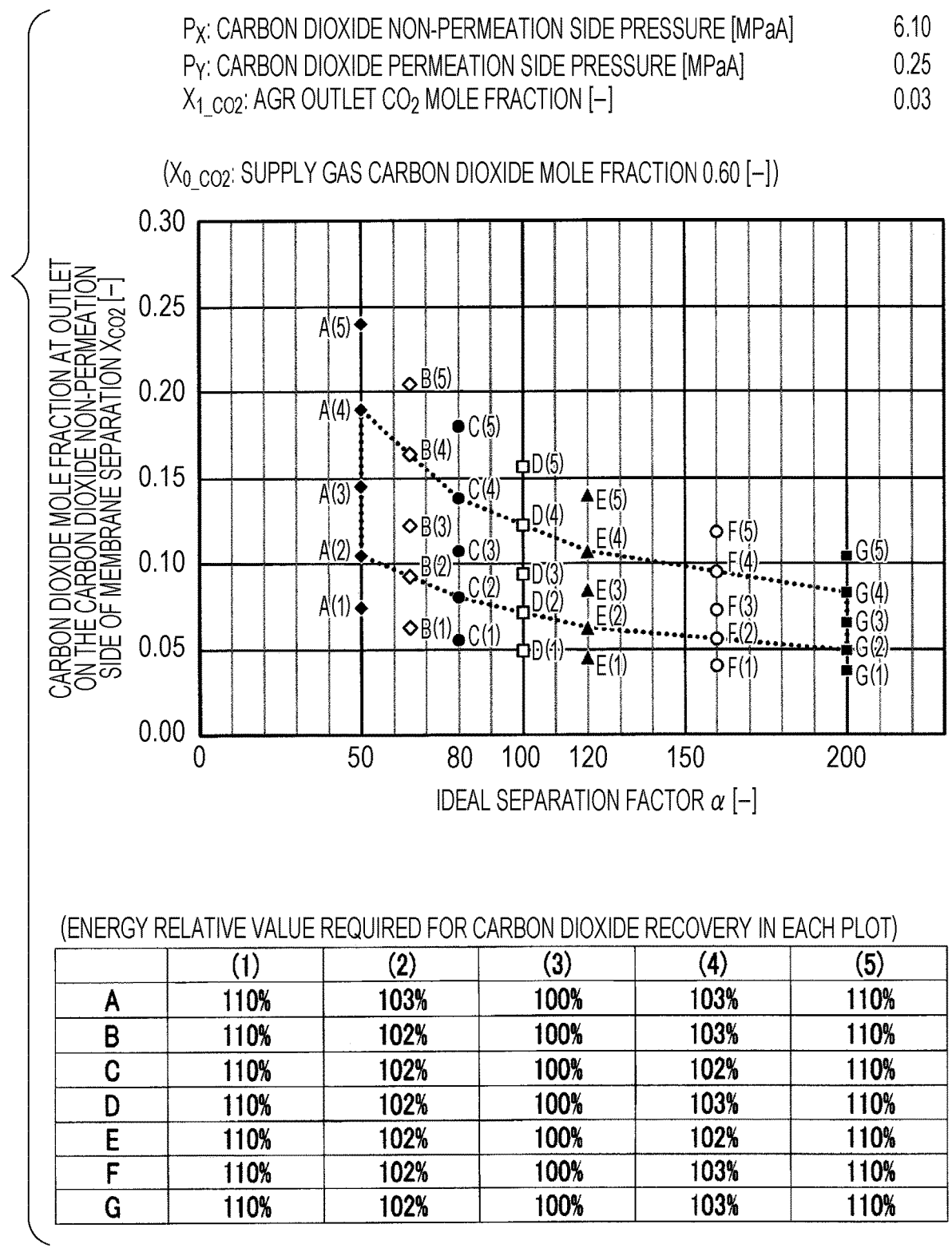
FIG. 102 is a diagram showing evaluation results by simulation.

FIG. 1 shows in a case of performing the method for separating carbon dioxide according to the present invention, the relationship between the ideal separation factor α of an inorganic separation membrane 2, and the carbon dioxide mole fraction at the outlet on the carbon dioxide non-permeation side $X_{CO2}$ of a membrane separation using an inorganic separation membrane 2 ("carbon dioxide mole fraction at the outlet on the carbon dioxide non-permeation side $X_{CO2}$ of the membrane separation" in FIG. 1 and the FIGS. 6 to 102 described later). The present invention is a method for separating carbon dioxide, in which carbon dioxide is separated from a mixed gas containing methane and the carbon dioxide, in separating carbon dioxide by performing a membrane separation with a separation membrane system using an inorganic separation membrane 2 that is permeated by carbon dioxide preferentially from the mixed gas, and then by performing an acid gas removal process using an absorbent, it can be easily confirmed the suitable range of the carbon dioxide mole fraction at the outlet on the carbon dioxide non-permeation side $X_{CO2}$, corresponding to an ideal separation factor α of the inorganic separation membrane 2 of the membrane separation in a case where the carbon dioxide non-permeation side pressure $P_X$ and the carbon dioxide permeation side pressure $P_Y$ in the membrane separation are set as the predetermined conditions.

Further, in FIG. 1, α is an ideal separation factor [−] of an inorganic separation membrane, $X_{CO2}$ is a carbon dioxide mole fraction [−] at the outlet on the carbon dioxide non-permeation side of the membrane separation using an inorganic separation membrane, and the $X_{CO2}$ in FIG. 1 is expressed by the following Formula (I) with carbon dioxide non-permeation side pressure $P_X$ [MPaA] and carbon dioxide permeation side pressure $P_Y$ [MPaA] in the membrane separation.

[Mathematical Formula 2]

$$X_{CO2} = A \cdot P_R + B \quad (I)$$

(in Formula (I), $P_R$ represents $P_Y/P_X$, each of A and B in FIG. 1 is a value shown in the following Correspondence Table of A and B, corresponding to each of the ideal separation factors α of $a_1$, $a_2$, $a_3$, $a_4$, $a_5$, $a_6$, $a_7$, and $a_8$.)

TABLE 2

(Correspondence Table of A and B)

| | α | A | B |
|---|---|---|---|
| $a_1$ | 50 | 0.7452 | 0.1593 |
| $a_2$ | 50 | 0.7273 | 0.0751 |
| $a_3$ | 80 | 0.7986 | 0.1059 |
| $a_4$ | 80 | 0.7566 | 0.0493 |
| $a_5$ | 120 | 0.8314 | 0.0732 |
| $a_6$ | 120 | 0.7641 | 0.0314 |
| $a_7$ | 200 | 0.8614 | 0.0476 |
| $a_8$ | 200 | 0.7689 | 0.0181 |

Figure 2:
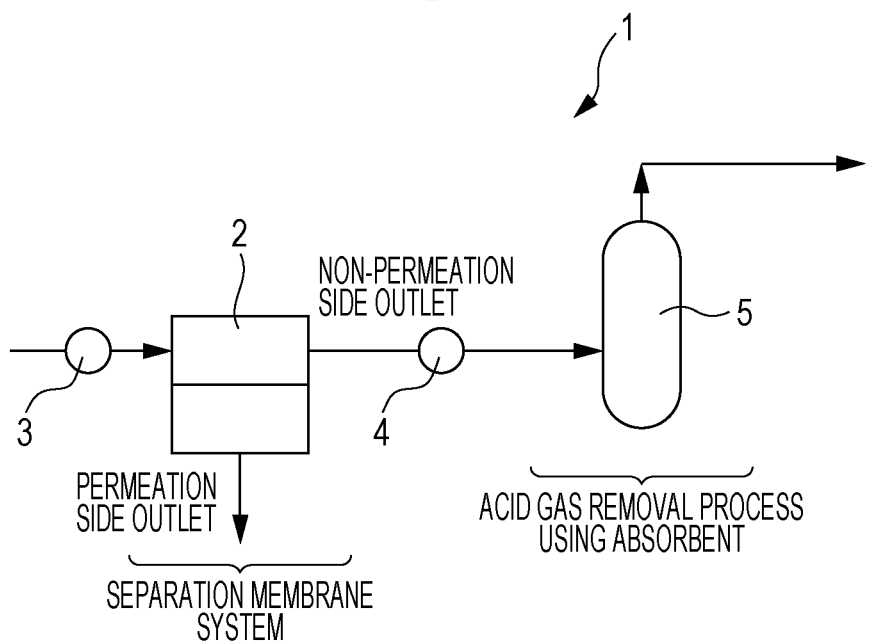
FIG. 2 is a diagram showing a carbon dioxide separation system.

Further, FIG. 2 is a diagram showing a carbon dioxide separation system 1 in which the method for separating carbon dioxide according to the present invention is performed, to which the relationship shown in FIG. 1 is applied. The carbon dioxide separation system 1 shown in FIG. 2 is a hypothetical system for performing the method for separating carbon dioxide according to the present invention, and is a system with a combination of a membrane separation (separation membrane system) in which an inorganic separation membrane 2 having an ideal separation factor α is arranged and an acid gas removal (AGR) process using an absorbent by an absorption tower 5.

The mixed gas, which is subjected to separation in the present invention, is a raw material, and contains carbon dioxide ($CO_2$) and methane ($CH_4$). The inorganic separation membrane 2 used in a carbon dioxide separation system 1 is permeated by carbon dioxide preferentially from the above-described mixed gas, and the mixed gas is supplied from a separation membrane input part 3 to an inorganic separation membrane 2 passing through a path. The inorganic separation membrane 2 is permeated by carbon dioxide selectively from the mixed gas to be supplied, the carbon dioxide (permeable component) is taken out, and the remaining components (non-permeable components) containing methane as the main component are separated. When the carbon dioxide is separated up to the predetermined concentration, the remaining components are sent to an absorption tower 5 in which an acid gas removal process using an absorbent is performed, which is a post-process, via an absorption tower input part 4 at the outlet on the carbon dioxide non-permeation side of the inorganic separation membrane 2.

Further, in FIG. 2, for convenience, one number of inorganic separation membrane 2 is arranged, but the carbon dioxide separation system 1 may be configured such that arbitrary plural number of inorganic separation membranes 2 (not shown) that have an ideal separation factor common to each other are arranged as the inorganic separation membrane 2. In the separation membrane system in FIG. 1, the non-permeation side of the inorganic separation membrane 2 is the final outlet on the carbon dioxide non-permeation side. In addition, in FIG. 2 or in the present invention, the term "non-permeation side" and "permeation side" of the inorganic separation membrane 2 are terms in consideration of the non-permeation and permeation of the carbon dioxide constituting a mixed gas, and "non-permeation side" means the "carbon dioxide non-permeation side", and "permeation side" means the "carbon dioxide permeation side".

In the absorption tower 5 arranged on the non-permeation side of the inorganic separation membrane 2, the non-permeable components of the inorganic separation membrane 2 containing carbon dioxide to be supplied are brought into contact with an absorbent, and the carbon dioxide is selectively absorbed into the absorbent. After the carbon dioxide has been absorbed into the absorbent, the absorbent is heated in a regeneration tower (not shown), and the carbon dioxide is separated and recovered.

Herein, as described above, the mixed gas, which is a raw material, is a mixed gas containing carbon dioxide ($CO_2$) and methane ($CH_4$). Examples of the raw material source of the mixed gas include a natural gas, and a biogas obtained from organic wastes (biomass) or the like, and the present invention can be used as a measure for separating carbon dioxide and taking out methane from the mixed gas.

In the carbon dioxide separation system 1 shown in FIG. 2, the inorganic separation membrane 2 is permeated by carbon dioxide preferentially from the mixed gas, and for example, an inorganic separation membrane 2, which is permeated by the carbon dioxide having a kinetic diameter of roughly 0.33 nm (3.3 angstroms) and is not permeated by the methane having a kinetic diameter of roughly 0.38 nm (3.8 angstroms), is preferably used.

As the kind of the inorganic separation membrane 2, it is not particularly limited, and a conventionally known inorganic separation membrane 2 such as a zeolite membrane, a silica membrane, or a carbon membrane, can be used. Among them, as the zeolite membrane, for example, a zeolite membrane such as a CHA (chabazite) type, a SAPO (silicoaluminophosphate) type, a DDR (Deca-Dodecasil 3R) type, a MFI type, or a FAU (faujasite) type can be used.

The configuration (shape, module structure, and the like) of the inorganic separation membrane 2 is not particularly limited, and is appropriately determined by the desired concentration, or the like. Further, the inorganic separation membrane 2 may be used in a form of a multitubular, that is, a so-called separation membrane module, for example, a separation membrane module with a shell & tube type structure in a heat exchanger can be used.

In the present invention, the ideal separation factor α indicates a ratio ($\alpha = K_{CO2}/K_{CH4}$) of the permeance of carbon dioxide ($K_{CO2}$) (mol/(m²·Pa·s)) and the permeance of methane ($K_{CH4}$) (mol/(m²·Pa·s)) under the performance conditions for an inorganic separation membrane 2. Therefore, it is indicated that as to the inorganic separation membrane 2, as the ideal separation factor α is larger (the permeance of carbon dioxide per unit permeance of methane is larger), the permeation performance of carbon dioxide to methane is better.

On the other hand, in the acid gas removal process using an absorbent, an amine absorbent or the like can be used as the absorbent to be used in an absorption tower 5.

In the carbon dioxide separation system 1 as shown in FIG. 2, in a membrane separation by a separation membrane system using an inorganic separation membrane 2 (hereinafter also simply referred to as "membrane separation"), the carbon dioxide is separated up to the predetermined concentration from a mixed gas, and then the resultant mixed gas is sent to an acid gas removal process using an absorbent, which is a post-process. Herein, when the processing amount of carbon dioxide is extremely large in the separation membrane, the permeation amount of methane is also increased and the production amount of methane is decreased. This can be considered that the energy obtained as a fuel is decreased as compared with that in the production amount in a case where methane does not permeate the inorganic separation membrane 2, therefore, the energy is lost. On the other hand, when the processing amount of carbon dioxide in an inorganic separation membrane 2 is extremely small, the processing amount (load) in an acid gas removal process using an absorbent is increased, the heating amount of the absorbent in a regeneration tower (not shown), is increased, and the excess energy can be consumed.

From the above, in consideration of avoiding both of the excess energy consumption accompanying the heating of the absorbent as much as possible by decreasing the carbon dioxide processing amount (load) by an acid gas removal process using an absorbent (that is, increasing the carbon dioxide processing amount (load) by a membrane separation) and of the increase of the energy loss accompanying the methane permeation by a membrane separation, the mixed gas obtained after the membrane separation has been applied up to the carbon dioxide mole fraction with the highest energy saving performance in the entire carbon dioxide separation system 1 is required to be sent from the inorganic separation membrane 2 to an acid gas removal process using an absorbent. In other words, when the carbon dioxide is separated up to the predetermined concentration from a mixed gas by a separation membrane system, and then the resultant mixed gas is sent to an acid gas removal process using an absorbent, which is a post-process, the resultant mixed gas is required to be sent to an acid gas removal process using an absorbent, which is a post-process, under the proper distribution conditions in terms of energy between the load of membrane separation and the load of acid gas removal process.

As to the ideal separation factor of an inorganic separation membrane 2 in a separation membrane system in a case of using a carbon dioxide separation system 1 shown in FIG. 2, with the relationship in FIG. 1, in a case where each ideal separation factor of $a_1$ and $a_2$ is 50, each ideal separation factor of $a_3$ and $a_4$ is 80, each ideal separation factor of $a_5$ and $a_6$ is 120, and each ideal separation factor of $a_7$ and as is 200, the degree of carbon dioxide mole fraction (degree of the upper limit and lower limit) at the outlet on the carbon dioxide non-permeation side $X_{CO2}$ of the membrane separation so as not to consume excess energy as far as possible in performing a membrane separation by a separation membrane system using an inorganic separation membrane 2, corresponding to the ideal separation factor α of the inorganic separation membrane 2 in the membrane separation is shown. Further, the carbon dioxide mole fraction at the outlet on the carbon dioxide non-permeation side $X_{CO2}$ in the membrane separation is a carbon dioxide concentration in a mixed gas (carbon dioxide mole fraction) when the mixed gas is sent to a absorption tower input part 4 in the carbon dioxide separation system.

Further, in the present invention, in the separation by performing a membrane separation with a separation membrane system using an inorganic separation membrane 2, and then by performing an acid gas removal process using an absorbent, the application range of the carbon dioxide mole fraction at the outlet on the carbon dioxide non-permeation side $X_{CO2}$ in the membrane separation, corresponding to the ideal separation factor α of an inorganic separation membrane 2 in the membrane separation can be easily confirmed in a case where the carbon dioxide non-permeation side pressure $P_X$ and the carbon dioxide permeation side pressure $P_Y$ in the membrane separation are set to the predetermined conditions. By confirming the application range of the carbon dioxide mole fraction $X_{CO2}$, the separation of carbon dioxide is performed under proper distribution conditions.

Herein, under the "proper distribution conditions", in separating carbon dioxide by a separation membrane system with an inorganic separation membrane 2 and by an acid gas removal process using an absorbent, in order that the energy required for the separation of carbon dioxide is minimized, the separation membrane system and the acid gas removal process are required to be performed in good balance. Further, the separation is performed by determining the carbon dioxide mole fraction at the outlet on the carbon dioxide non-permeation side $X_{CO2}$ in a membrane separation by a separation membrane system, which corresponds to proper distribution conditions, and by sending the mixed gas with the carbon dioxide mole fraction to an acid gas removal process using an absorbent, which is a post-process.

Figure 3:
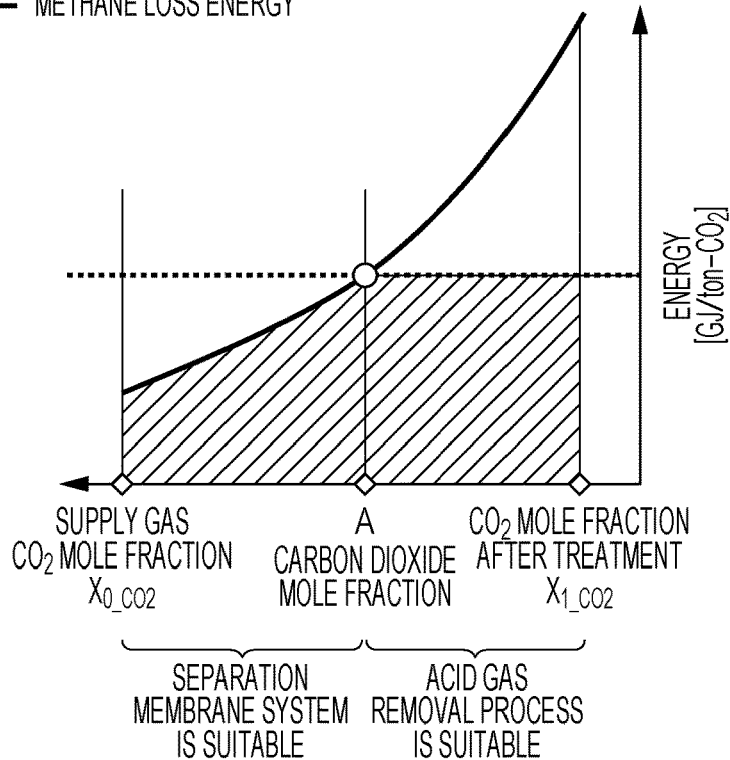
FIG. 3 is a diagram showing the relationship between the carbon dioxide mole fraction and the energy required for the separation of carbon dioxide in a case of using a carbon dioxide separation system.
Figure 4:
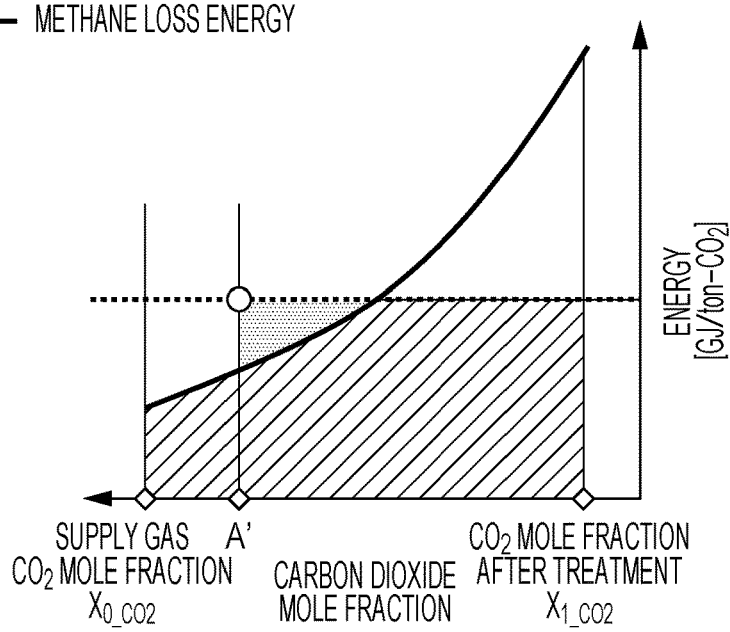
FIG. 4 is a diagram showing the relationship between the carbon dioxide mole fraction and the energy required for the separation of carbon dioxide in a case of using a carbon dioxide separation system.
Figure 5:
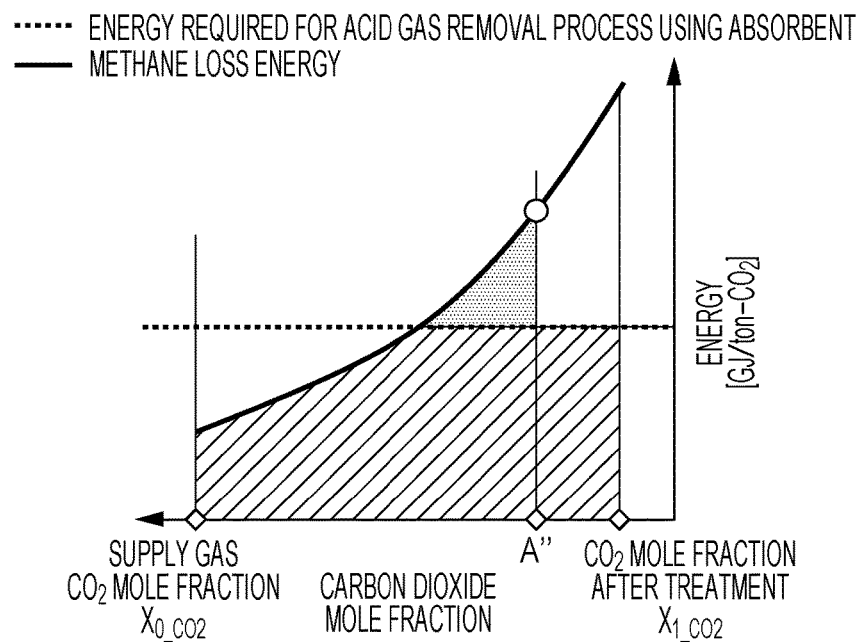
FIG. 5 is a diagram showing the relationship between the carbon dioxide mole fraction and the energy required for the separation of carbon dioxide in a case of using a carbon dioxide separation system.

Hereinafter, the relationship between the separation of carbon dioxide and the energy to be required will be explained by using drawings. FIGS. 3 to 5 are diagrams showing the relationship between the carbon dioxide mole fraction and the energy required for the separation of carbon dioxide in a case of using a carbon dioxide separation system.

At first, FIG. 3 is a diagram showing the energy required in a case where when the mole fraction A is assumed to be a concentration that is a proper distribution condition, carbon dioxide is separated from the mixed gas by using an inorganic separation membrane 2 until the concentration of the carbon dioxide becomes a mole fraction A that is a proper distribution condition, and carbon dioxide is separated by an acid gas removal process using an absorbent after the mole fraction A has been obtained.

Further, in the following explanation, the concentration before the separation by an inorganic separation membrane 2 (concentration of carbon dioxide in a mixed gas to be supplied) is set as a mole fraction $X_{0\_CO2}$ (supply gas carbon dioxide ($CO_2$) mole fraction), and the concentration after the separation of carbon dioxide by using an absorbent is set as a mole fraction $X_{1\_CO2}$ (carbon dioxide ($CO_2$) mole fraction after processing). The large/small relation of mole fraction is $X_{0\_CO2} > A > X_{1\_CO2}$.

In FIGS. 3 to 5, the solid line indicates methane ($CH_4$) loss energy. This indicates a value of the energy regarded as lost by the methane loss per unit permeation amount (1 ton) of carbon dioxide calculated by converting the (methane loss) amount of the methane that cannot be recovered by permeating an inorganic separation membrane 2 to the energy by using the lower heating value of methane, and further converting the permeation amount of carbon dioxide in an inorganic separation membrane 2 to the weight. As shown in FIG. 3 and the like, as the concentration of carbon dioxide in the mixed gas becomes smaller, the proportion of the methane permeation amount to the carbon dioxide permeation amount can be relatively larger, therefore, the methane loss energy shows an increasing tendency. Further, in FIGS. 3 to 5, the dashed line indicates the energy required for carbon dioxide separation in an acid gas removal process using an absorbent (energy per unit processing amount of carbon dioxide), and as shown in FIG. 3 and the like, this becomes relatively substantially constant regardless of the carbon dioxide mole fraction in the mixed gas as compared with the methane loss energy.

In a case of separating carbon dioxide by a membrane separation when the concentration is mole fraction A, the energy is specified along the solid line from the mole fraction $X_{1\_CO2}$ that is a concentration before the membrane separation to the mole fraction A, and the energy is specified along the dashed line by separating until the concentration of carbon dioxide becomes mole fraction $X_{1\_CO2}$ by an acid gas removal process using an absorbent after the mole fraction A has been obtained. Therefore, in a case of separating carbon dioxide by a separation membrane system until the concentration becomes the mole fraction A, the integration range shown with the shaded area in FIG. 3 indicates the energy required for the carbon dioxide separation from the concentration of carbon dioxide in the mixed gas to be supplied (mole fraction $X_{0\_CO2}$) to the concentration of carbon dioxide after being processed by an acid gas removal process using an absorbent (mole fraction $X_{1\_CO2}$). On the other hand, in a case of FIG. 3, the excess energy is not consumed as in FIGS. 4 and 5 described later, and "the optimal distribution conditions" are performed.

Next, FIG. 4 is a diagram showing the energy required in a case where the membrane separation is performed by the mole fraction A' (A<A') that is a concentration higher than the carbon dioxide concentration (mole fraction A) to be the optimal distribution condition as shown in FIG. 3, by using an inorganic separation membrane 2, and after the mole fraction A' has been obtained, carbon dioxide is separated by an acid gas removal process using an absorbent. As shown in FIG. 4, in order to obtain the concentration of carbon dioxide from the mole fraction A' to the mole fraction A by an acid gas removal process using an absorbent, the excess energy (black marked area in FIG. 4) is generated. Therefore, in a case of FIG. 4, energy larger than the energy required for carbon dioxide separation under the optimal distribution conditions shown in FIG. 3 is required.

FIG. 5 is a diagram showing the energy required in a case where the membrane separation is performed by the mole fraction A" (A>A") that is a concentration lower than the carbon dioxide concentration (mole fraction A) to be the optimal distribution condition as shown in FIG. 3, by using an inorganic separation membrane 2, and after the mole fraction A" has been obtained, carbon dioxide is separated by an acid gas removal process using an absorbent. As shown in FIG. 5, in order to obtain the concentration of carbon dioxide from the mole fraction A to the mole fraction A" by a membrane separation with an inorganic separation membrane 2, the excess energy (black marked area in FIG. 5) is generated. Therefore, in the same manner as in a case shown in FIG. 4, energy larger than the energy required for carbon dioxide separation under the optimal distribution conditions shown in FIG. 3 is required.

In the present invention, in the determination of the relationship between the ideal separation factor of the inorganic separation membrane 2 and the mole fraction at the outlet on the carbon dioxide non-permeation side $X_{CO2}$ in the membrane separation, shown in FIG. 1, the energy to be required is set so as to be suppressed to less than 110% as an energy relative value (each of the excess energy amounts that are black marked areas shown in FIGS. 4 and 5 is suppressed to less than 10% to the entire energy required for the carbon dioxide separation under the optimal distribution conditions) in a case where the energy required under the optimal distribution conditions shown in FIG. 3 is set to 100%. As described above, the term "energy relative value" is expressed as a relative value when the energy consumed under the optimal distribution conditions is set to 100% as to the energy required in a carbon dioxide separation system 1 (the same applies hereinafter).

Further, FIG. 6 is a diagram showing one example of the relationship between the ideal separation factor α of the inorganic separation membrane 2 in the membrane separation, which is a pre-process, and the carbon dioxide mole fraction at the outlet on the carbon dioxide non-permeation side $X_{CO2}$ of the membrane separation in which the energy required in this process is minimized, in performing the acid gas removal process using an absorbent. As shown in FIG. 6, as the ideal separation factor α of the inorganic separation membrane 2 in the membrane separation, which is a pre-process, is higher, the carbon dioxide mole fraction at the outlet on the carbon dioxide non-permeation side $X_{CO2}$ in the membrane separation can be lower. That is, by using an inorganic separation membrane 2 having high separation performance, the membrane separation enables carbon dioxide to permeate (be processed) more largely.

The ideal separation factor α of an inorganic separation membrane 2 used in the membrane separation by a separation membrane system using the inorganic separation membrane 2 is set in the range of 50 to 200. As to the lower limit, as is apparent also from FIG. 6, in a case of using an inorganic separation membrane 2 having an ideal separation factor of smaller than 50, the carbon dioxide mole fraction $X_{CO2}$ at which the energy required for an acid gas removal process using an absorbent is minimized becomes large, and the benefits of energy reduction expected with the combination of the process and the membrane separation are hardly obtained, therefore, the lower limit is set to 50. On the other hand, as to the upper limit, as is apparent also from FIG. 6, even in a case of using an inorganic separation membrane 2 having an ideal separation factor of larger than 200, the $X_{CO2}$ indicating proper distribution conditions does not change much (remains flat), therefore, the upper limit is set to 200.

Next, by using the relationship shown in FIG. 1, the confirmation method of the carbon dioxide mole fraction at the outlet on the carbon dioxide non-permeation side $X_{CO2}$ of the membrane separation corresponding to an ideal separation factor α of the inorganic separation membrane 2 used in the membrane separation in the method for separating carbon dioxide according to the present invention will be described.

Firstly, in a case of using an inorganic separation membrane 2 of which each of the ideal separation factors $a_1$ and $a_2$ is 50, each of the ideal separation factors $a_3$ and $a_4$ is 80, each of the ideal separation factors $a_5$ and $a_6$ is 120, and each of the ideal separation factors $a_7$ and $a_8$ is 200, A and B that correspond to each other are selected from Correspondence Table of A and B, the selected A and B are assigned to Formula (I) together with the carbon dioxide non-permeation side pressure $P_X$ and carbon dioxide permeation side pressure $P_Y$ in the membrane separation under the conditions to be used, and $X_{CO2}$ corresponding to the proper distribution conditions can be obtained.

For example, in a case of using an inorganic separation membrane having an ideal separation factor of 50, A is 0.7452 and B is 0.1593 for $a_1$, and A is 0.7273 and B is 0.0751 for $a_2$ from the Correspondence Table of A and B. Further, as to the carbon dioxide non-permeation side pressure $P_X$ and carbon dioxide permeation side pressure $P_Y$ to be used, for example, in a case where $P_X$ is 4.0 MPaA, and $P_Y$ is 0.10 MPaA ($P_R=P_Y/P_X=0.025$), by assigning these values to Formula (I), $X_{CO2}=0.1779$ is calculated for $a_1$, and $X_{CO2}=0.0933$ is calculated for $a_2$, and the range of 0.1779 to 0.0933 is a range of $X_{CO2}$ corresponding to the proper distribution conditions in a case where the ideal separation factor α of the inorganic separation membrane 2 is 50, the carbon dioxide non-permeation side pressure $P_X$ is 4.0 MPaA, and the carbon dioxide permeation side pressure $P_Y$ is 0.10 MPaA.

On the other hand, in a case where the ideal separation factor is not the above-described $a_1$, $a_2$, $a_3$, $a_4$, $a_5$, $a_6$, $a_7$, and $a_8$, by using $a_1$, $a_2$, $a_3$, $a_4$, $a_5$, $a_6$, $a_7$, and $a_8$ sandwiching the ideal separation factor to be subjected therebetween, the range of $X_{CO2}$ can be determined in the manner described below.

For example, in a case of using an inorganic separation membrane 2 having an ideal separation factor of 100, which is not $a_1$ or the like, the range of $X_{CO2}$ is calculated by using 80 ($a_3$ and $a_4$) and 120 ($a_5$ and $a_6$) that sandwich the ideal separation factor 100 therebetween from the Correspondence Table of A and B. From the determined $X_{CO2}$ values of $a_3$ and $a_5$, a linear expression is made by the ideal separation factor and the value of $X_{CO2}$, and the upper limit value of $X_{CO2}$ in the ideal separation factor of 100 is calculated by assigning 100 to the ideal separation factor of the linear expression. In the same manner, from the determined $X_{CO2}$ values of $a_4$ and $a_6$, a linear expression of the ideal separation factor and $X_{CO2}$ is made, and the lower limit value of $X_{CO2}$ in the ideal separation factor of 100 is calculated by assigning 100 to the ideal separation factor of the linear expression.

As described above, even in a case where the ideal separation factor is other than the above-described $a_1$, $a_2$, $a_3$, $a_4$, $a_5$, $a_6$, $a_7$, and $a_8$, the range of $X_{CO2}$ corresponding to the proper distribution conditions, which corresponds to the ideal separation factor of the inorganic separation membrane 2, can be determined.

Further, as the contact mode (flow model) of the gas flow on the high pressure side (non-permeation side) and the gas flow on the low pressure side (permeation side) of the separation membrane system in FIG. 1, there is a case of a counter flow, a concurrently flow, a cross flow, or a combination of these. In the separation method according to the present invention, those flow models can be all applied, and a counter flow is preferably used.

Next, the relationship shown in FIG. 1 will be explained with the evaluation results (corresponding also to Examples). The evaluation is performed as follows. By using a carbon dioxide separation system 1 shown in FIG. 2, in which the contact mode (flow model) of the gas flow on the high pressure side (non-permeation side) and the gas flow on the low pressure side (permeation side) are set as a counter flow, the permeance of carbon dioxide ($K\_{CO2}$) in the inorganic separation membrane 2 is used as a fixed value ($1.0 \times 10^{-7}$ mol/(m²·Pa·s)), and the total of five parameters, the ideal separation factor α (permeance ratio of carbon dioxide and methane), the carbon dioxide non-permeation side pressure $P_X$ in the membrane separation, the carbon dioxide permeation side pressure $P_Y$ in the membrane separation, the carbon dioxide mole fraction in the mixed gas to be supplied (supply gas carbon dioxide mole fraction) $X_{0\_CO2}$, and the carbon dioxide mole fraction after the acid gas removal process using an absorbent $X_{1\_CO2}$ are changed, and the calculation (simulation) is performed. The establishment of the proper distribution conditions is confirmed under the conditions of pressures and carbon dioxide mole fractions. Further, the specific values of the above-described five parameters are as follows.

(Conditions)

Ideal separation factor α of inorganic separation membrane 2: 50, 80, 120, and 200 (4 kinds), 65 (value intermediate between 50 and 80), 100 (value intermediate between 80 and 120), and 160 (value intermediate between 120 and 200) (3 kinds) (7 kinds in total from 50 to 200)

Carbon dioxide non-permeation side pressure (supply side pressure) in membrane separation $P_X$ [MPaA]: 2.10, 4.10, and 6.10 (3 kinds from 2.10 to 6.10 MPaA)

Carbon dioxide permeation side pressure in membrane separation $P_Y$ [MPaA]: 0.10, 0.15, 0.20, and 0.25 (4 kinds from 0.10 to 0.25 MPaA)

Carbon dioxide mole fraction in mixed gas to be supplied (supply gas carbon dioxide mole fraction) $X_{0\_CO2}$ [−]: 0.10, 0.20, 0.40, and 0.60 (4 kinds from 0.10 to 0.60)

Carbon dioxide mole fraction after acid gas removal process using absorbent ($CO_2$ mole fraction at AGR outlet) $X_{1\_CO2}$ [-]: <50 ppm (less than 50 ppm), and 0.03 (2 kinds)

Figure 7:
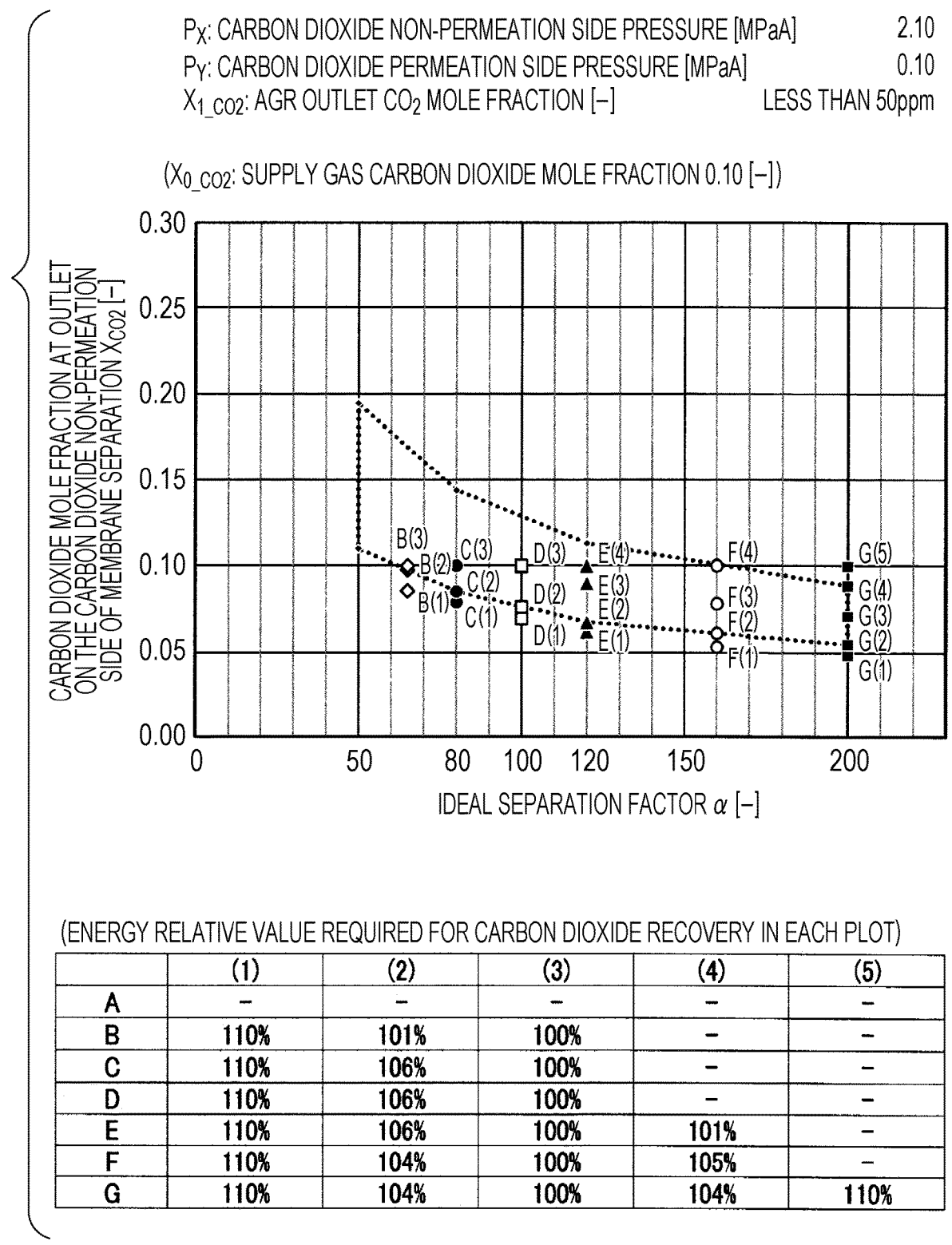
FIG. 7 is a diagram showing evaluation results by simulation.
Figure 8:
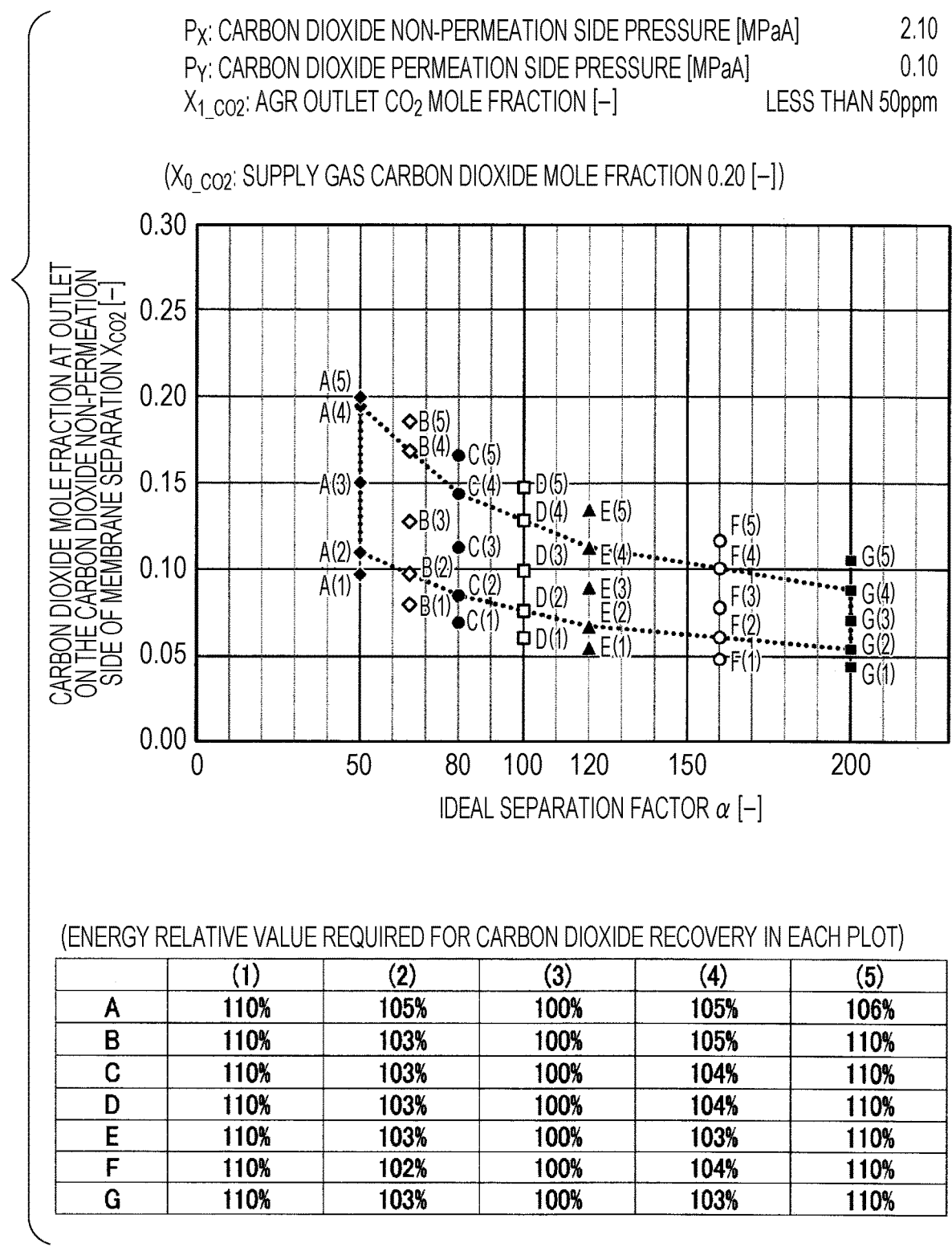
FIG. 8 is a diagram showing evaluation results by simulation.
Figure 9:
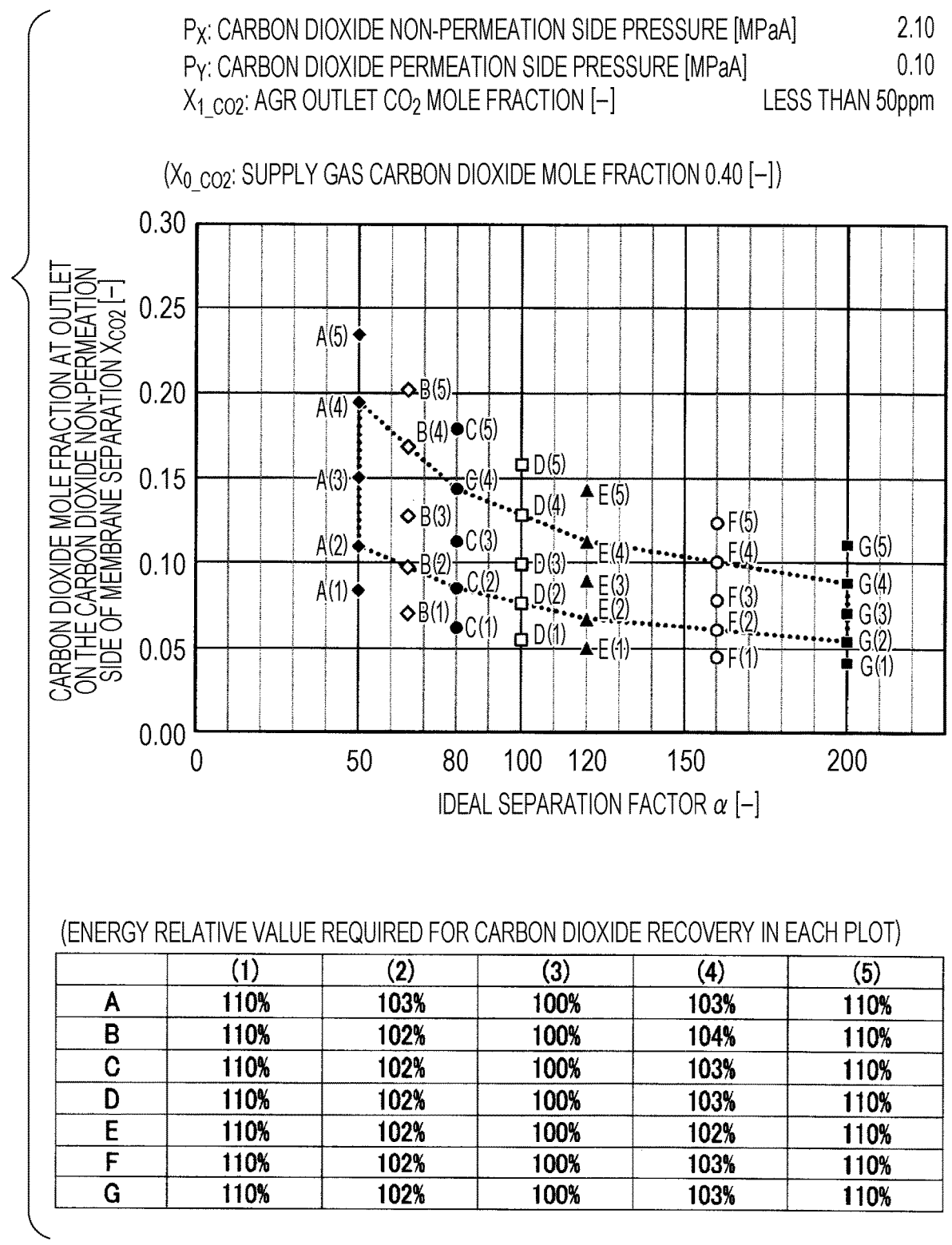
FIG. 9 is a diagram showing evaluation results by simulation.
Figure 10:
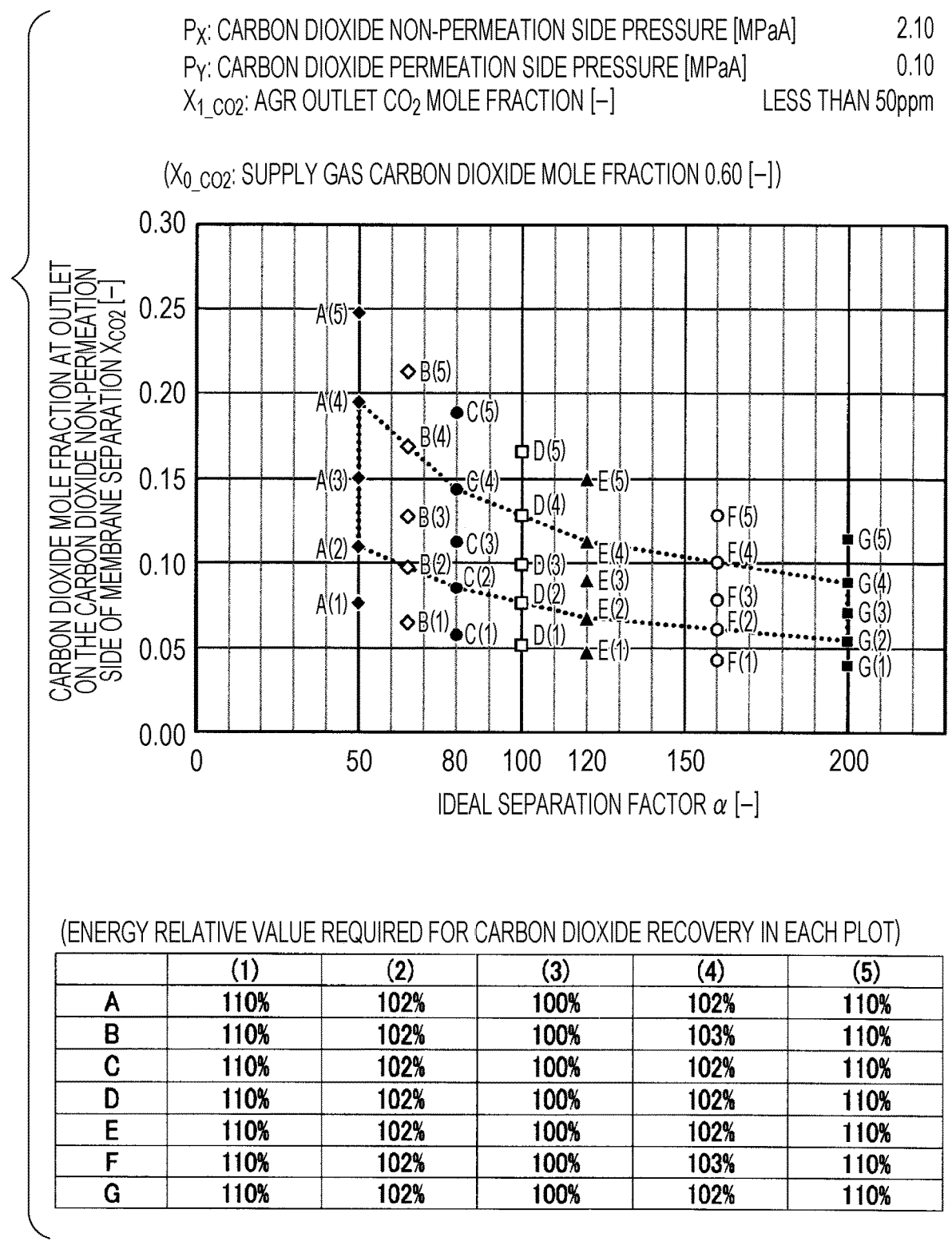
FIG. 10 is a diagram showing evaluation results by simulation.
Figure 11:
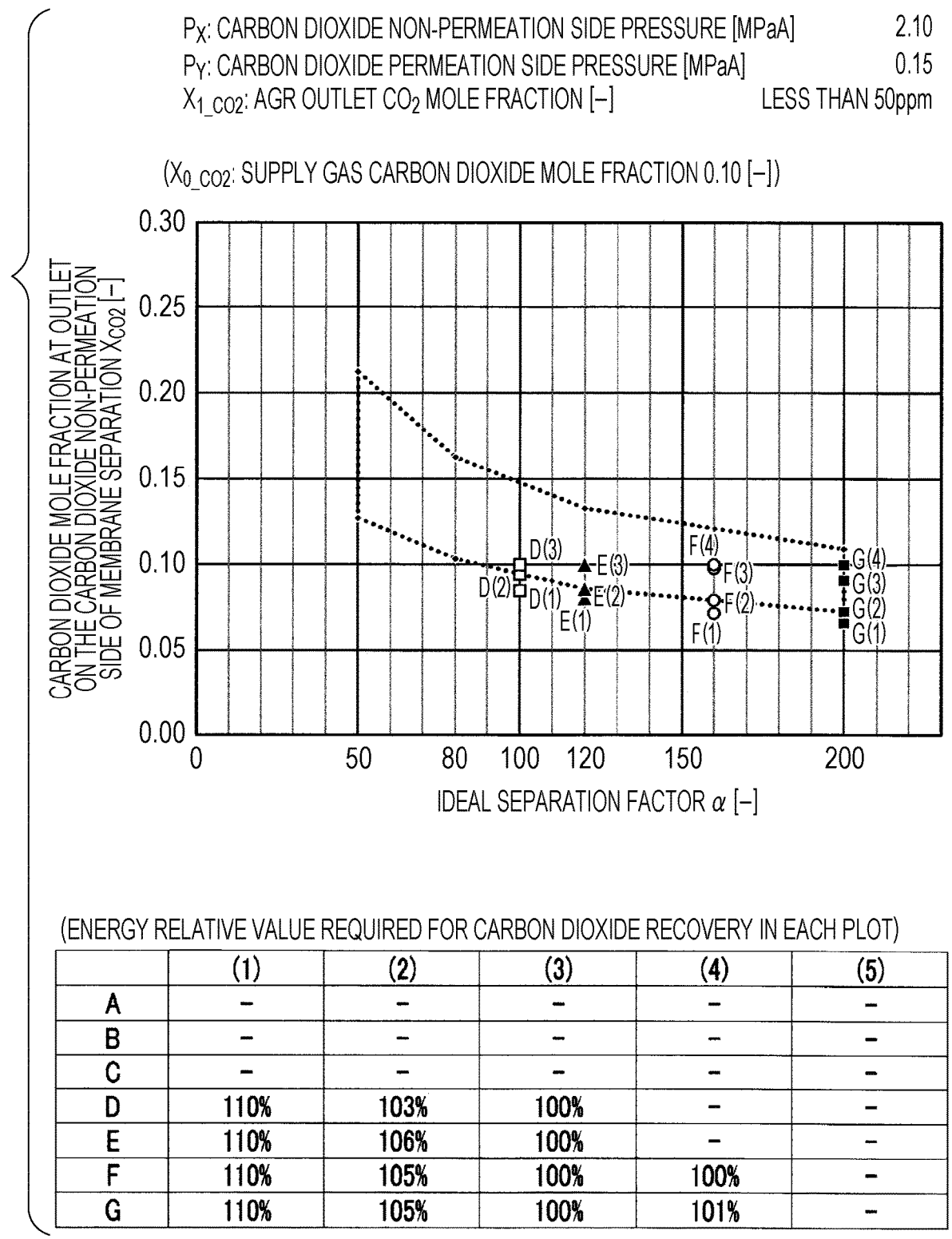
FIG. 11 is a diagram showing evaluation results by simulation.
Figure 12:
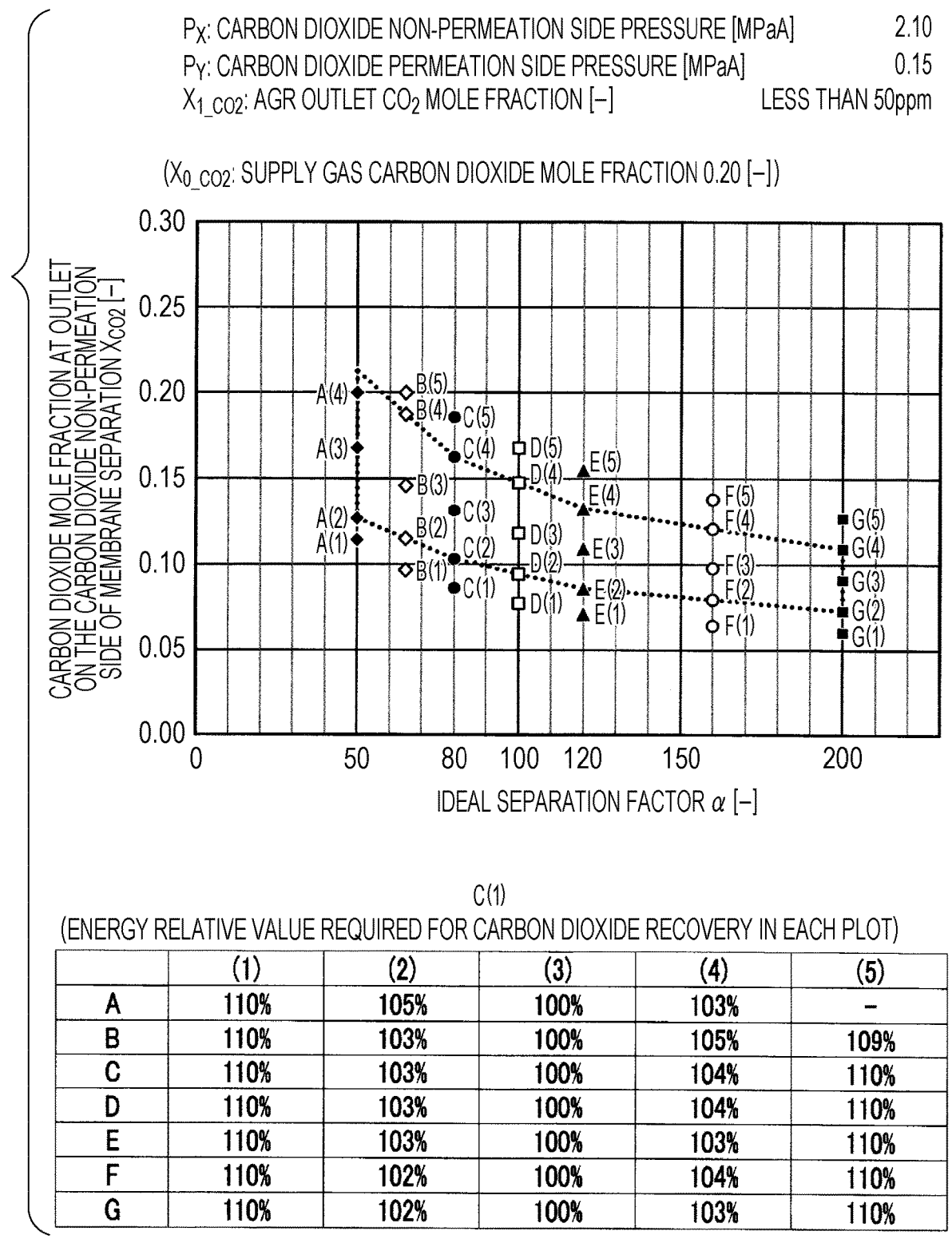
FIG. 12 is a diagram showing evaluation results by simulation.
Figure 13:
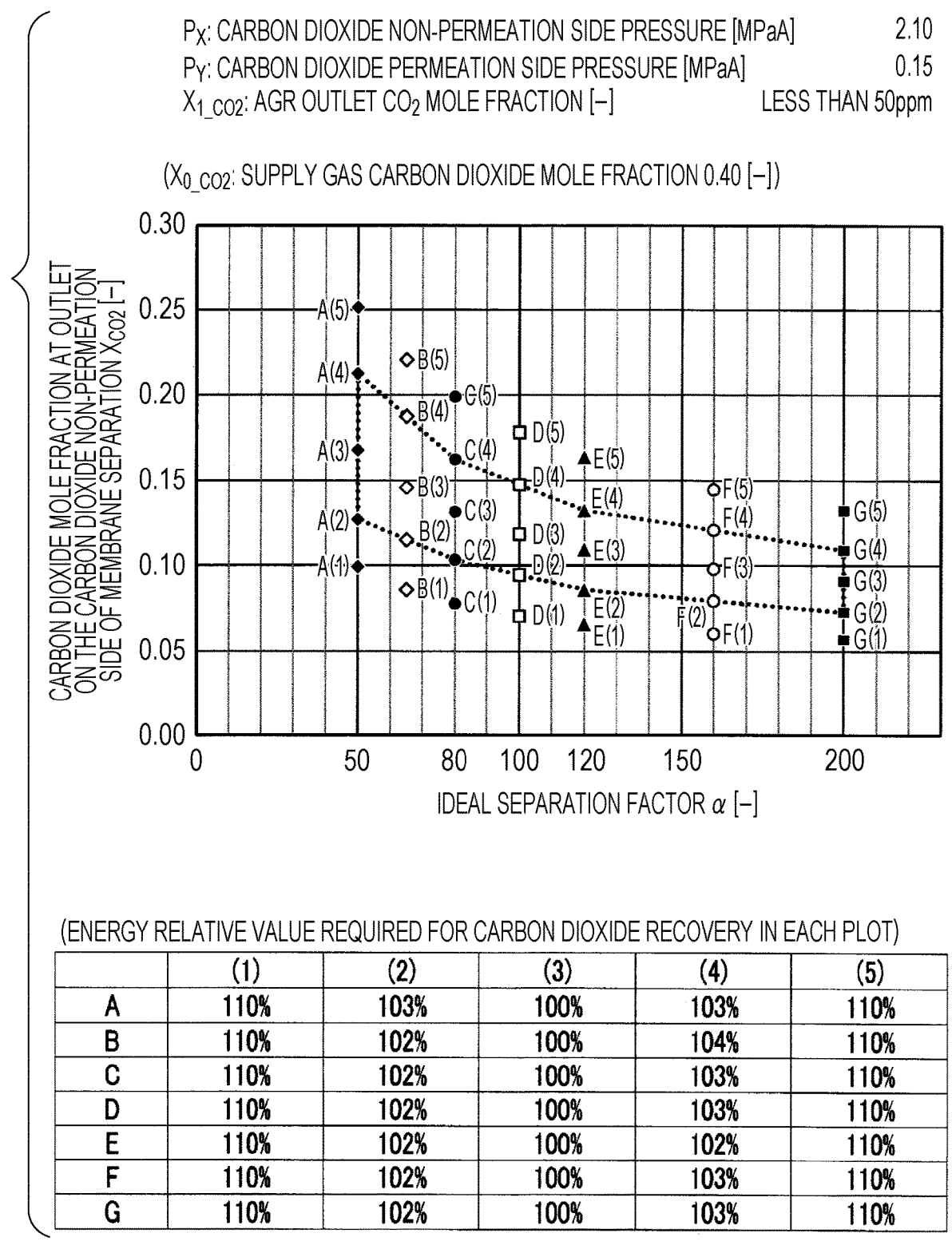
FIG. 13 is a diagram showing evaluation results by simulation.
Figure 14:
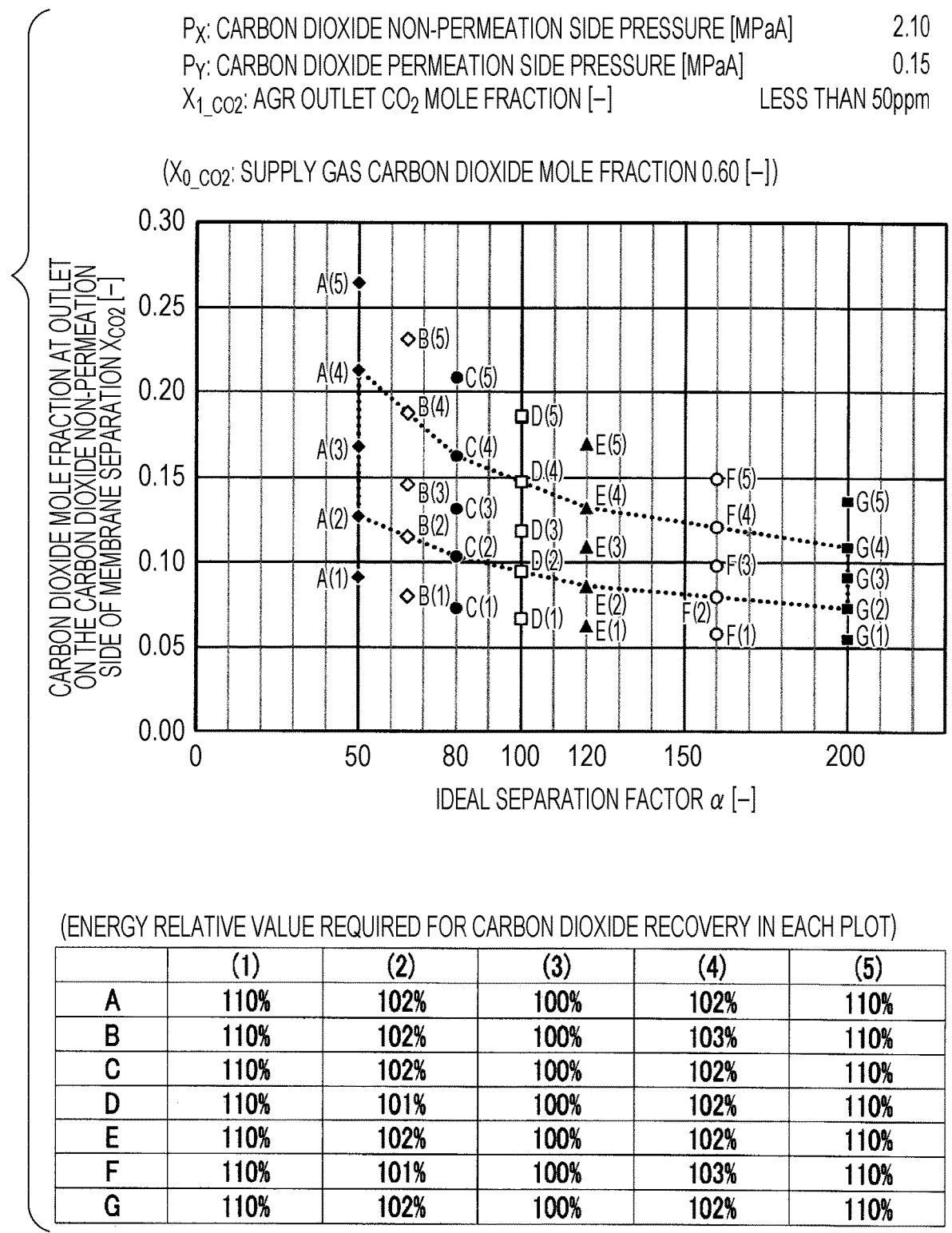
FIG. 14 is a diagram showing evaluation results by simulation.

The evaluation is performed as follows. The ideal separation factor α of the inorganic separation membrane 2 is set to 50 (A in FIGS. 7 to 102, the same applies hereinafter), 65 (B), 80 (C), 100 (D), 120 (E), 160 (F), and 200 (G), 4 kinds parameters other than the above-described ideal separation factors are variously selected, and then the carbon dioxide mole fraction at the outlet on the carbon dioxide non-permeation side $X_{CO2}$ of a membrane separation using an inorganic separation membrane 2 is changed and simulated, and the energy required in each $X_{CO2}$ is calculated. The evaluation results by simulation are shown in FIGS. 7 to 102. Further, Correspondence Table of the each combination of parameters described above and the drawing numbers are shown in Table 3.

Figure 103:
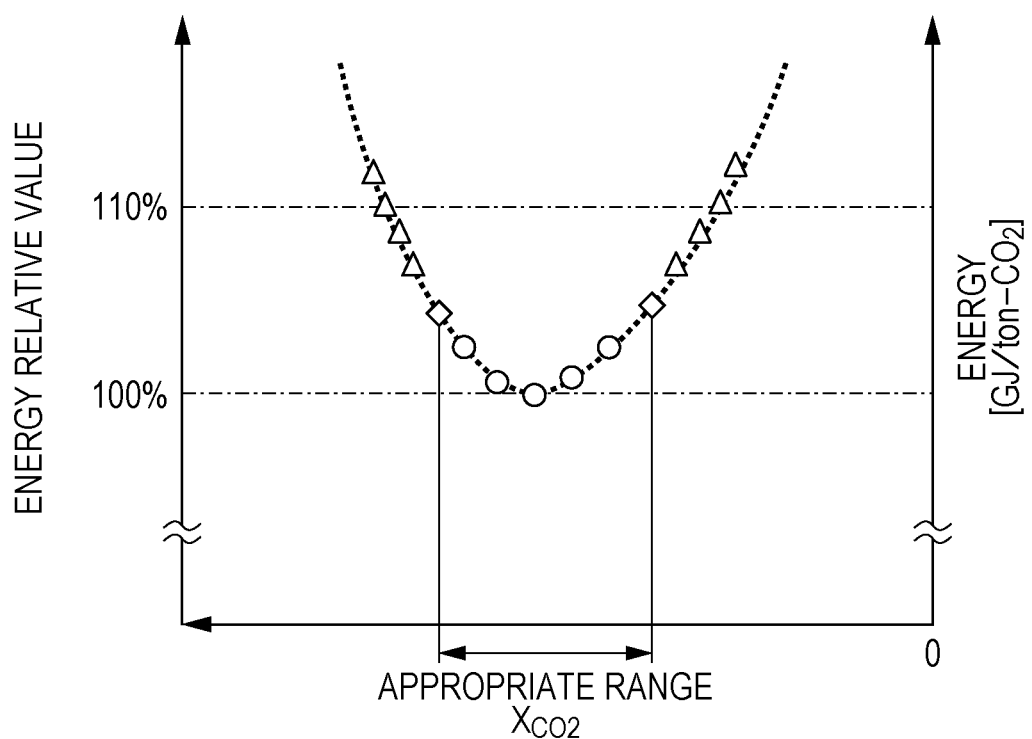
FIG. 103 is an explanation diagram for explaining an evaluation procedure by simulation.

Herein, the procedure of evaluation will be described using FIG. 103. FIG. 103 is an explanation diagram for explaining the evaluation procedure by simulation. At first, the lower limit value and upper limit value in the proper range of $X_{CO2}$ (within the range of polygon shown in FIG. 1) are calculated by using the pressure condition to be examined, the ideal separation factor of the inorganic separation membrane 2, and the above-described Formula (I), and the energy corresponding to each of the lower limit value and upper limit value is calculated by simulation (see the rhombus (◇) plots in FIG. 103). The calculation of energy can be performed by dividing the sum of the loss energy (methane loss energy) corresponding to the methane permeation amount in the membrane separation and the heating energy (regeneration energy) of the absorbent in a regeneration tower, which is required for the carbon dioxide separation in an acid gas removal process using an absorbent, by the sum of the weight of the carbon dioxide recovered by the membrane separation and the weight of the carbon dioxide recovered by the acid gas removal process using an absorbent.

Next, the value of $X_{CO2}$ is changed in the range of the lower limit value and upper limit value within the proper range of $X_{CO2}$, the $X_{CO2}$ is calculated when the energy is minimized, and the energy relative value corresponding to this $X_{CO2}$ is set to 100%. Subsequently, the energy value when the energy relative value is set to 100% is compared with the energy values of the lower limit value and the upper limit value within the proper range of $X_{CO2}$, and the energy relative value corresponding to the lower limit value and upper limit value is calculated. In addition, by changing the value of $X_{CO2}$, the $X_{CO2}$ is calculated when the energy relative value is 110% as compared with the energy value when the energy relative value is set to 100%, and $X_{CO2}$ at this time is confirmed to be outside the proper range (that is, outside the range of polygon shown in FIG. 1).

(Correspondence Table)

TABLE 3

| Drawing number | Supply gas carbon dioxide mole fraction $X_{0\_co2}$ [—] | AGR outlet carbon dioxide mole fraction $X_{1\_co2}$ [—] | Carbon dioxide non-permeation side pressure $P_X$ [MPaA] | Carbon dioxide permeation side pressure $P_Y$ [MPaA] |
|---|---|---|---|---|
| 7, 8, 9, 10 | 0.10, 0.20, 0.40, 0.60 | <50 ppm | 2.10 | 0.10 |
| 11, 12, 13, 14 | 0.10, 0.20, 0.40, 0.60 | <50 ppm | 2.10 | 0.15 |
| 15, 16, 17, 18 | 0.10, 0.20, 0.40, 0.60 | <50 ppm | 2.10 | 0.20 |
| 19, 20, 21, 22 | 0.10, 0.20, 0.40, 0.60 | <50 ppm | 2.10 | 0.25 |
| 23, 24, 25, 26 | 0.10, 0.20, 0.40, 0.60 | <50 ppm | 4.10 | 0.10 |
| 27, 28, 29, 30 | 0.10, 0.20, 0.40, 0.60 | <50 ppm | 4.10 | 0.15 |
| 31, 32, 33, 34 | 0.10, 0.20, 0.40, 0.60 | <50 ppm | 4.10 | 0.20 |
| 35, 36, 37, 38 | 0.10, 0.20, 0.40, 0.60 | <50 ppm | 4.10 | 0.25 |
| 39, 40, 41, 42 | 0.10, 0.20, 0.40, 0.60 | <50 ppm | 6.10 | 0.10 |
| 43, 44, 45, 46 | 0.10, 0.20, 0.40, 0.60 | <50 ppm | 6.10 | 0.15 |
| 47, 48, 49, 50 | 0.10, 0.20, 0.40, 0.60 | <50 ppm | 6.10 | 0.20 |
| 51, 52, 53, 54 | 0.10, 0.20, 0.40, 0.60 | <50 ppm | 6.10 | 0.25 |
| 55, 56, 57, 58 | 0.10, 0.20, 0.40, 0.60 | 0.03 | 2.10 | 0.10 |
| 59, 60, 61, 62 | 0.10, 0.20, 0.40, 0.60 | 0.03 | 2.10 | 0.15 |
| 63, 64, 65, 66 | 0.10, 0.20, 0.40, 0.60 | 0.03 | 2.10 | 0.20 |
| 67, 68, 69, 70 | 0.10, 0.20, 0.40, 0.60 | 0.03 | 2.10 | 0.25 |
| 71, 72, 73, 74 | 0.10, 0.20, 0.40, 0.60 | 0.03 | 4.10 | 0.10 |
| 75, 76, 77, 78 | 0.10, 0.20, 0.40, 0.60 | 0.03 | 4.10 | 0.15 |
| 79, 80, 81, 82 | 0.10, 0.20, 0.40, 0.60 | 0.03 | 4.10 | 0.20 |

TABLE 3-continued

| Drawing number | Supply gas carbon dioxide mole fraction $X_{0\_co2}$ [—] | AGR outlet carbon dioxide mole fraction $X_{1\_co2}$ [—] | Carbon dioxide non-permeation side pressure $P_x$ [MPaA] | Carbon dioxide permeation side pressure $P_Y$ [MPaA] |
|---|---|---|---|---|
| 83, 84, 85, 86 | 0.10, 0.20, 0.40, 0.60 | 0.03 | 4.10 | 0.25 |
| 87, 88, 89, 90 | 0.10, 0.20, 0.40, 0.60 | 0.03 | 6.10 | 0.10 |
| 91, 92, 93, 94 | 0.10, 0.20, 0.40, 0.60 | 0.03 | 6.10 | 0.15 |
| 95, 96, 97, 98 | 0.10, 0.20, 0.40, 0.60 | 0.03 | 6.10 | 0.20 |
| 99, 100, 101, 102 | 0.10, 0.20, 0.40, 0.60 | 0.03 | 6.10 | 0.25 |

The plots in FIGS. 7 to 102 indicate values of $X_{CO2}$ in the Table corresponding to each graph (energy relative value required for carbon dioxide recovery in each plot), which is placed together with the graph in each drawing. A to G of the plots in FIGS. 7 to 102 indicate A (ideal separation factor=50), B (ideal separation factor=65), C (ideal separation factor=80), D (ideal separation factor=100), E (ideal separation factor=120), F (ideal separation factor=160), and G (ideal separation factor=200), and (1) to (5) indicate conditions in which the energy relative values are different from each other.

Further, five kinds of $X_{CO2}$ under (1) the condition in which the energy relative value calculated on the low side of carbon dioxide mole fraction is 110%, of (2) the lower limit value of carbon dioxide mole fraction when the energy relative value calculated on the low side of carbon dioxide mole fraction is larger than 100% and less than 110%, of (3) the optimal value (energy relative value is 100%), of (4) the upper limit value of carbon dioxide mole fraction when the energy relative value calculated on the high side of carbon dioxide mole fraction is larger than 100% and less than 110%, and under (5) the condition in which the energy relative value calculated on the high side of carbon dioxide mole fraction is 110% are plotted. The energy relative value corresponding to each plot is shown in the Table placed on the bottom part of each drawing.

Figure 15:
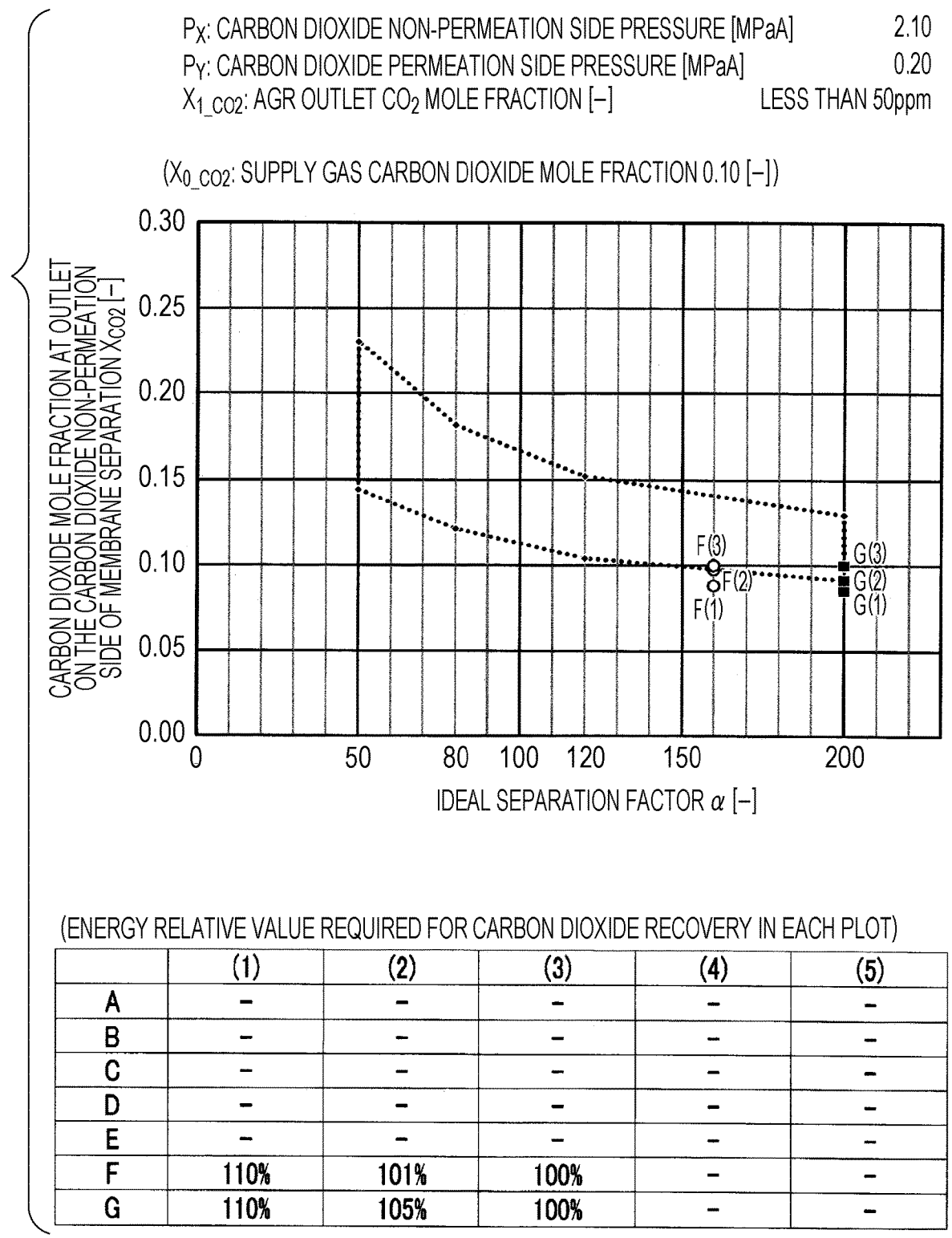
FIG. 15 is a diagram showing evaluation results by simulation.
Figure 16:
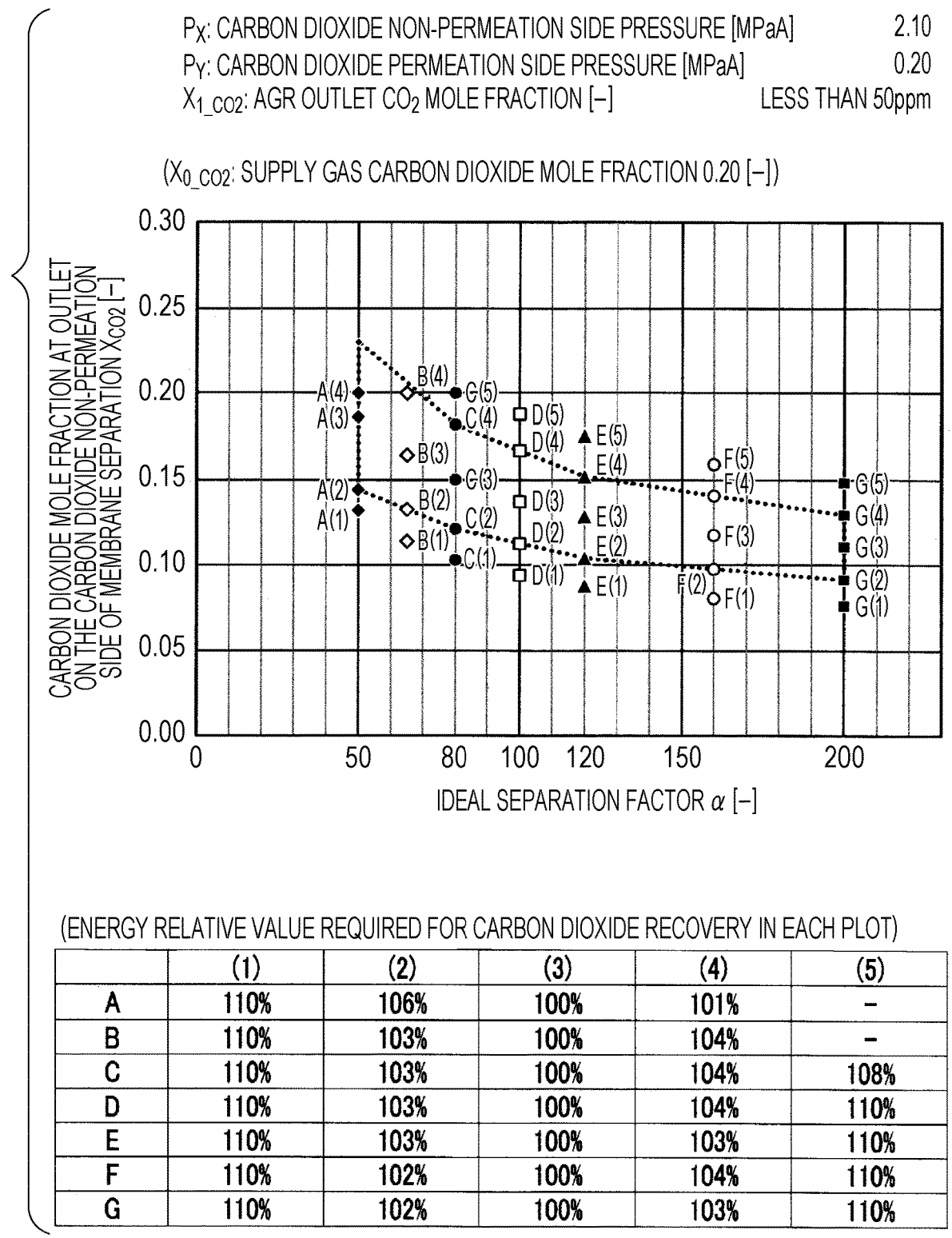
FIG. 16 is a diagram showing evaluation results by simulation.
Figure 17:
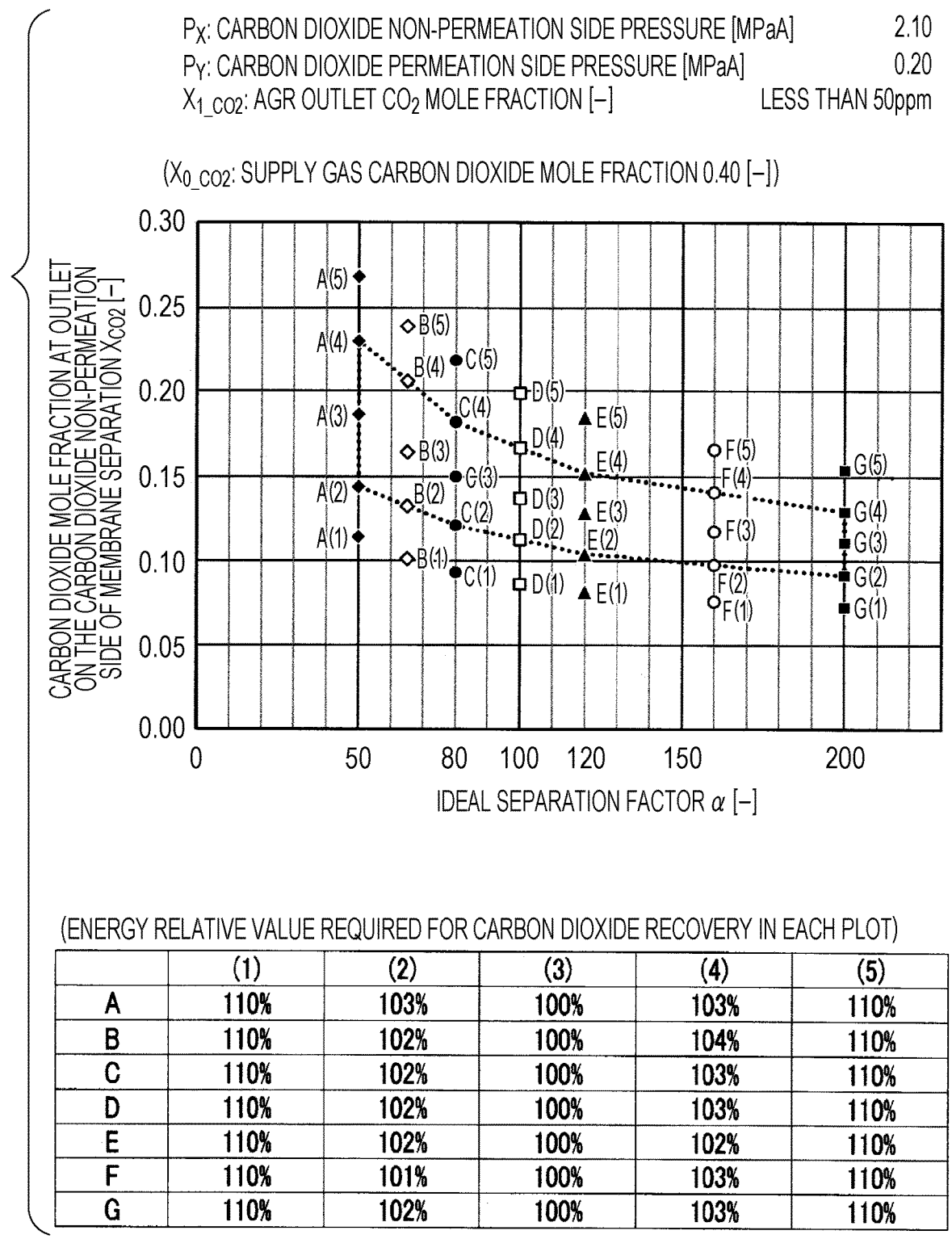
FIG. 17 is a diagram showing evaluation results by simulation.
Figure 18:
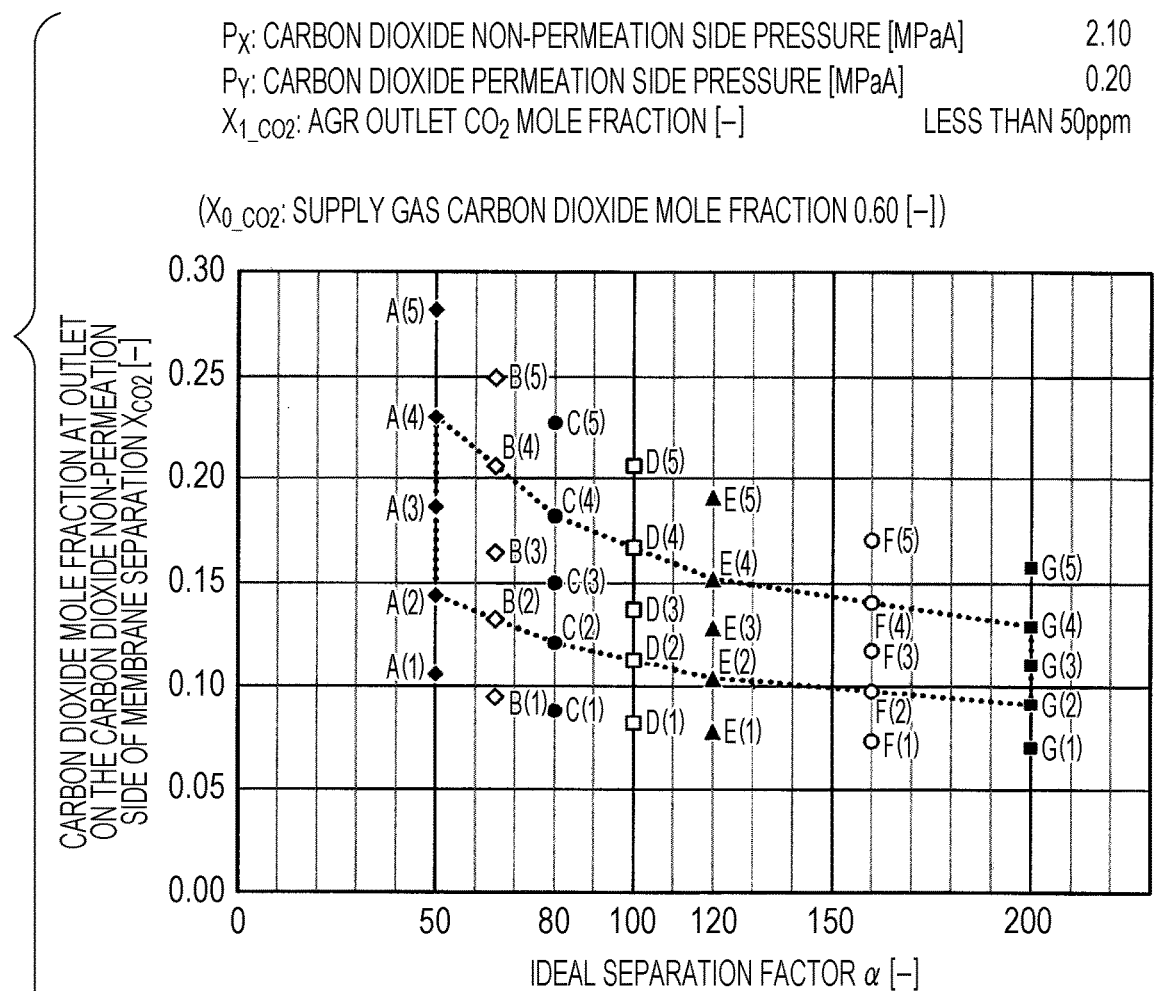
FIG. 18 is a diagram showing evaluation results by simulation.
Figure 19:
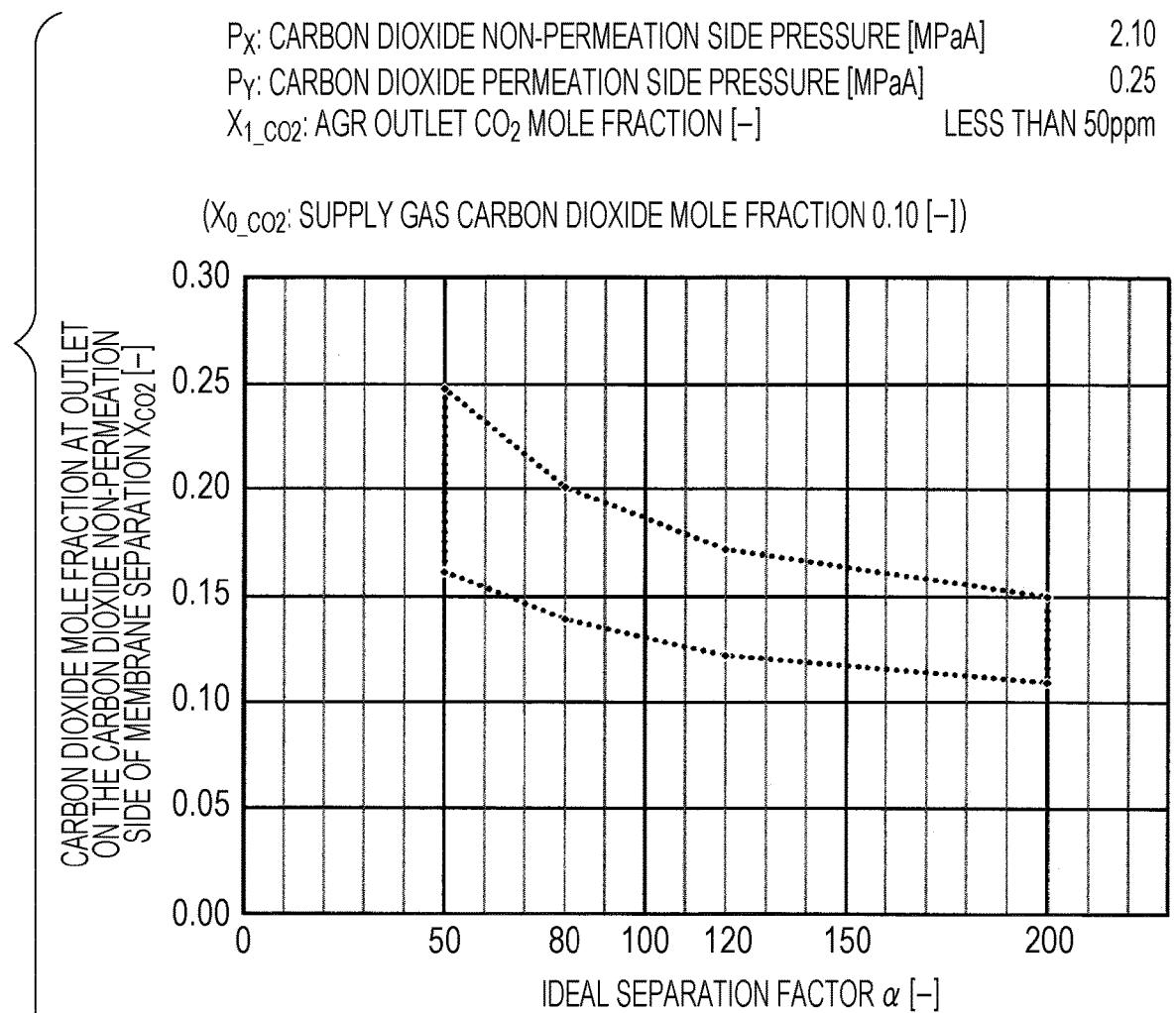
FIG. 19 is a diagram showing evaluation results by simulation.
Figure 20:
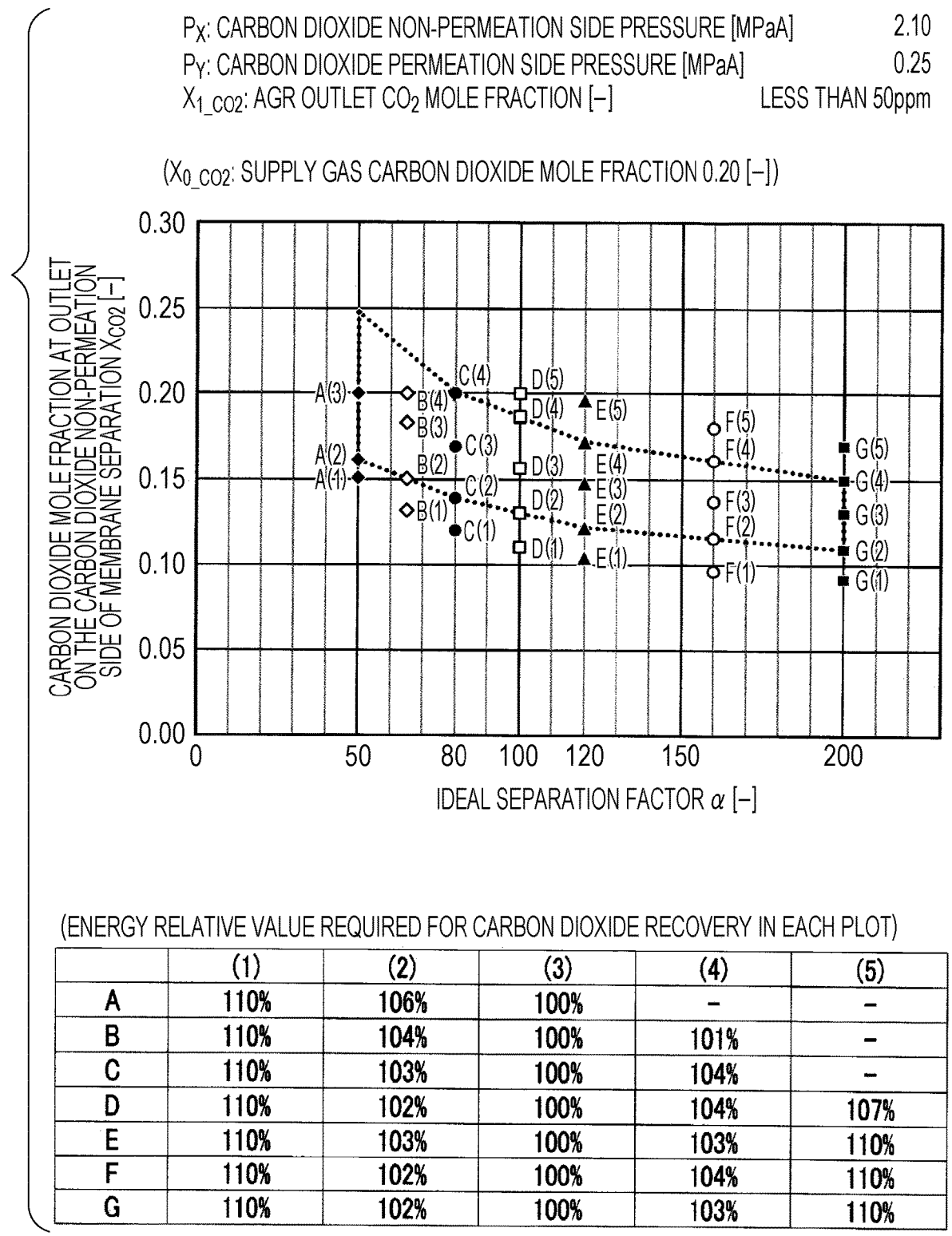
FIG. 20 is a diagram showing evaluation results by simulation.
Figure 21:
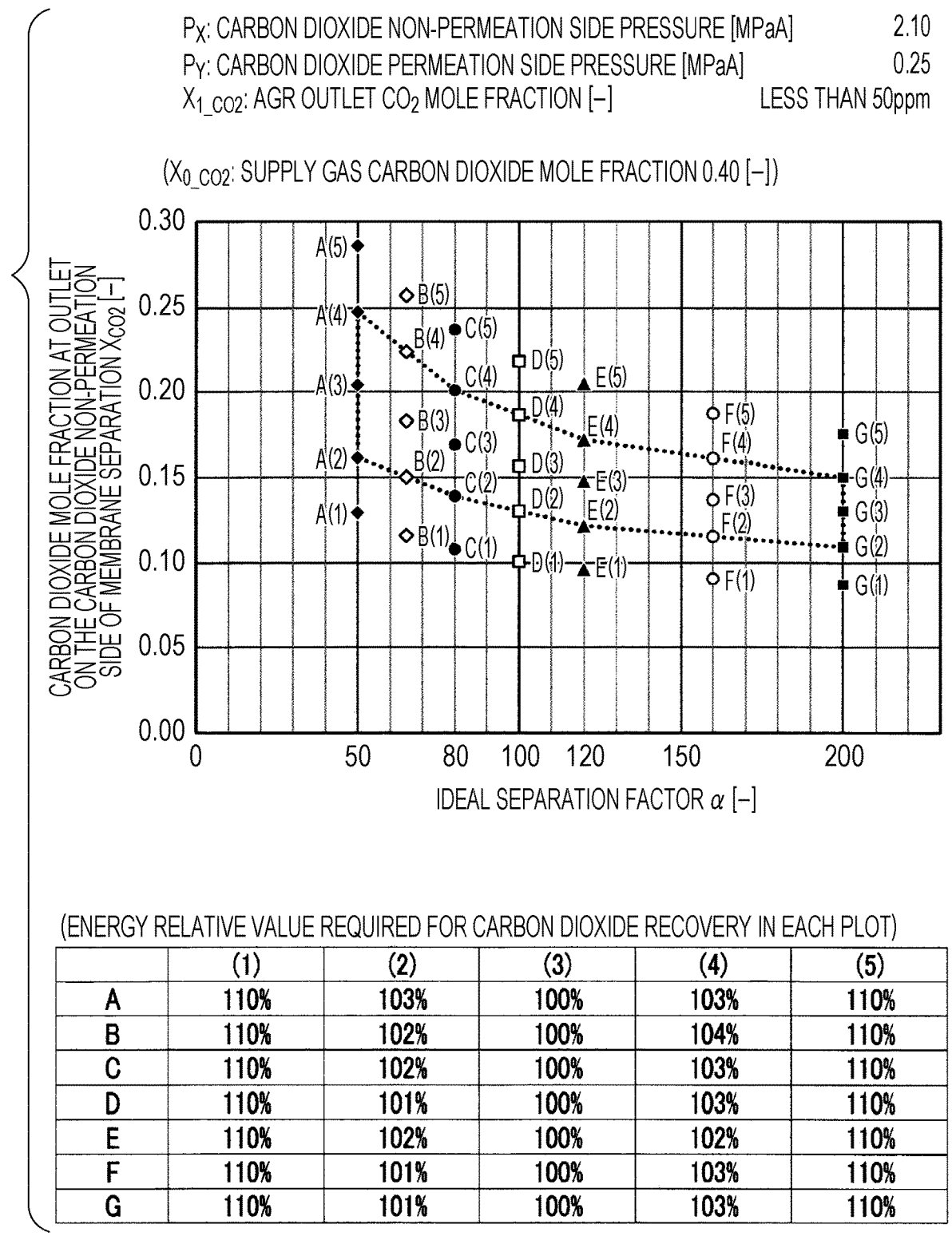
FIG. 21 is a diagram showing evaluation results by simulation.
Figure 22:
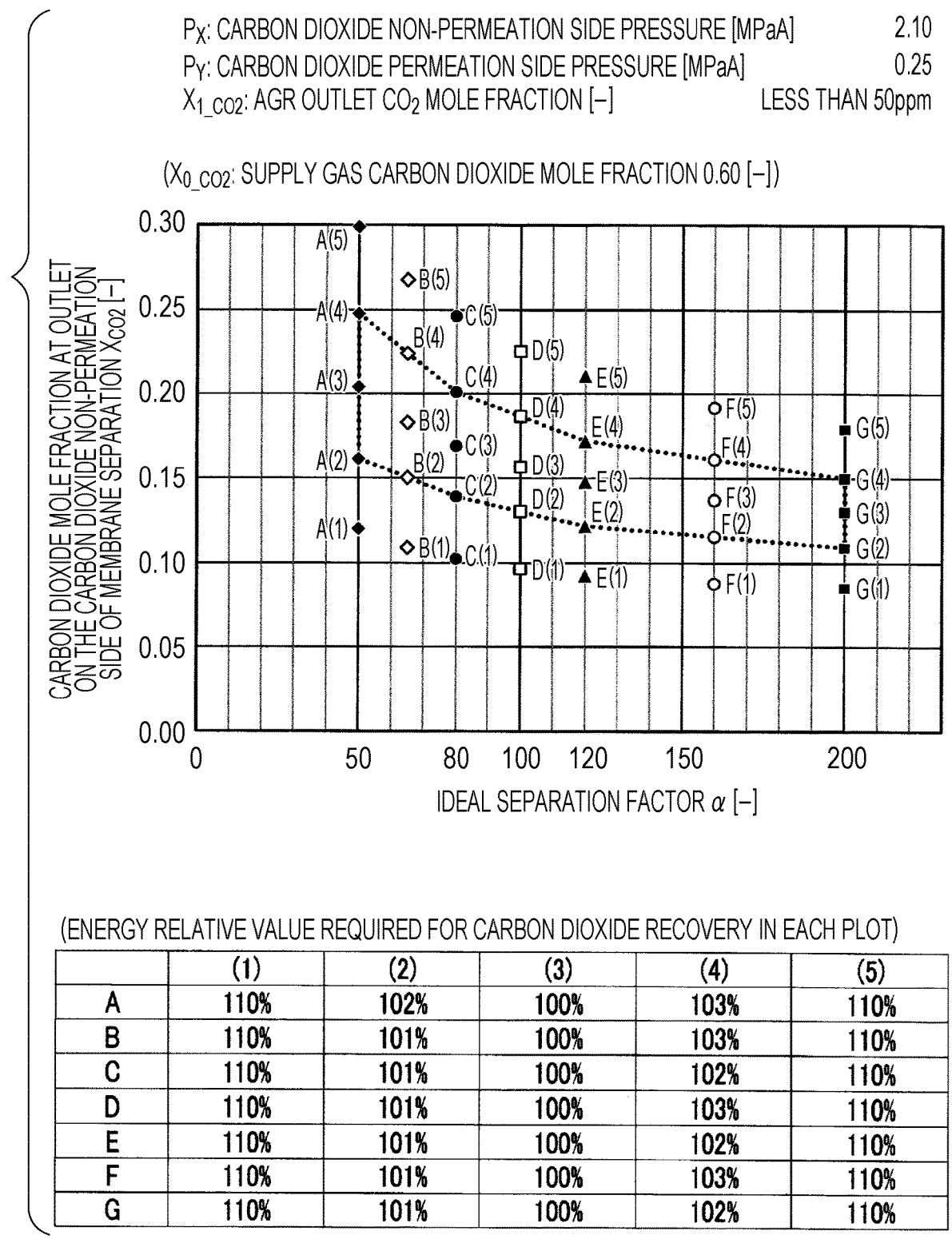
FIG. 22 is a diagram showing evaluation results by simulation.
Figure 23:
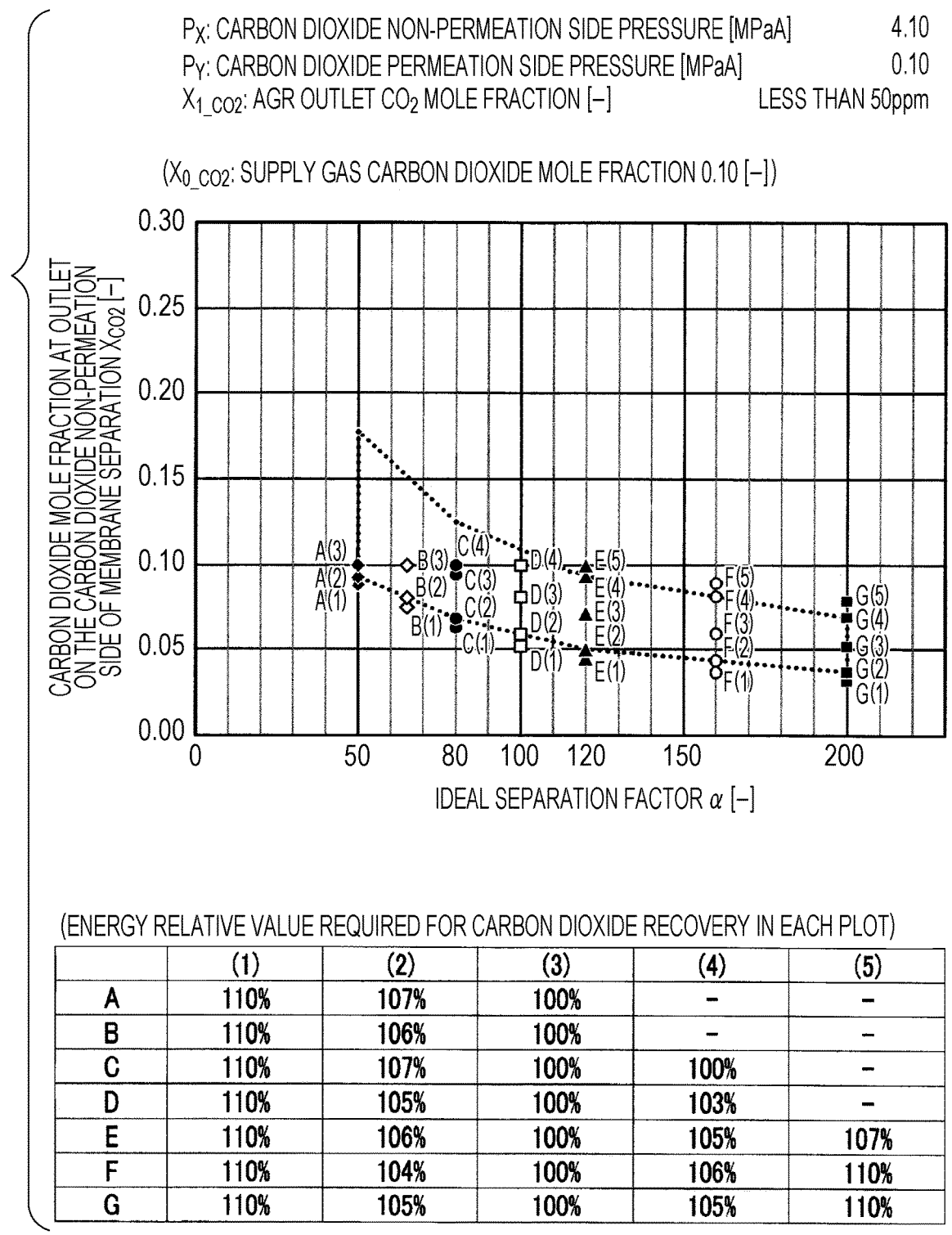
FIG. 23 is a diagram showing evaluation results by simulation.
Figure 24:
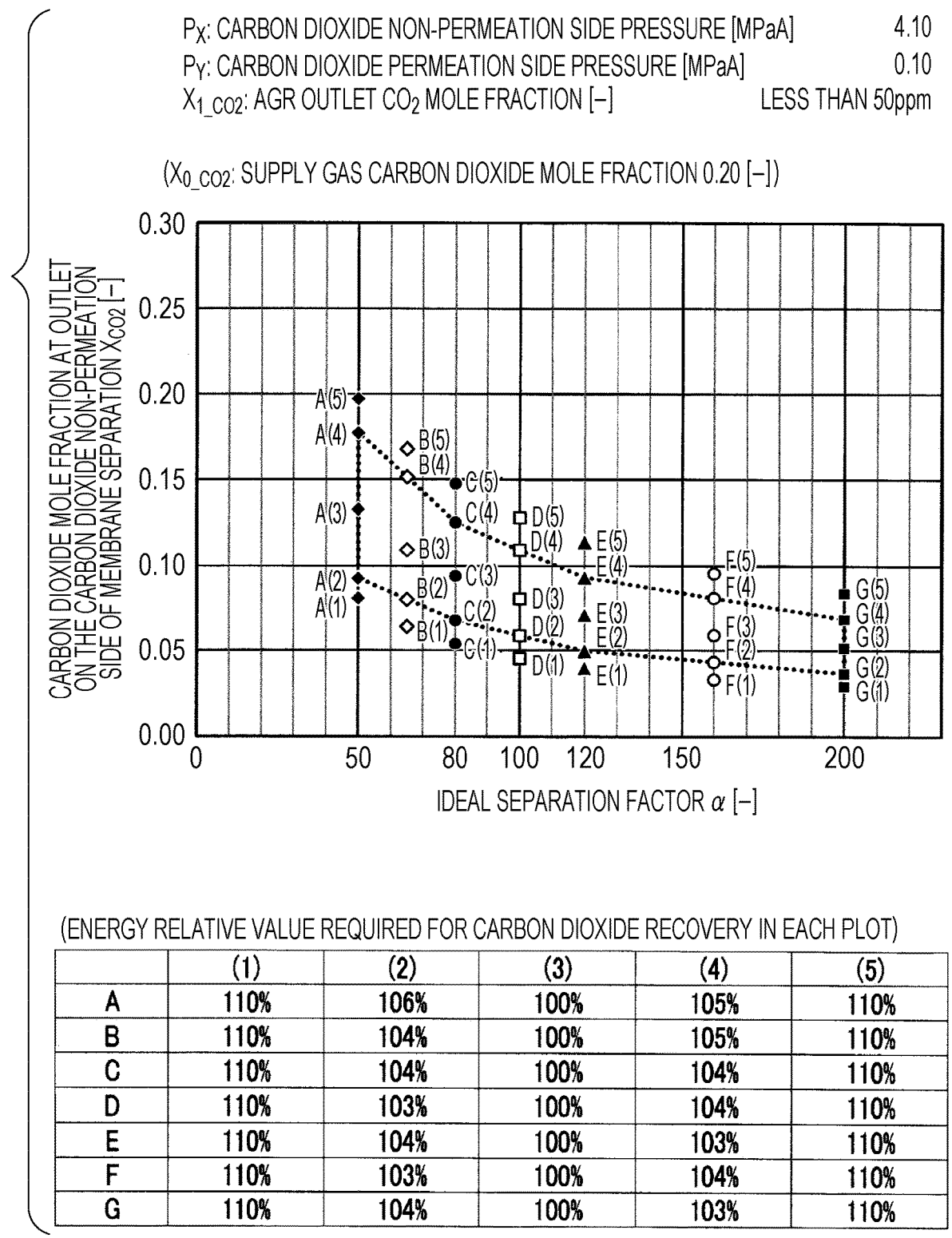
FIG. 24 is a diagram showing evaluation results by simulation.
Figure 25:
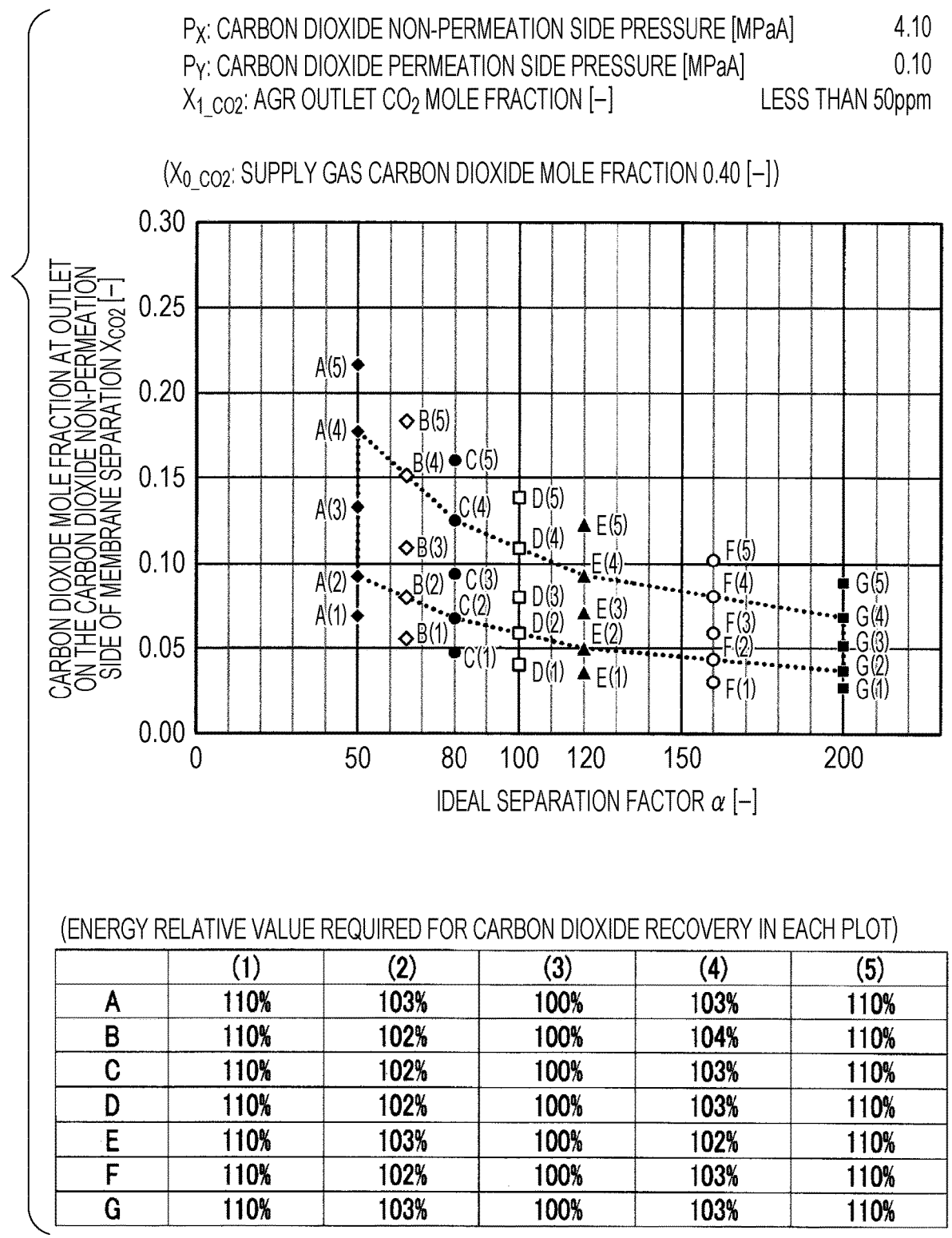
FIG. 25 is a diagram showing evaluation results by simulation.
Figure 26:
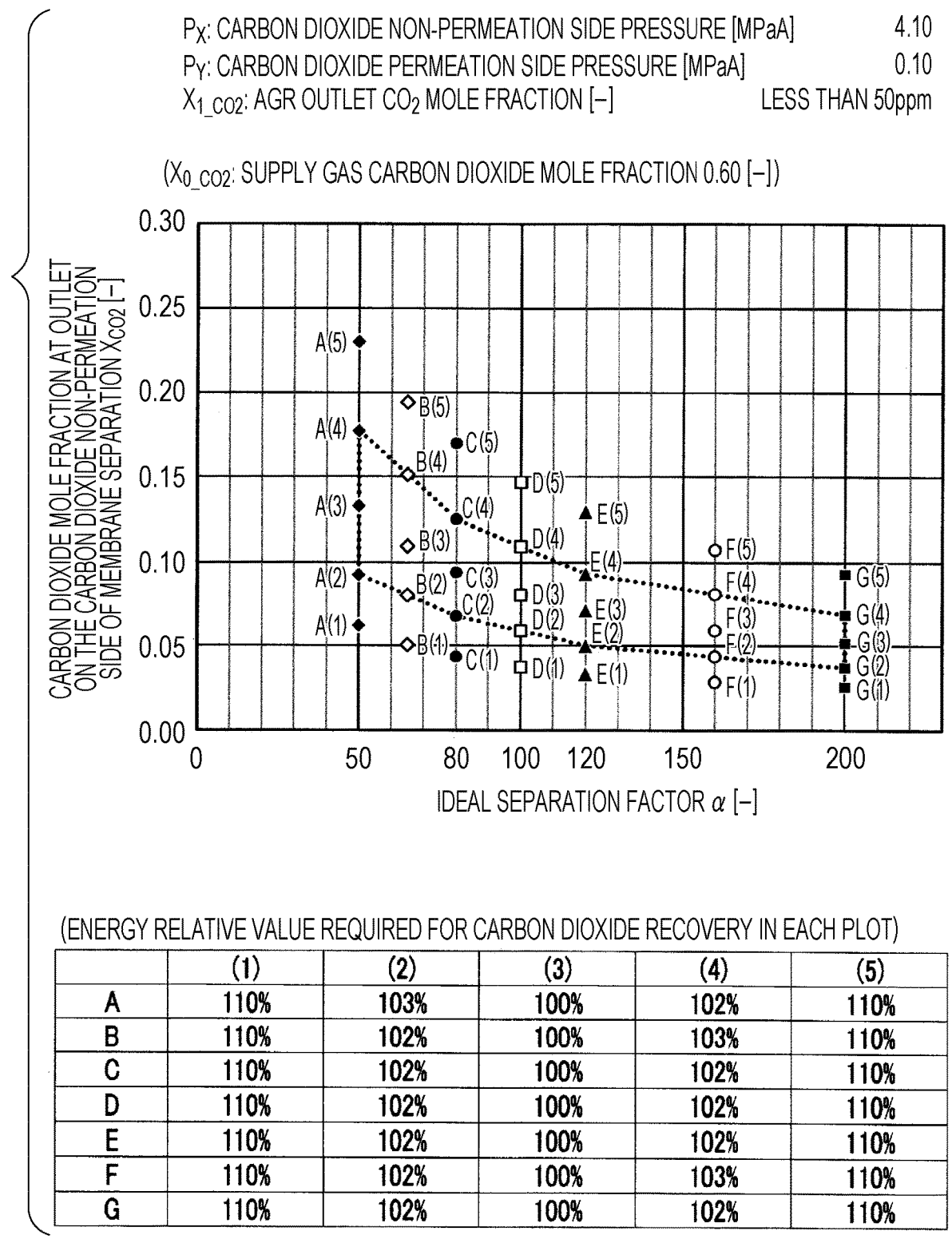
FIG. 26 is a diagram showing evaluation results by simulation.
Figure 27:
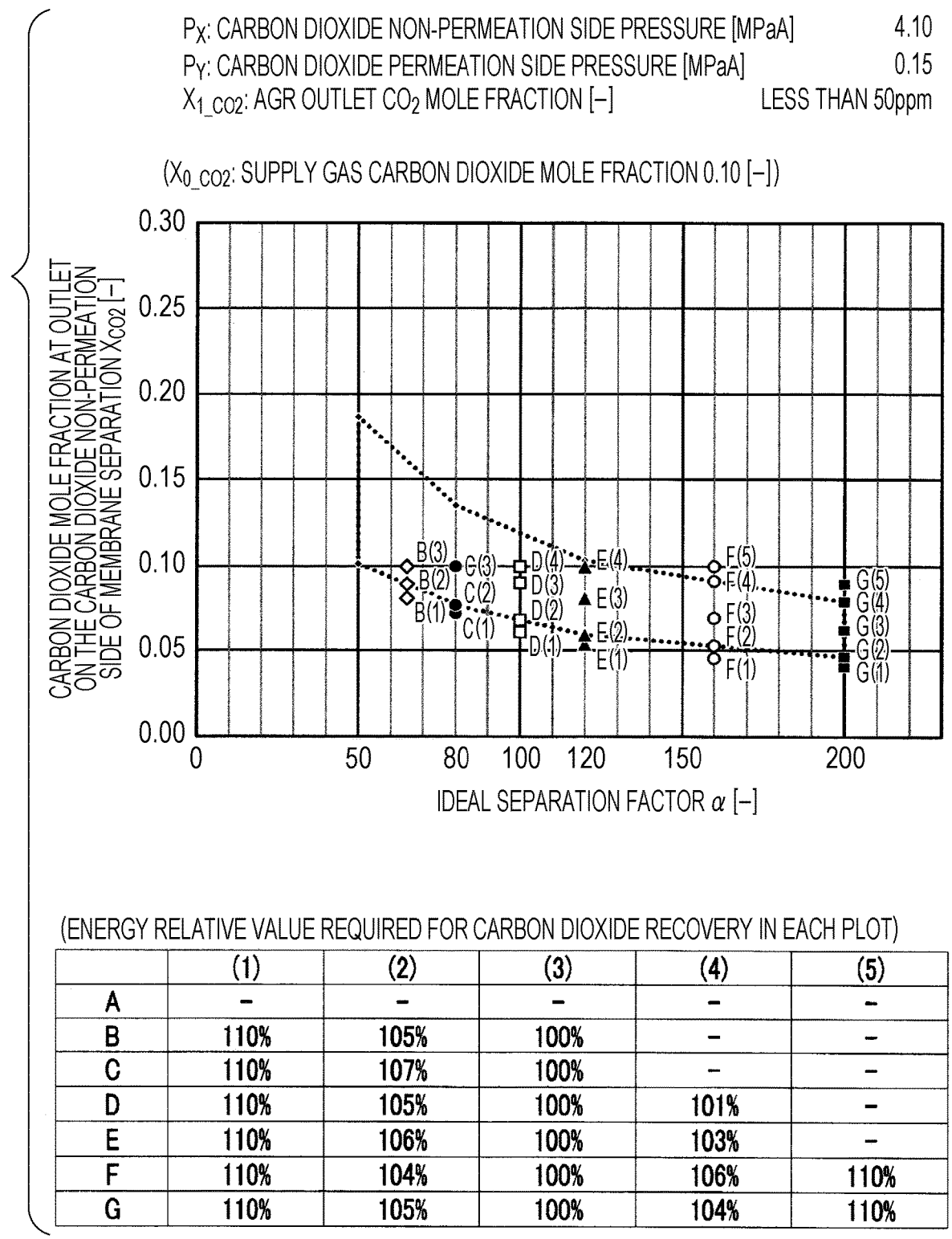
FIG. 27 is a diagram showing evaluation results by simulation.
Figure 28:
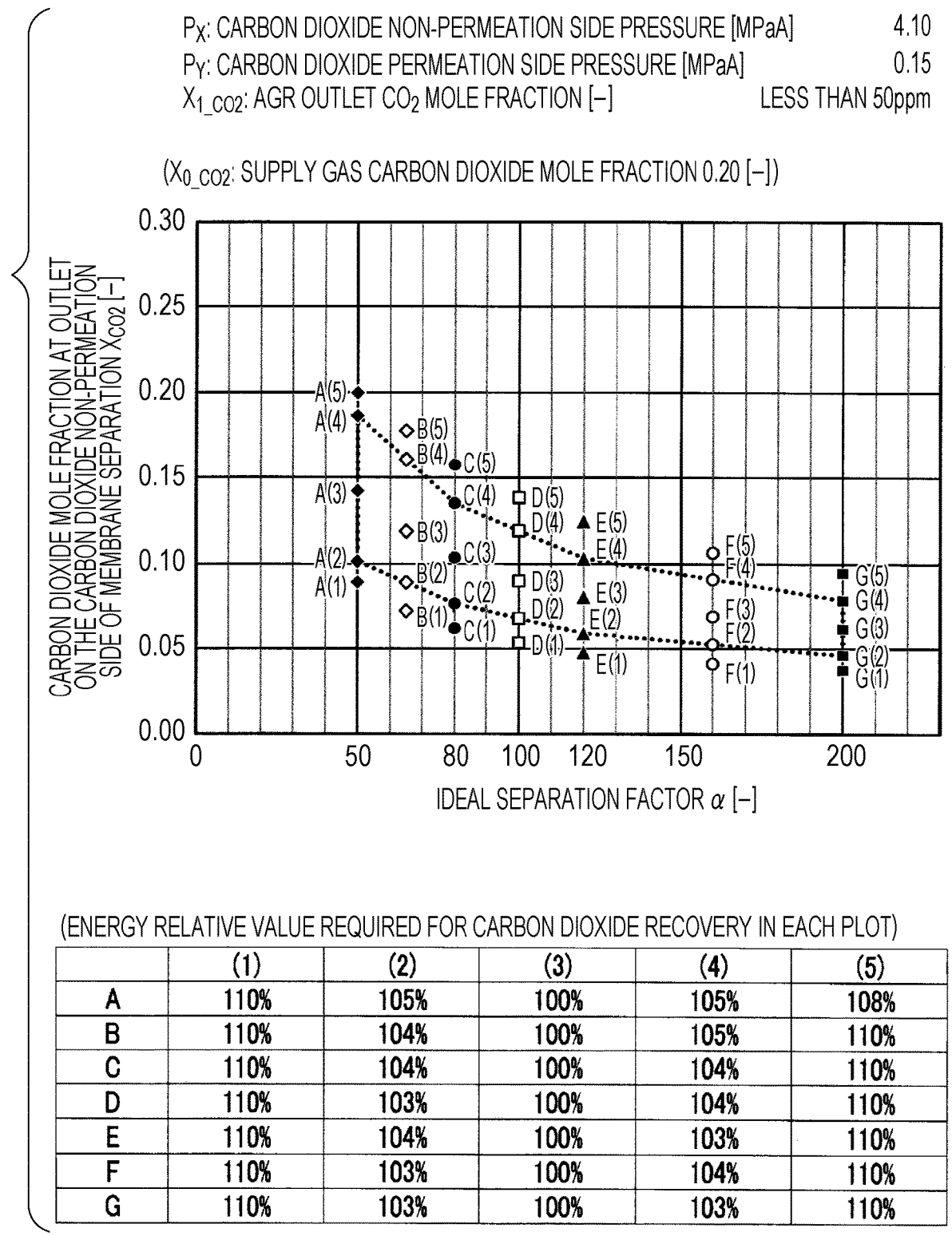
FIG. 28 is a diagram showing evaluation results by simulation.
Figure 29:
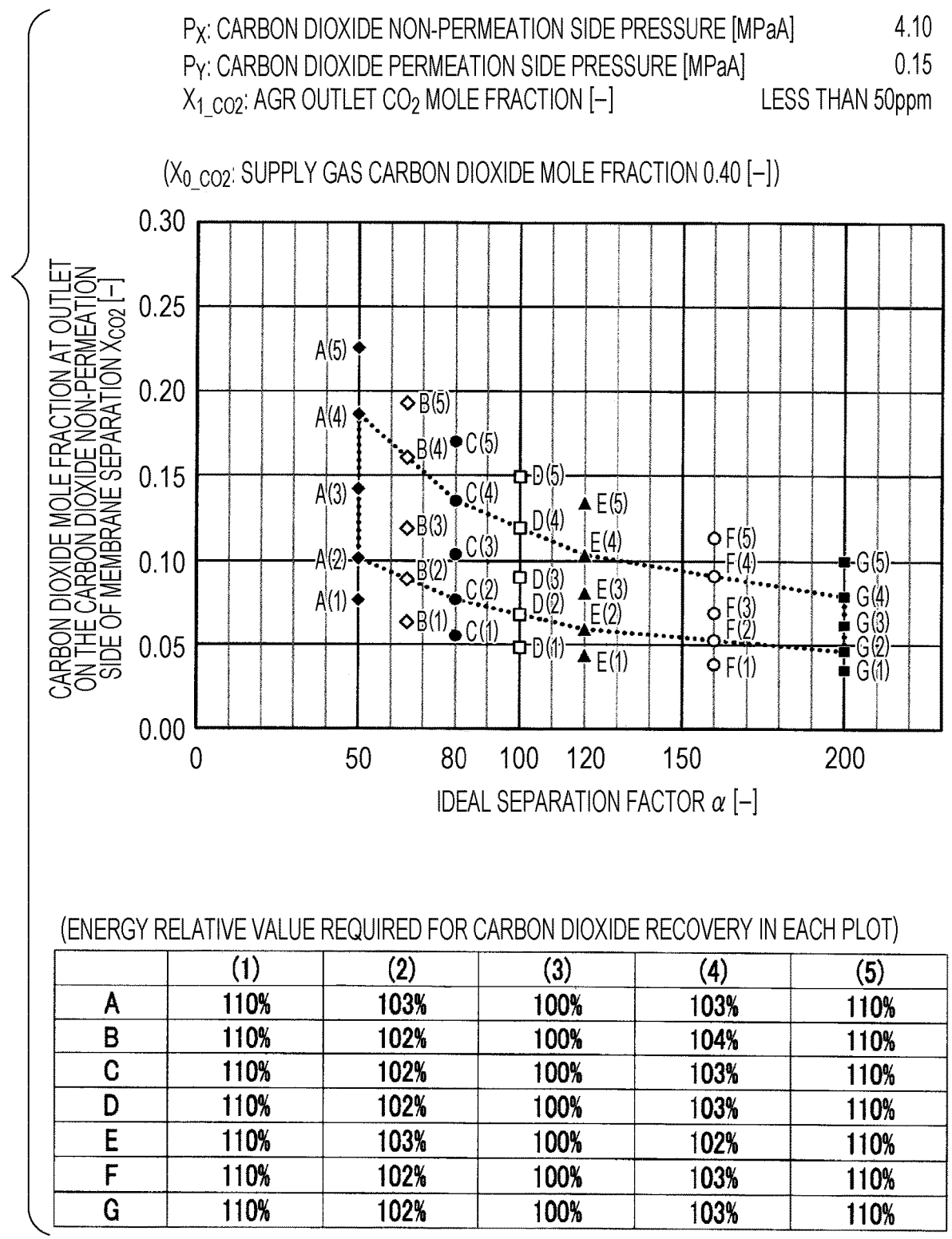
FIG. 29 is a diagram showing evaluation results by simulation.
Figure 30:
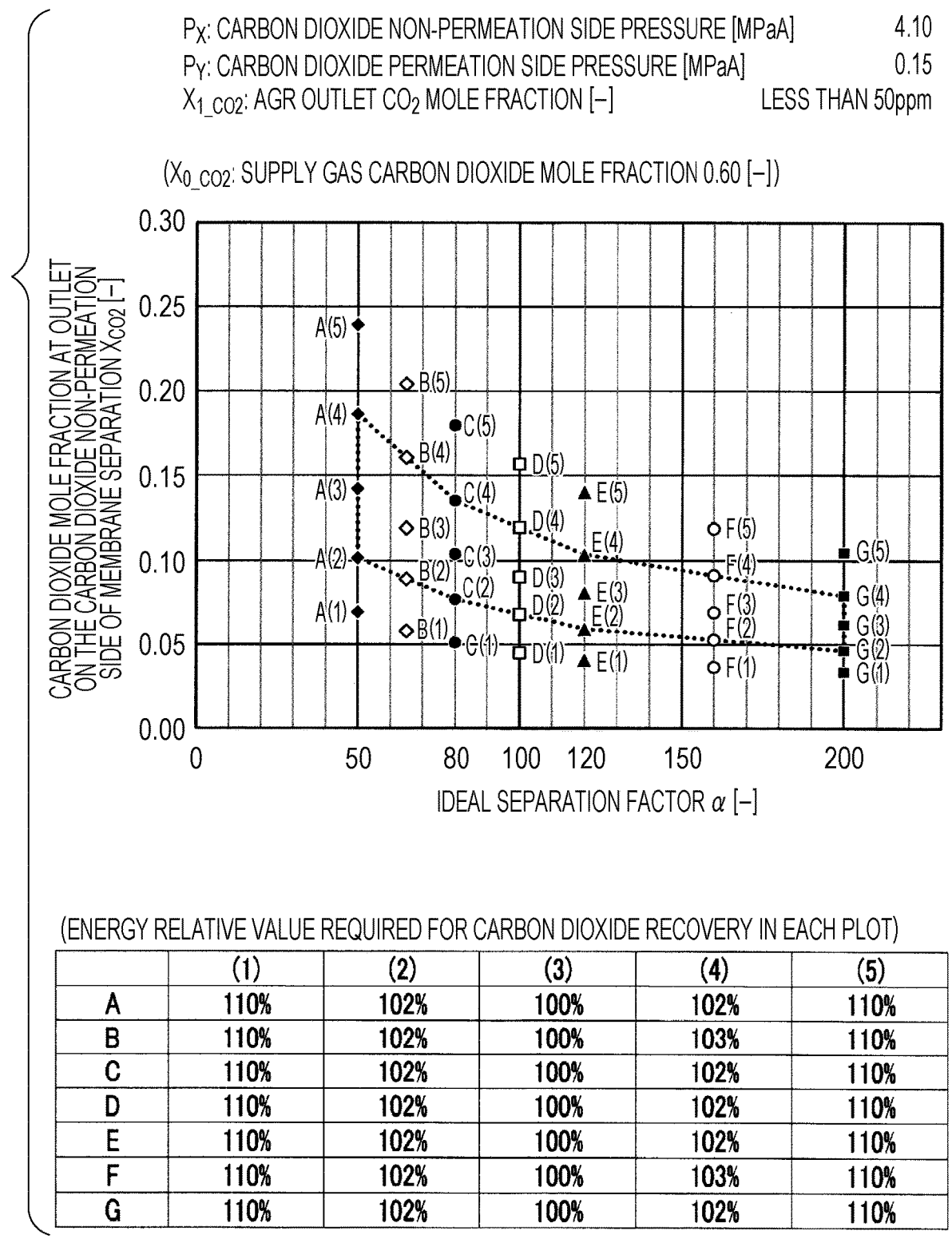
FIG. 30 is a diagram showing evaluation results by simulation.
Figure 31:
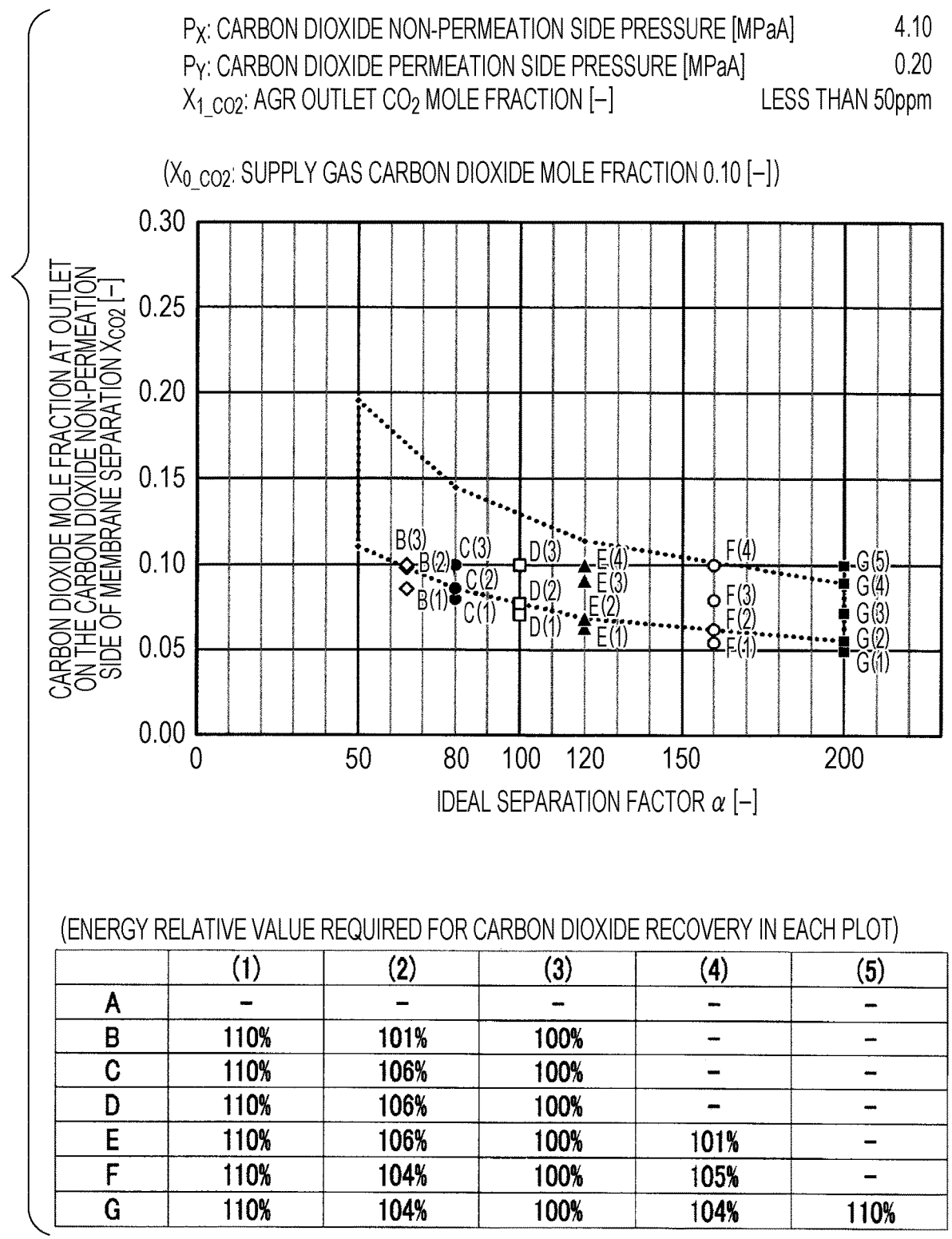
FIG. 31 is a diagram showing evaluation results by simulation.
Figure 32:
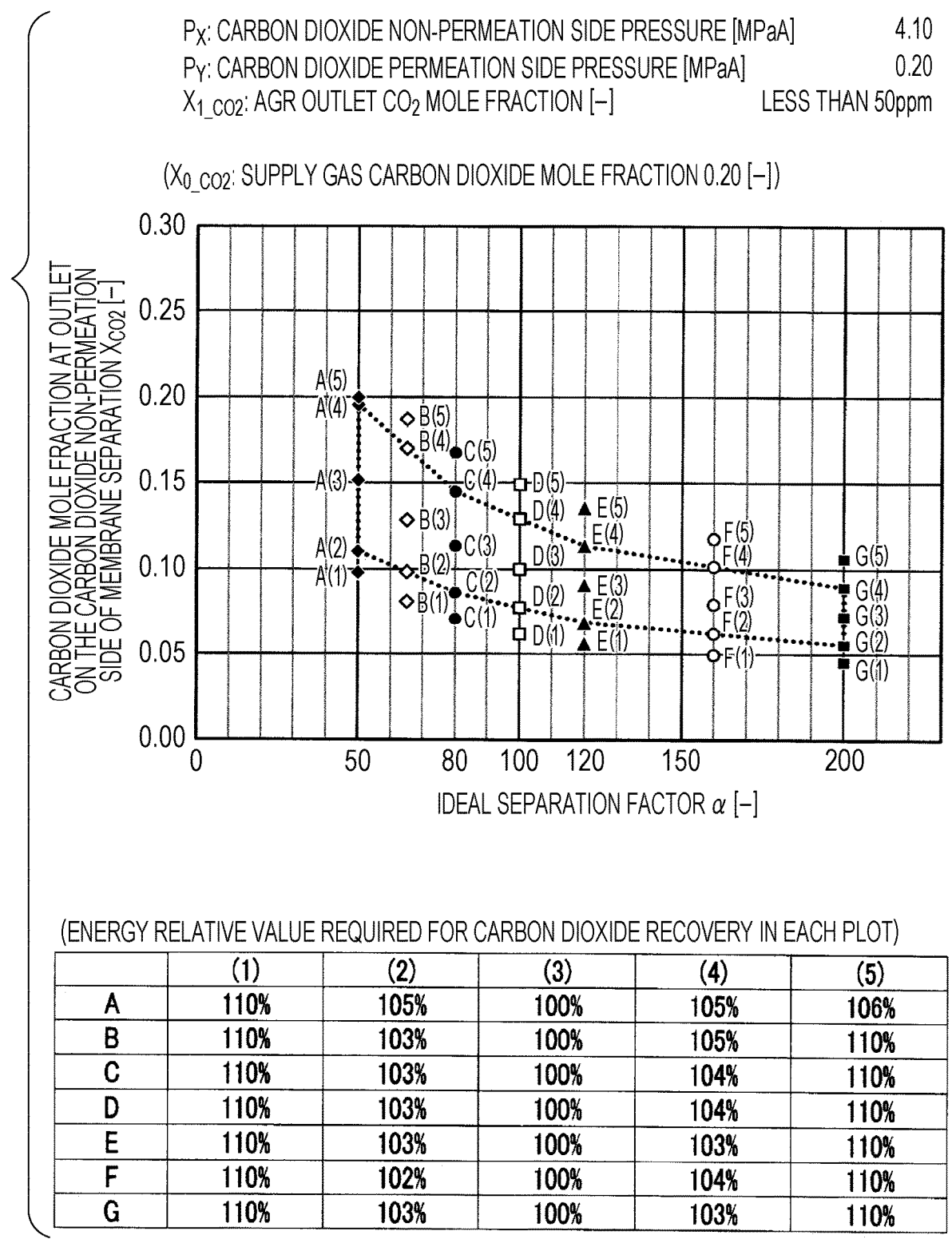
FIG. 32 is a diagram showing evaluation results by simulation.
Figure 33:
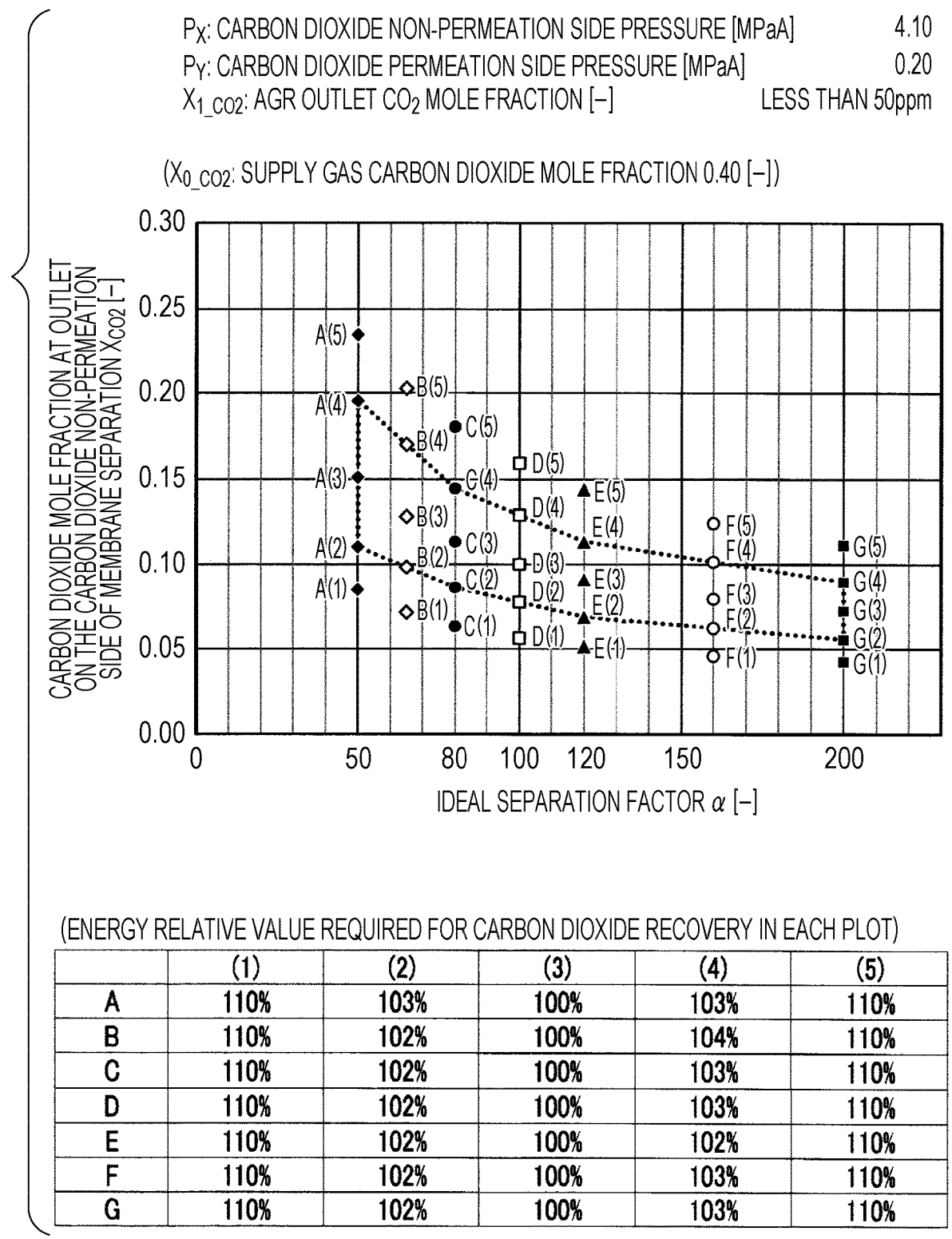
FIG. 33 is a diagram showing evaluation results by simulation.
Figure 34:
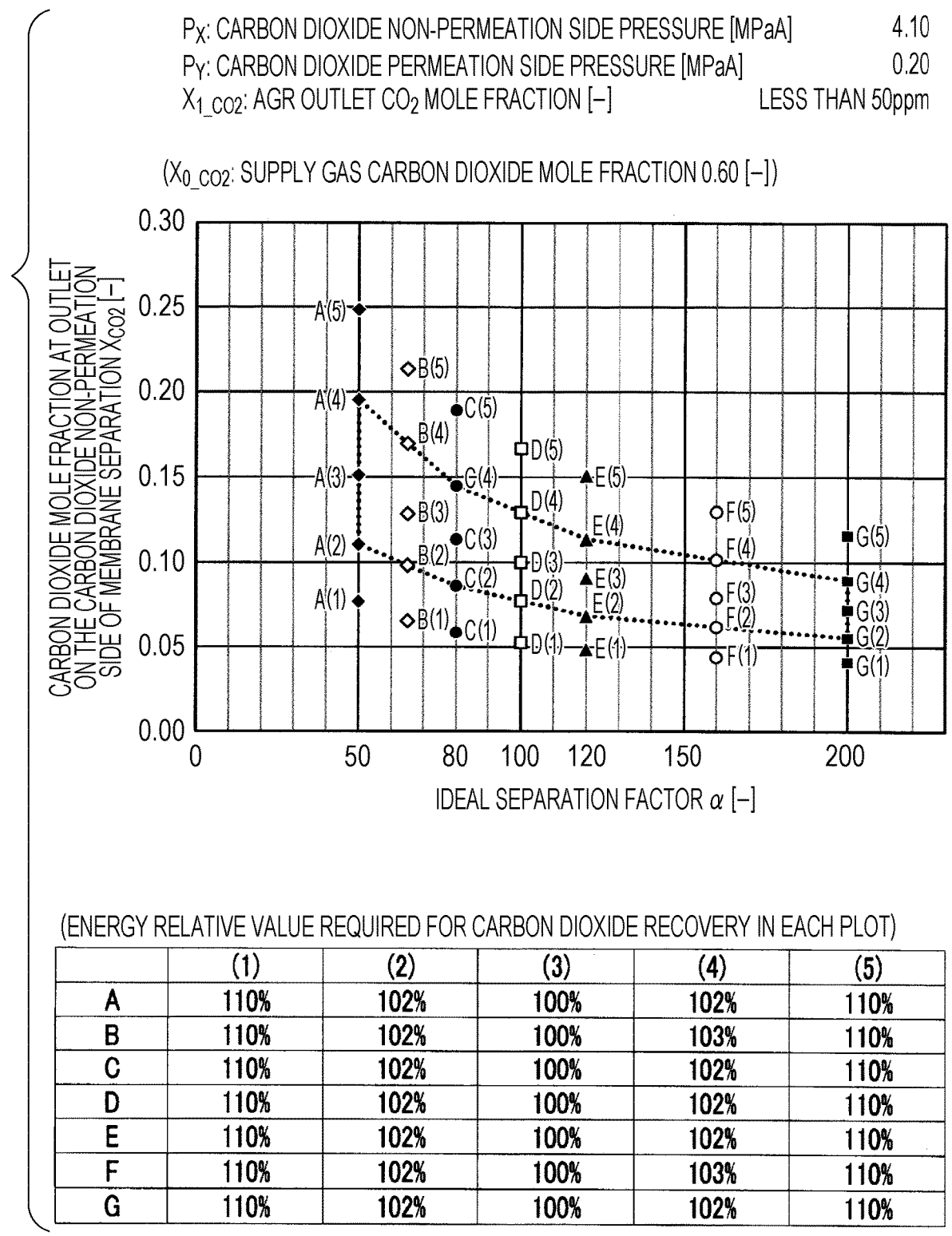
FIG. 34 is a diagram showing evaluation results by simulation.
Figure 35:
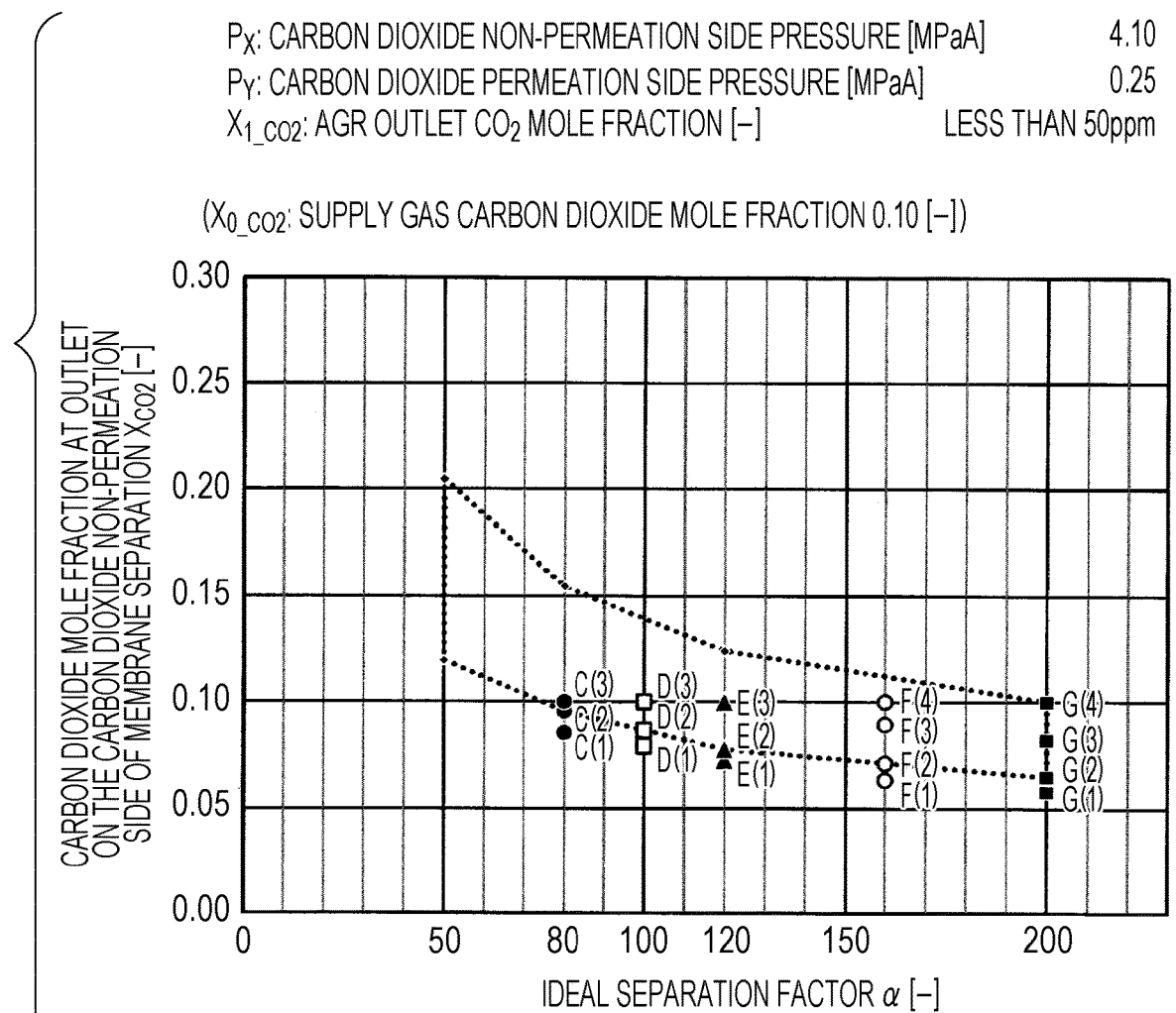
FIG. 35 is a diagram showing evaluation results by simulation.
Figure 36:
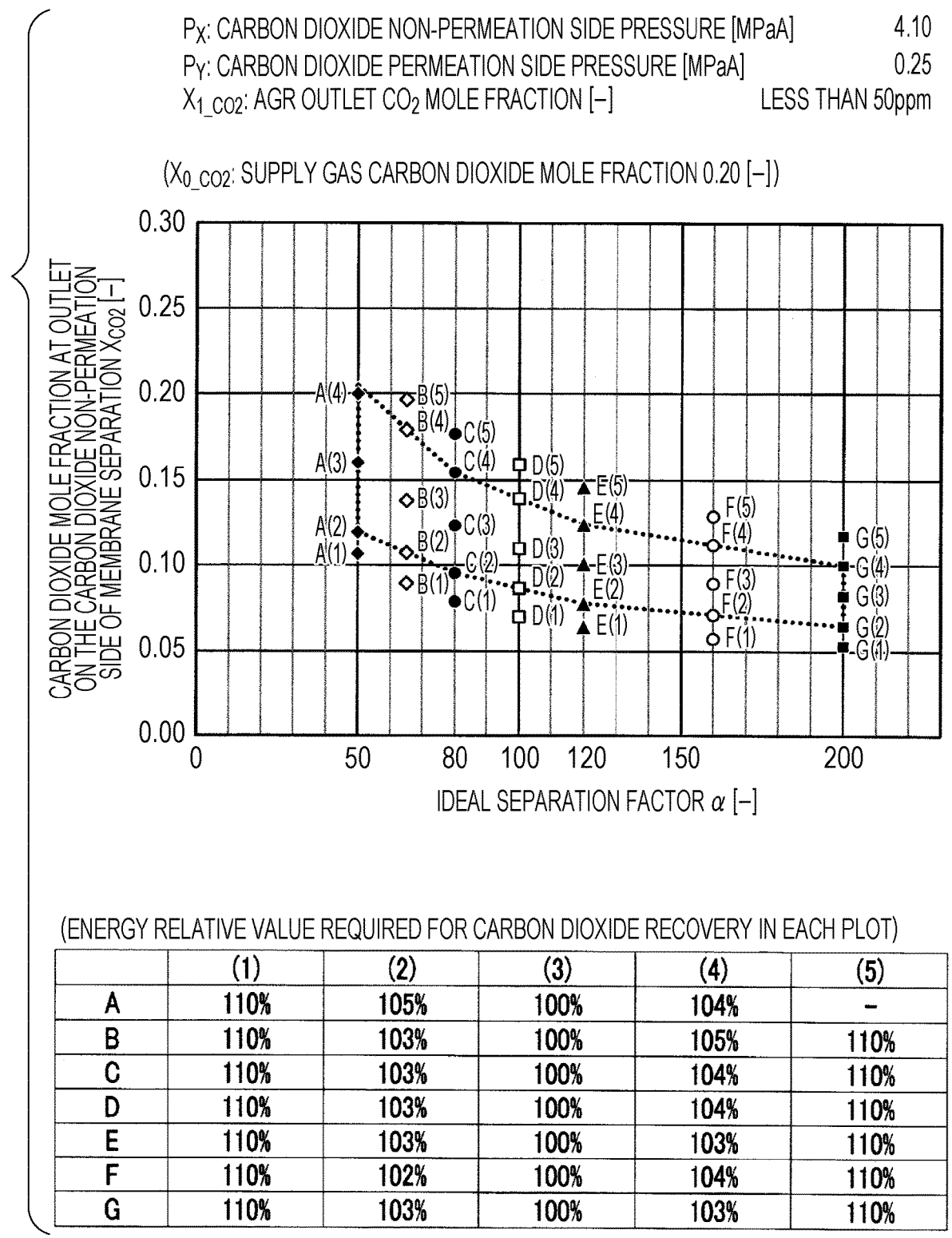
FIG. 36 is a diagram showing evaluation results by simulation.
Figure 37:
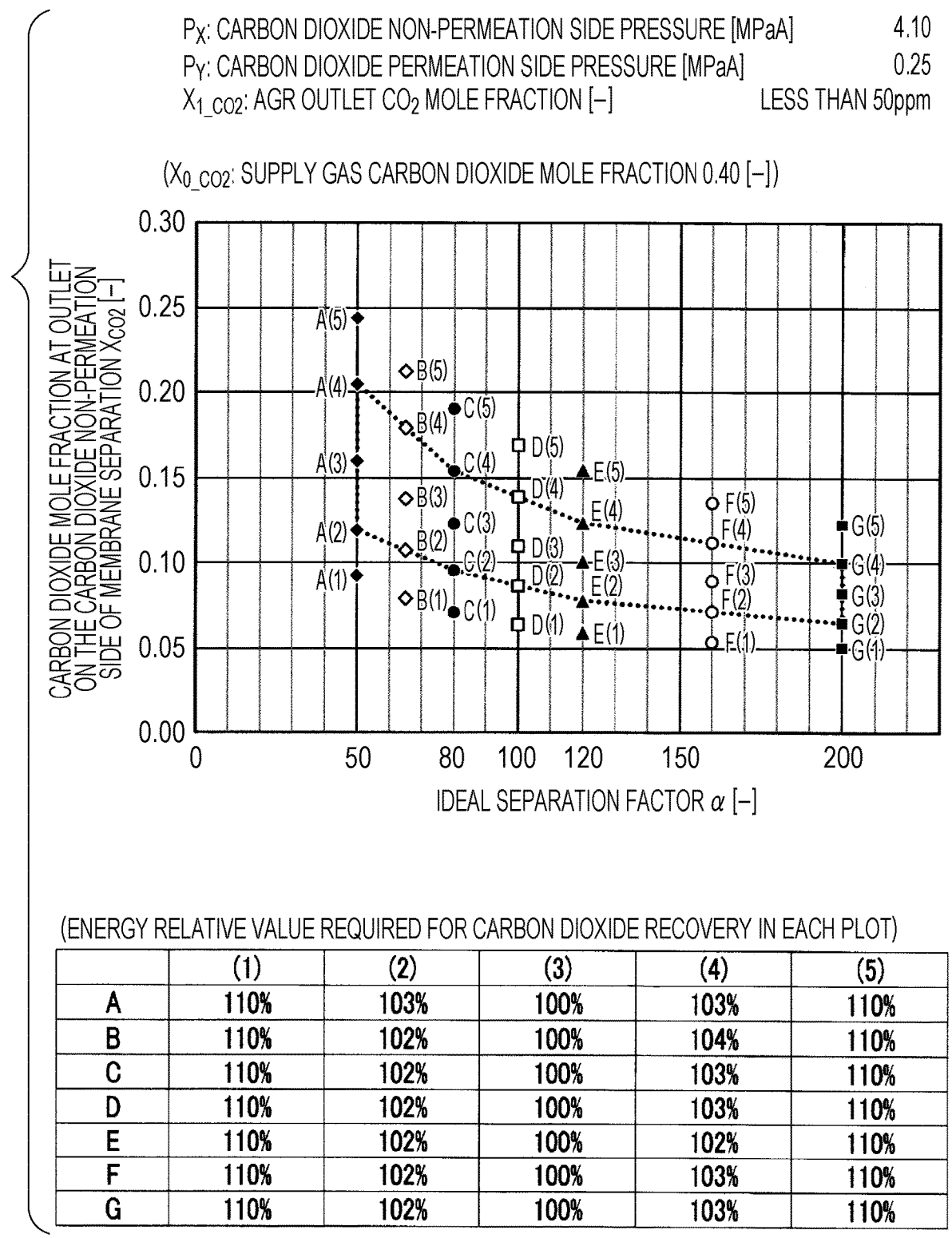
FIG. 37 is a diagram showing evaluation results by simulation.
Figure 38:
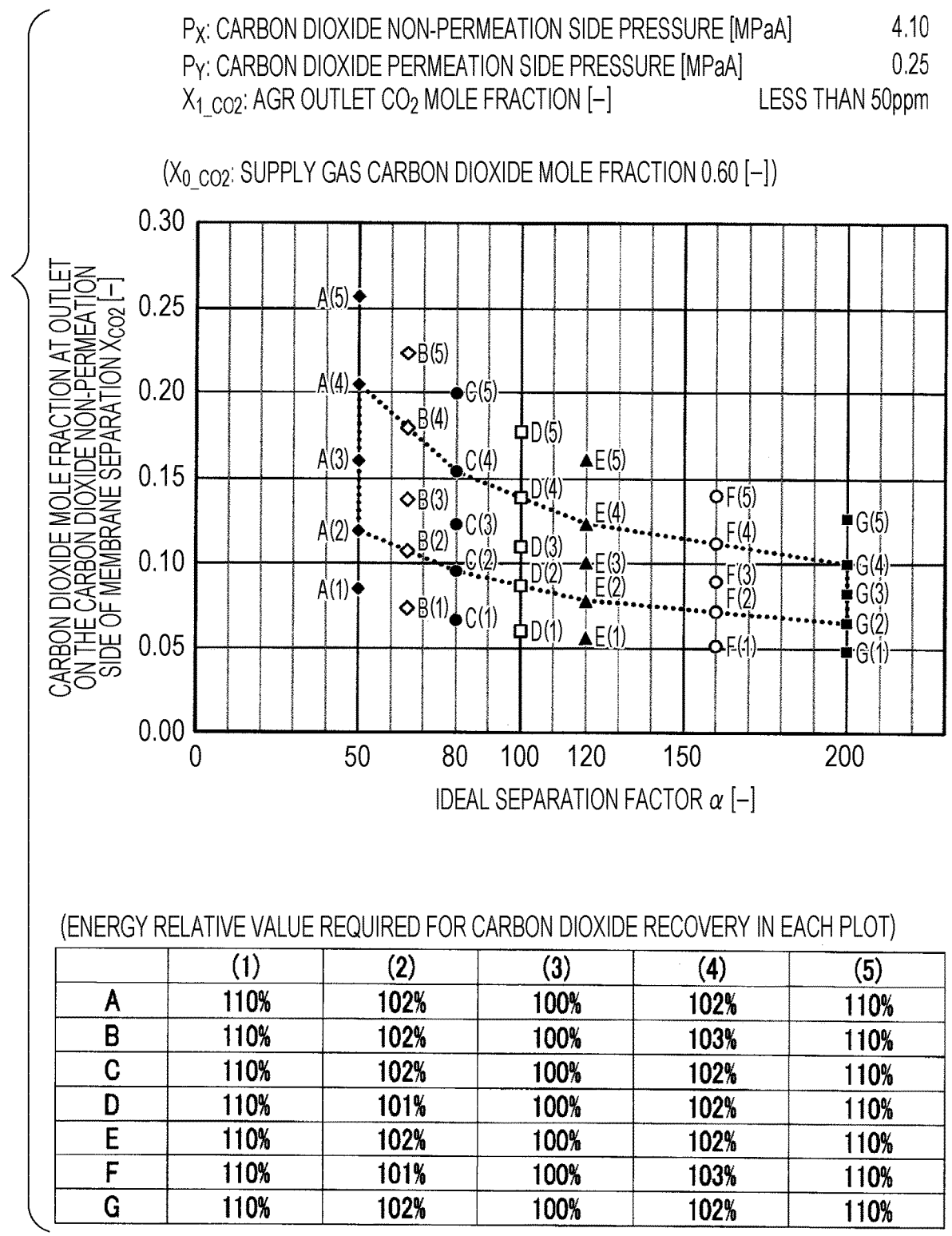
FIG. 38 is a diagram showing evaluation results by simulation.
Figure 39:
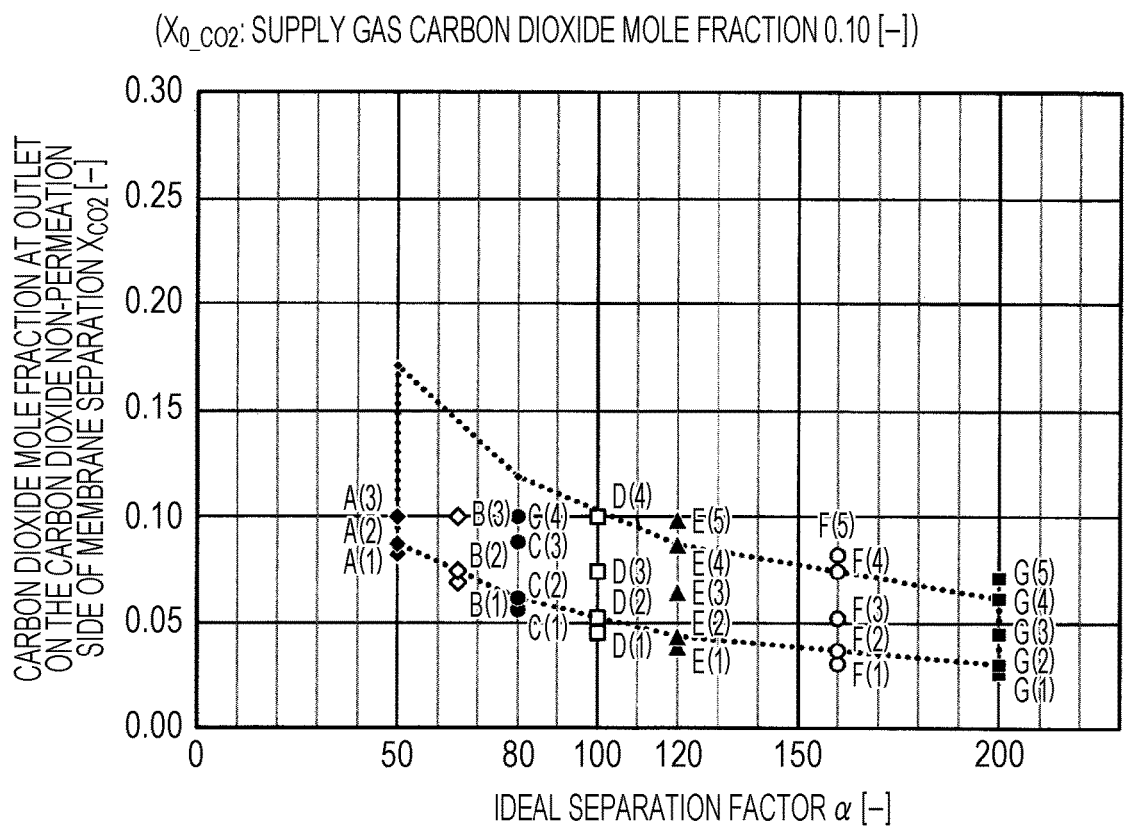
FIG. 39 is a diagram showing evaluation results by simulation.
Figure 40:
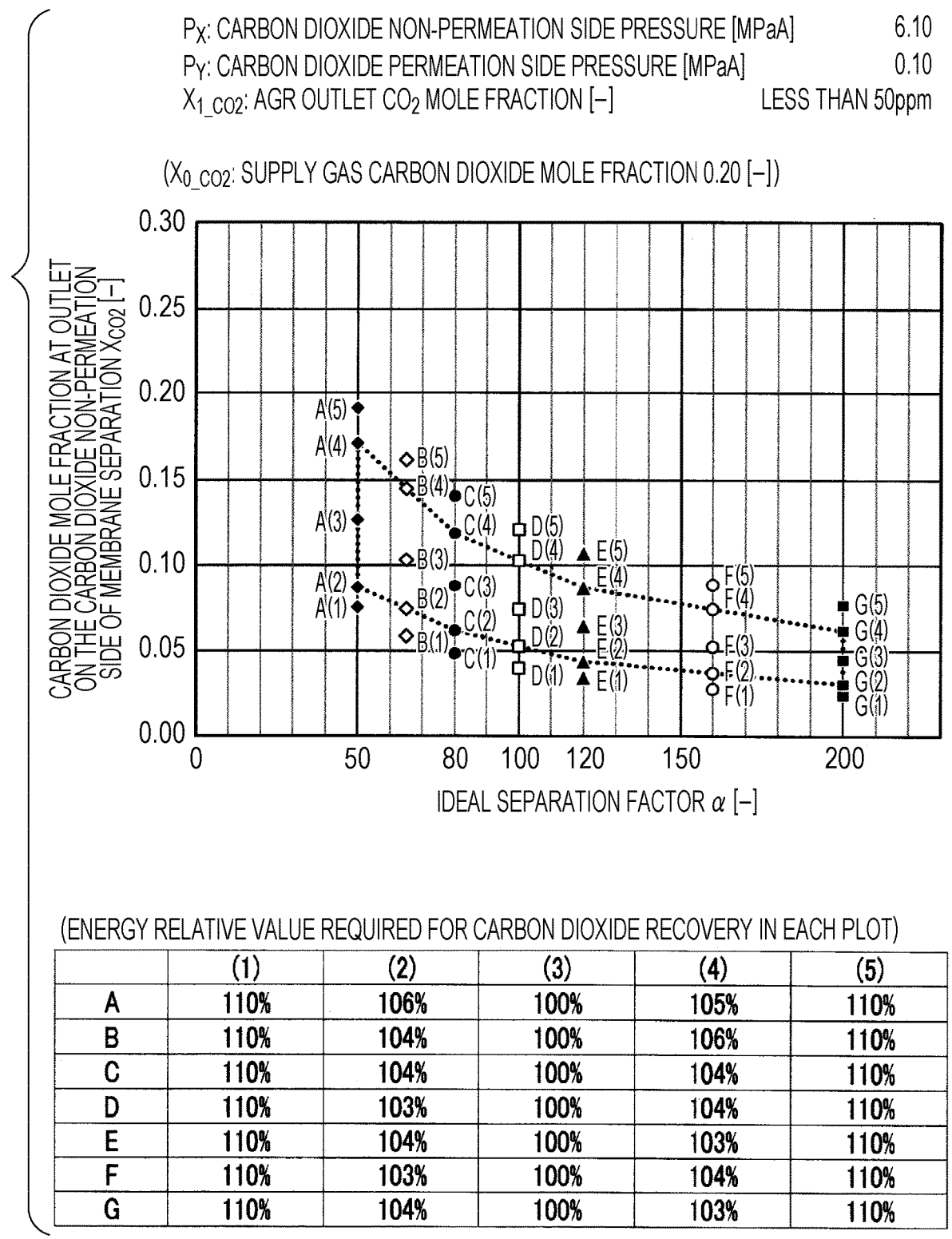
FIG. 40 is a diagram showing evaluation results by simulation.
Figure 41:
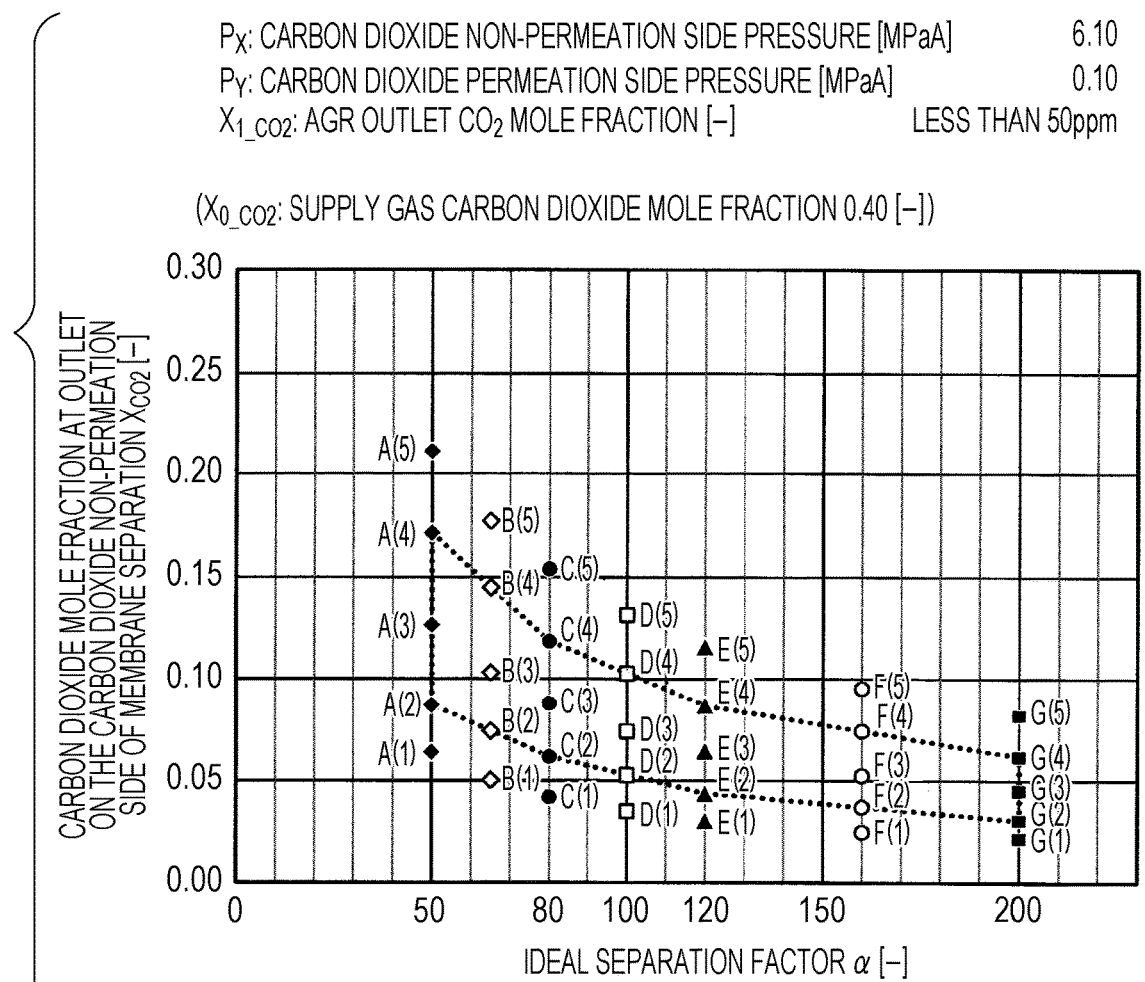
FIG. 41 is a diagram showing evaluation results by simulation.
Figure 42:
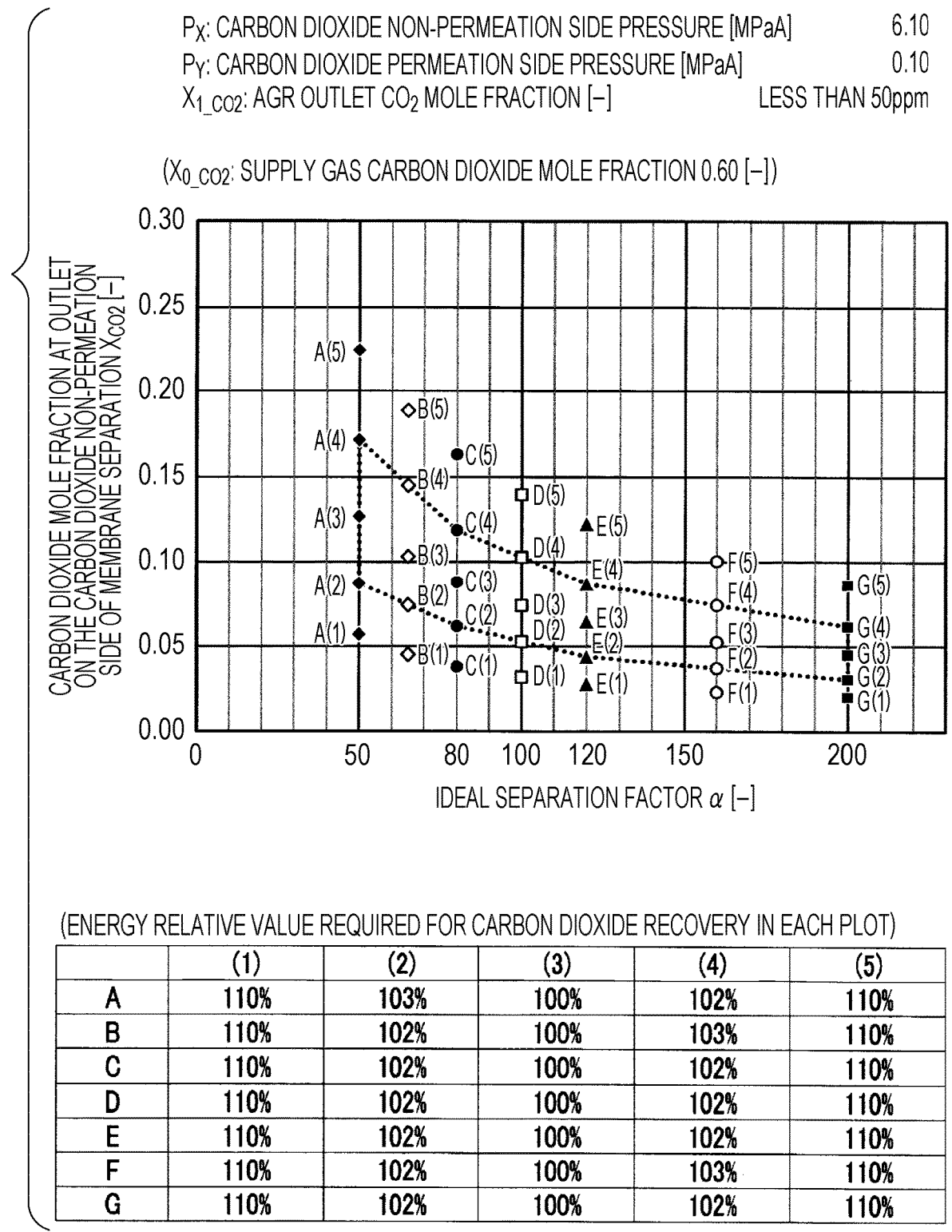
FIG. 42 is a diagram showing evaluation results by simulation.
Figure 43:
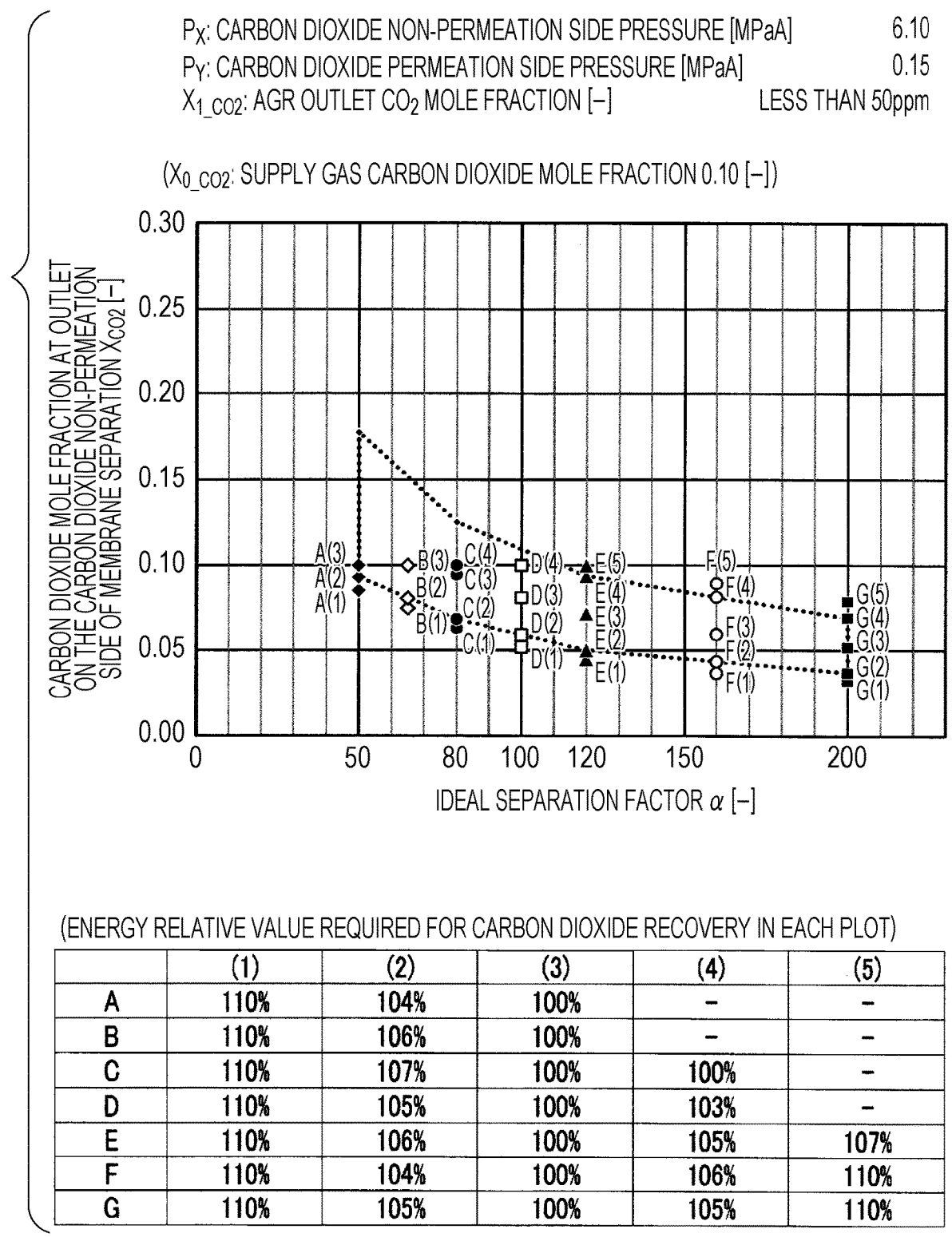
FIG. 43 is a diagram showing evaluation results by simulation.
Figure 44:
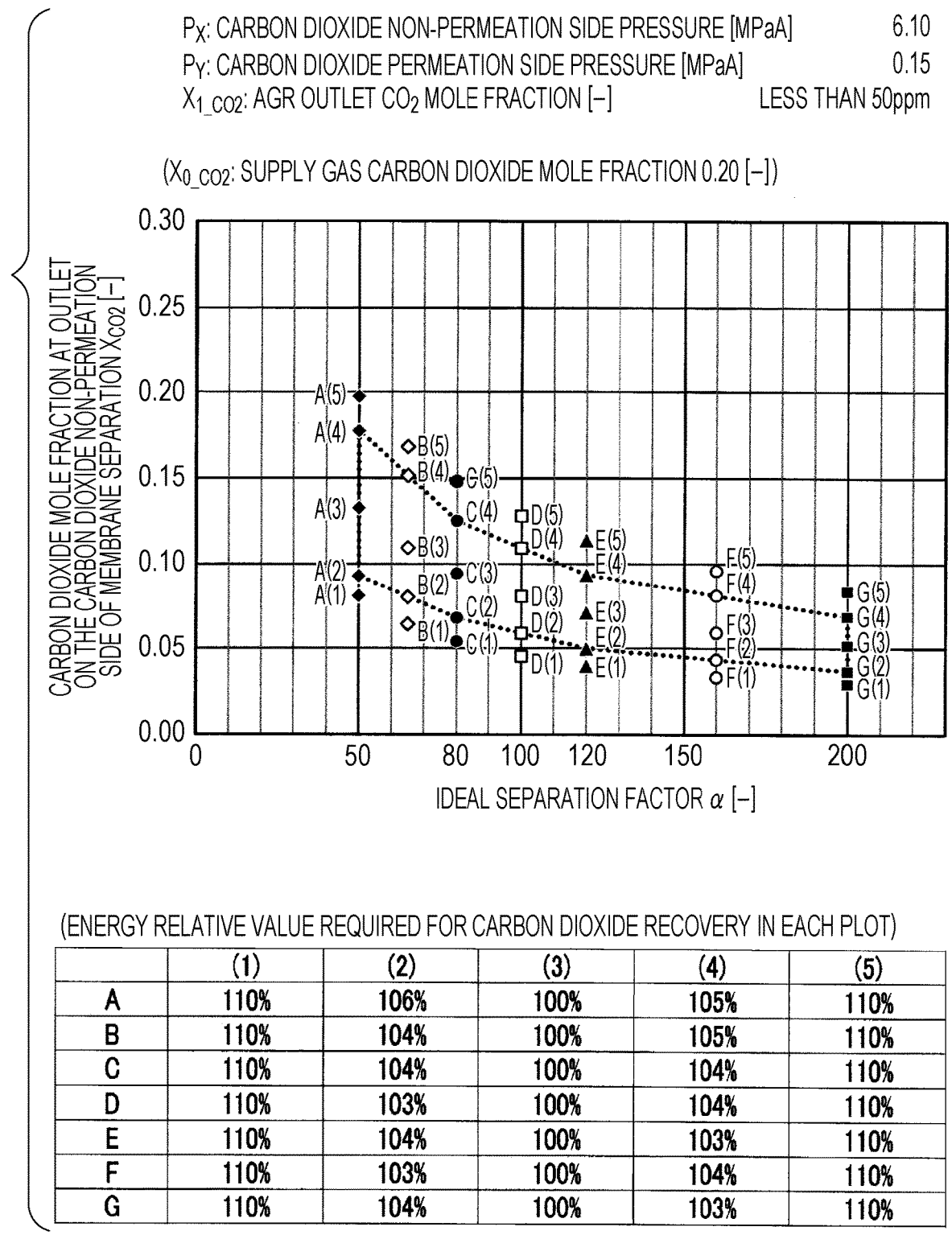
FIG. 44 is a diagram showing evaluation results by simulation.
Figure 45:
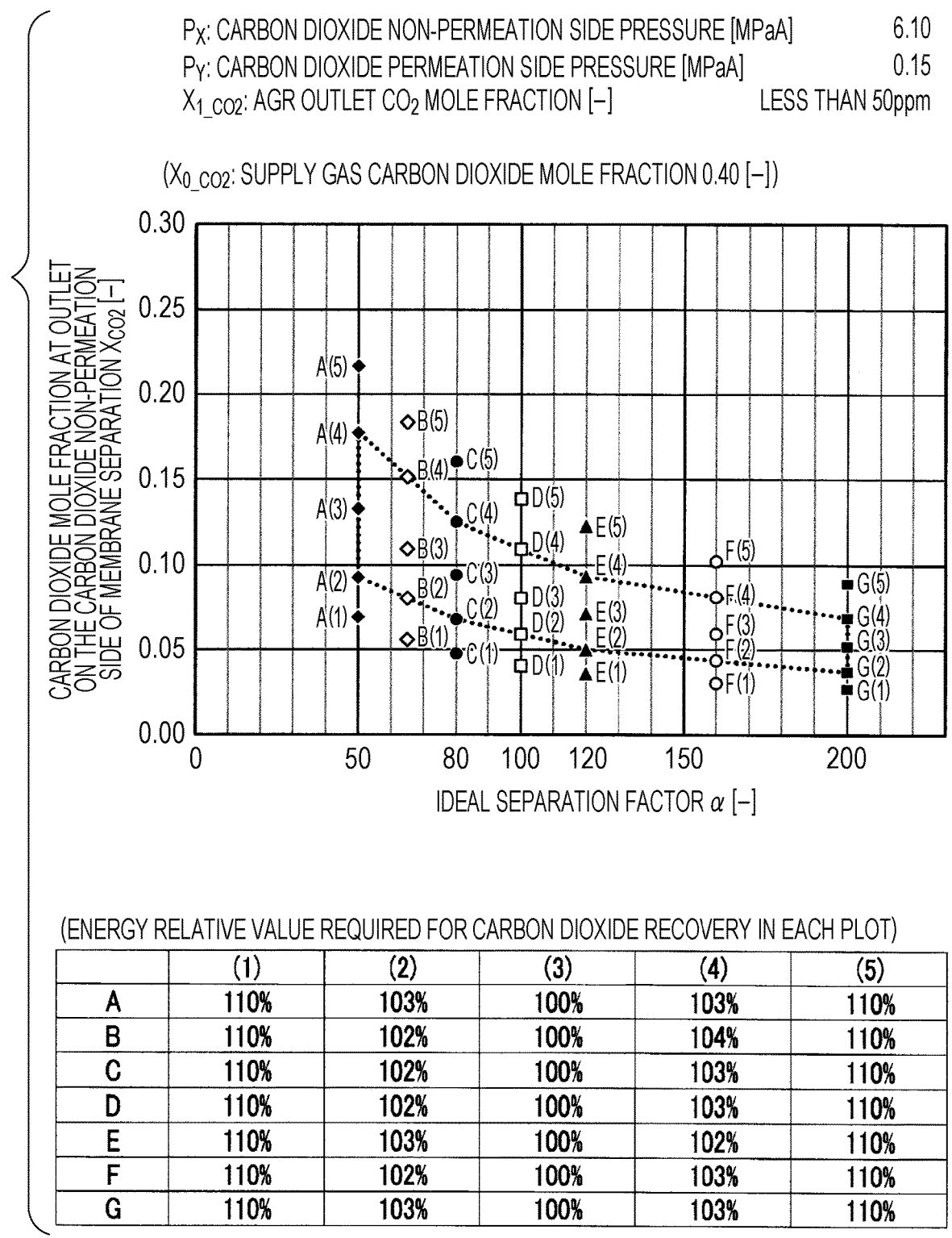
FIG. 45 is a diagram showing evaluation results by simulation.
Figure 46:
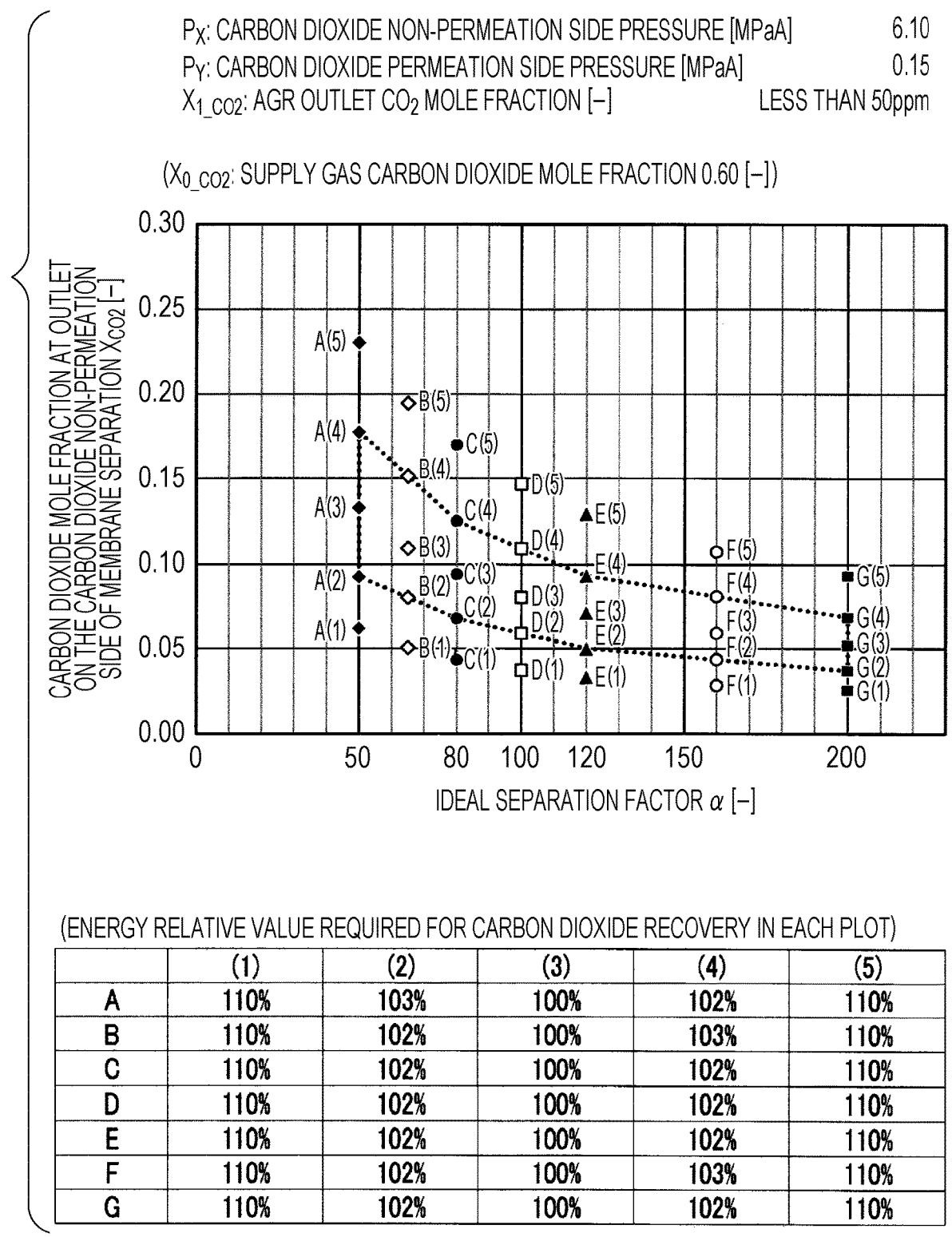
FIG. 46 is a diagram showing evaluation results by simulation.
Figure 47:
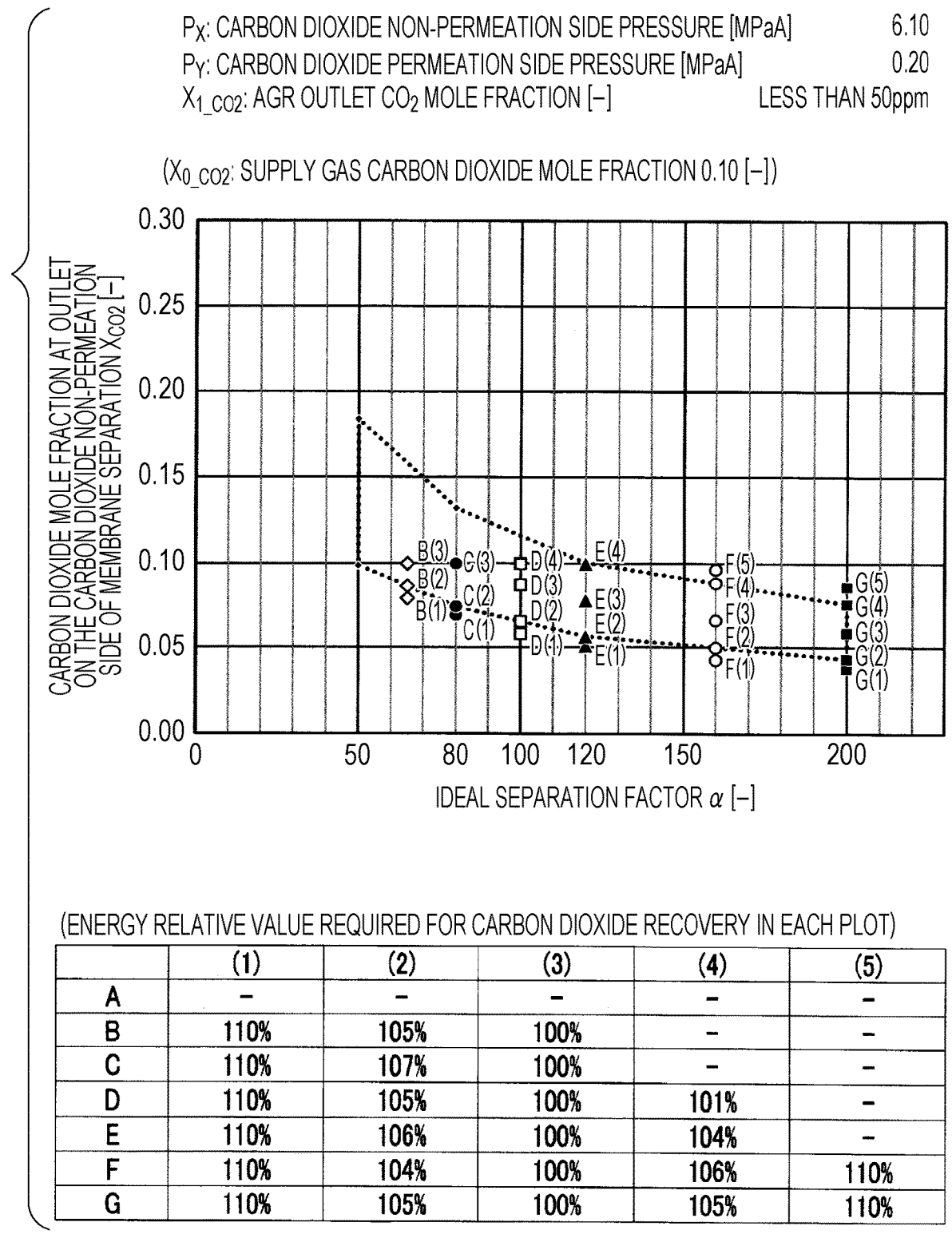
FIG. 47 is a diagram showing evaluation results by simulation.
Figure 48:
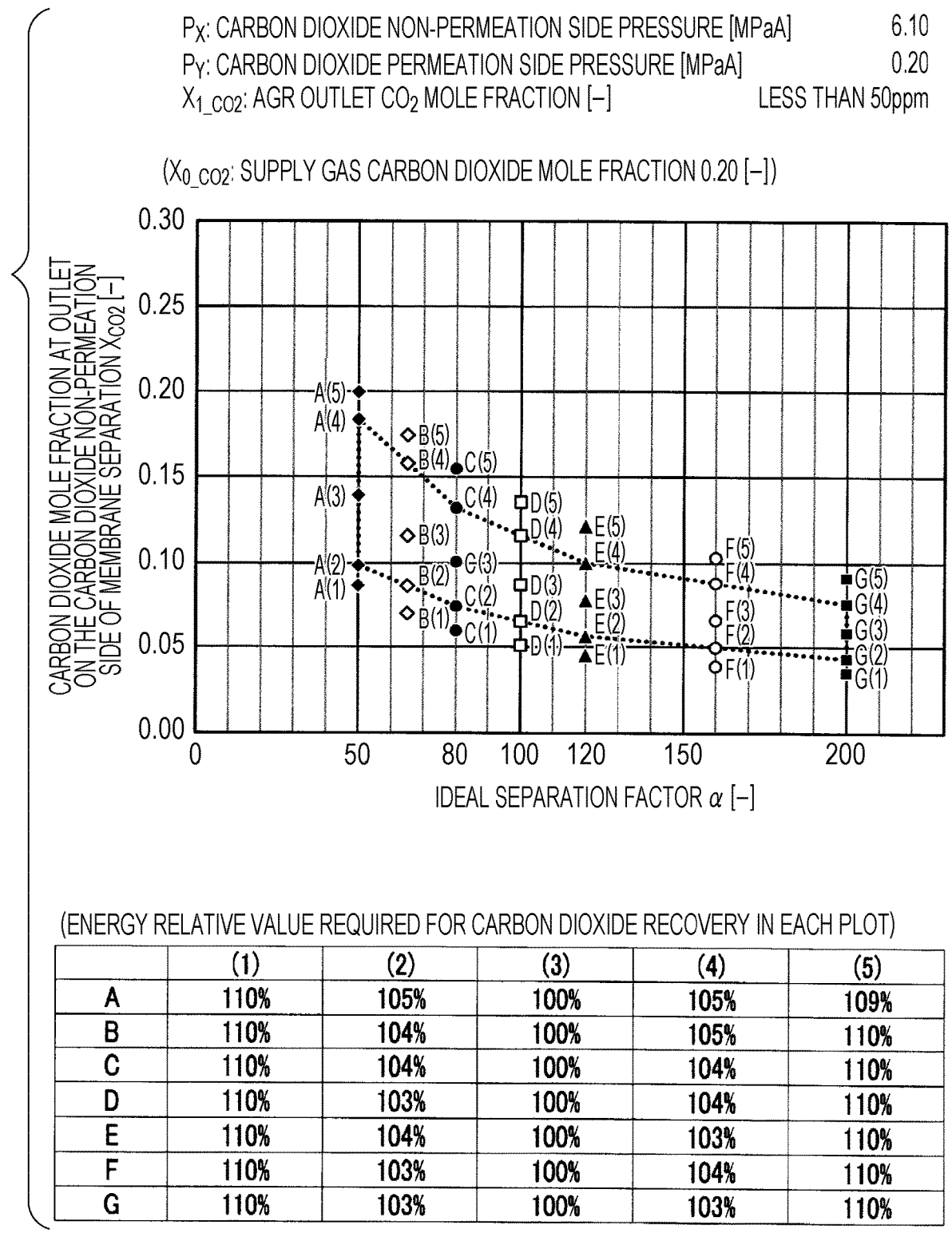
FIG. 48 is a diagram showing evaluation results by simulation.
Figure 49:
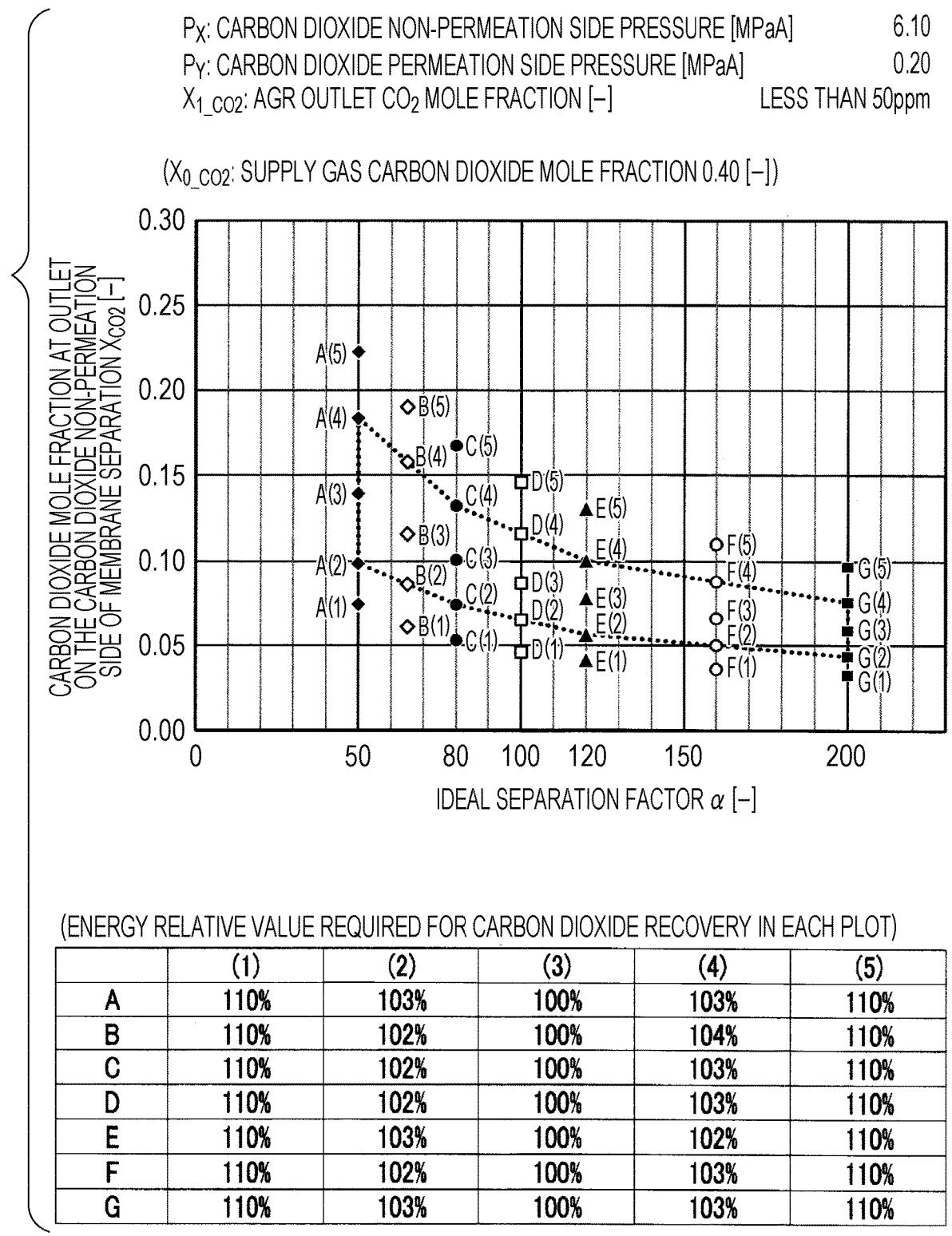
FIG. 49 is a diagram showing evaluation results by simulation.
Figure 50:
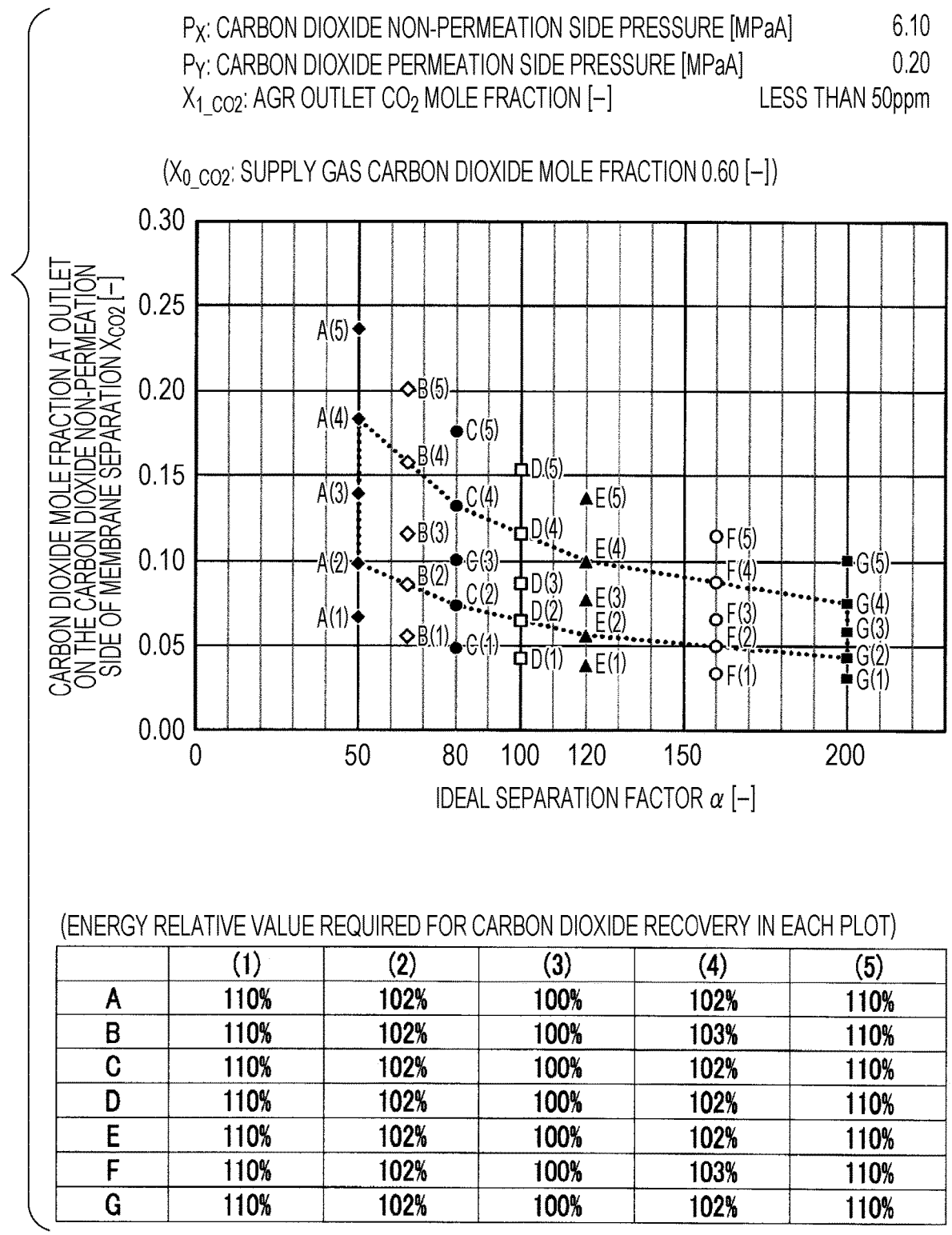
FIG. 50 is a diagram showing evaluation results by simulation.
Figure 51:
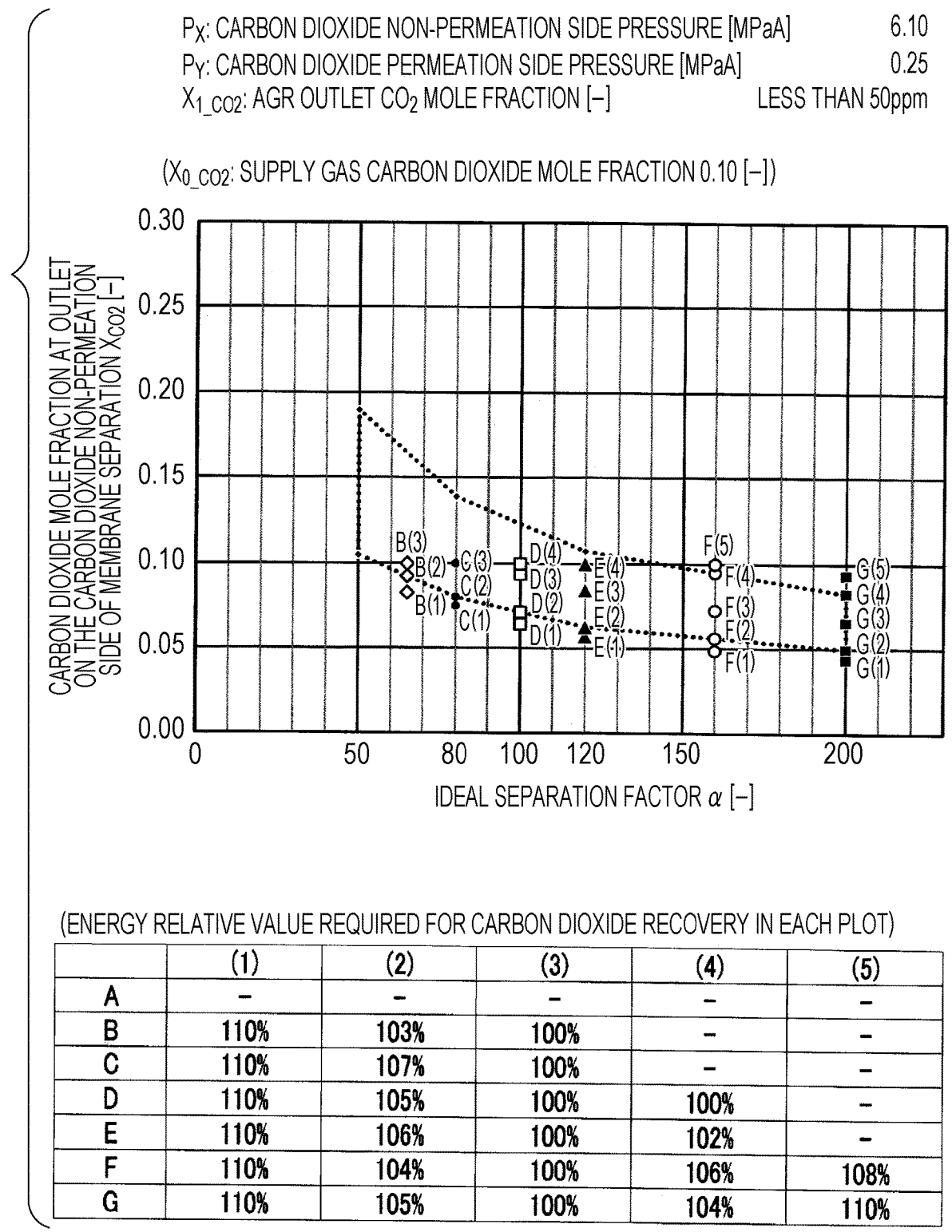
FIG. 51 is a diagram showing evaluation results by simulation.
Figure 52:
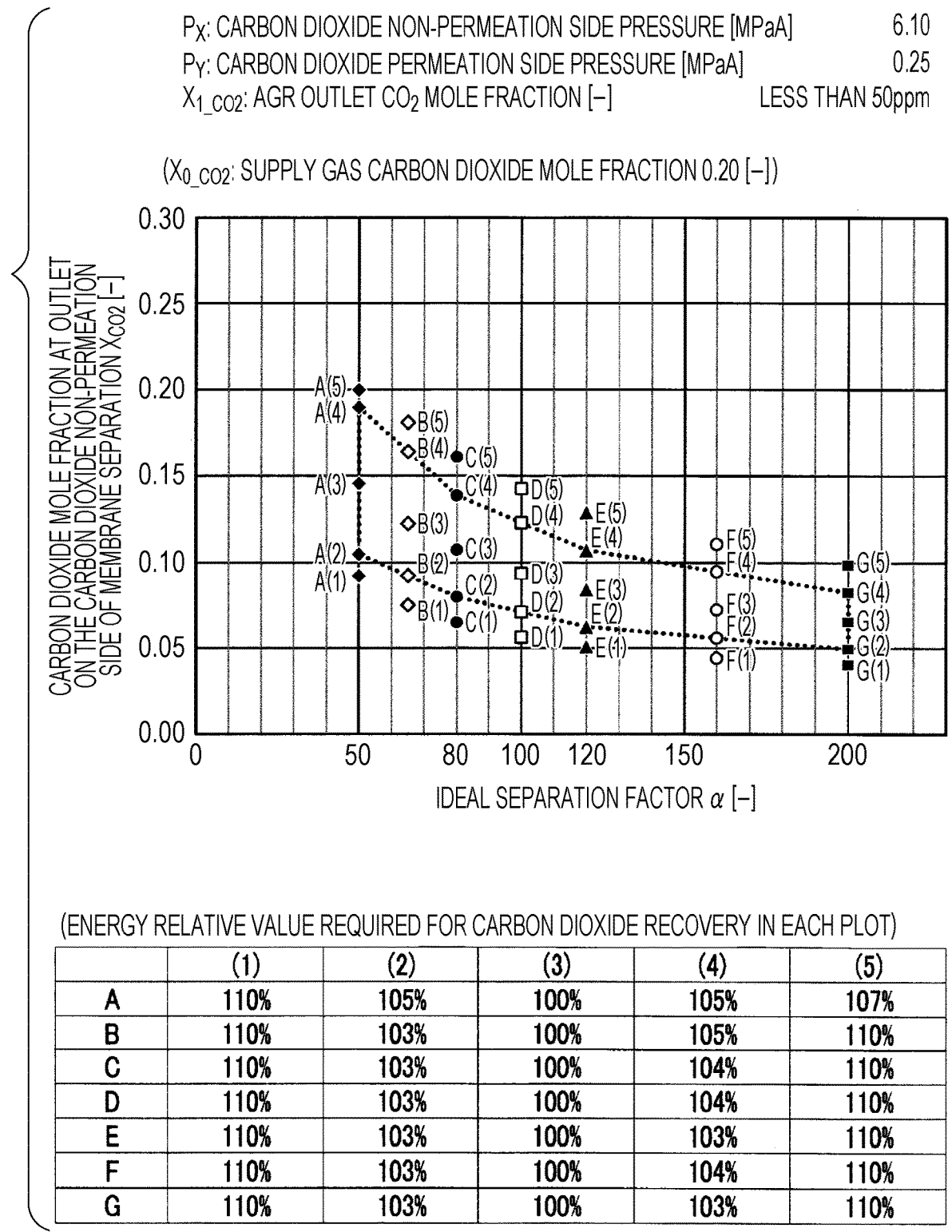
FIG. 52 is a diagram showing evaluation results by simulation.
Figure 53:
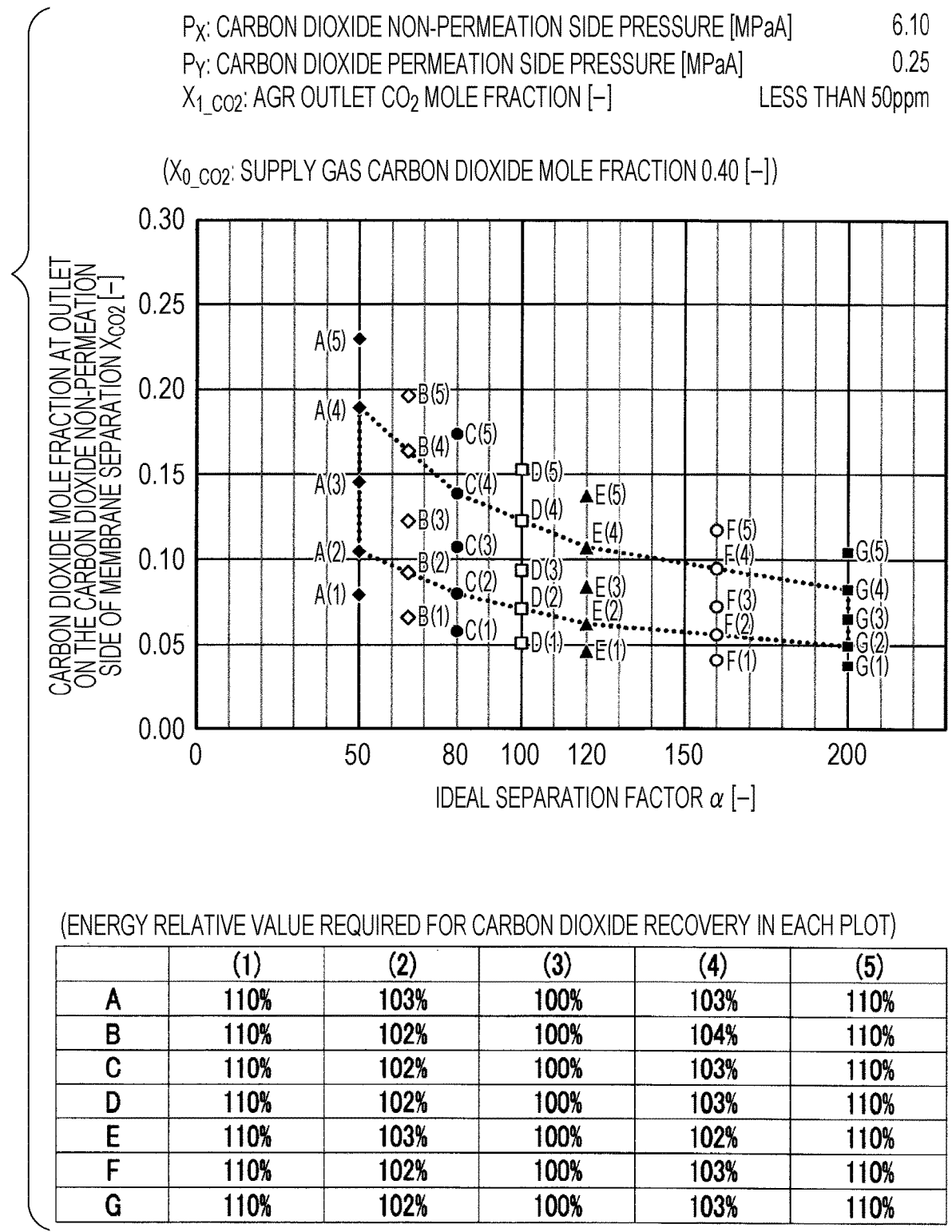
FIG. 53 is a diagram showing evaluation results by simulation.
Figure 54:
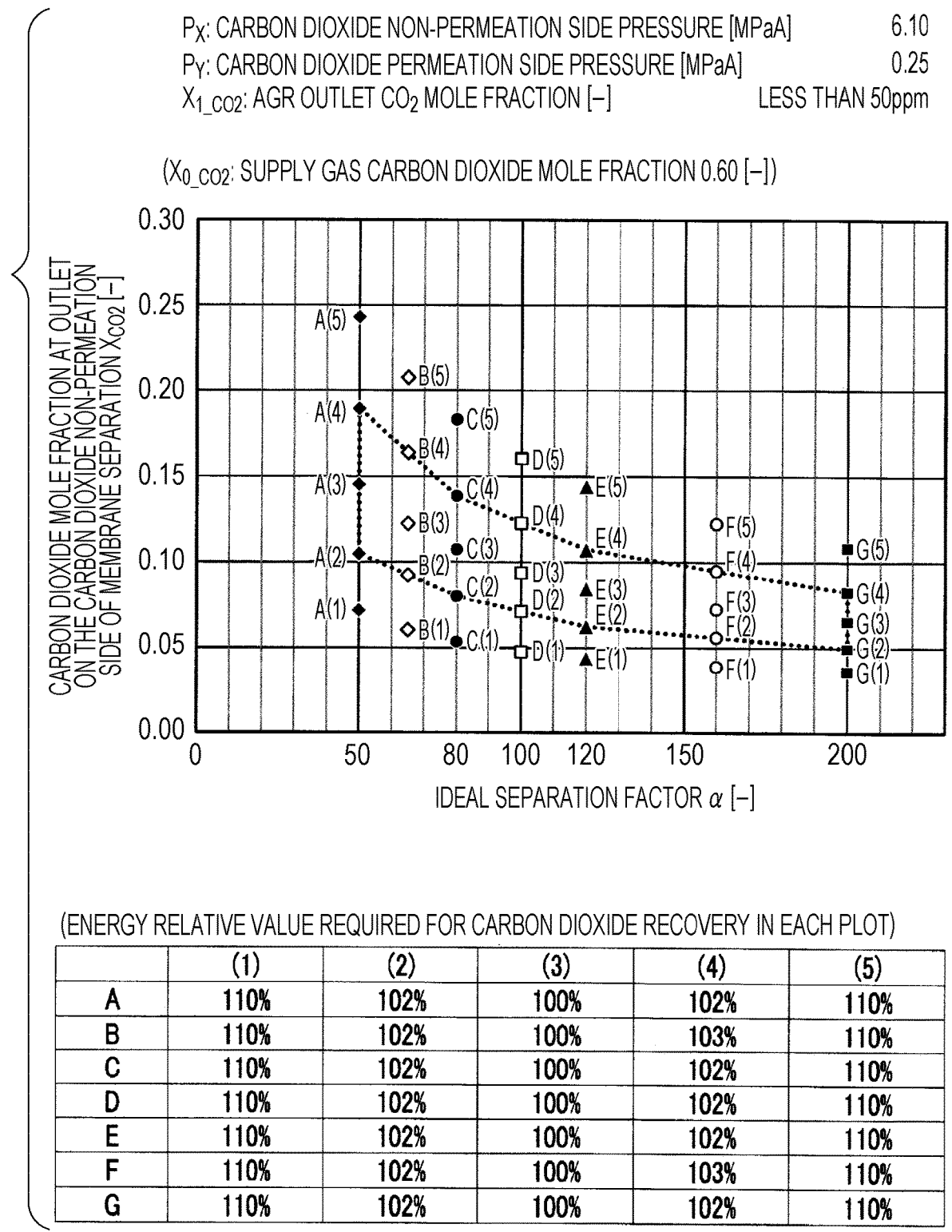
FIG. 54 is a diagram showing evaluation results by simulation.
Figure 55:
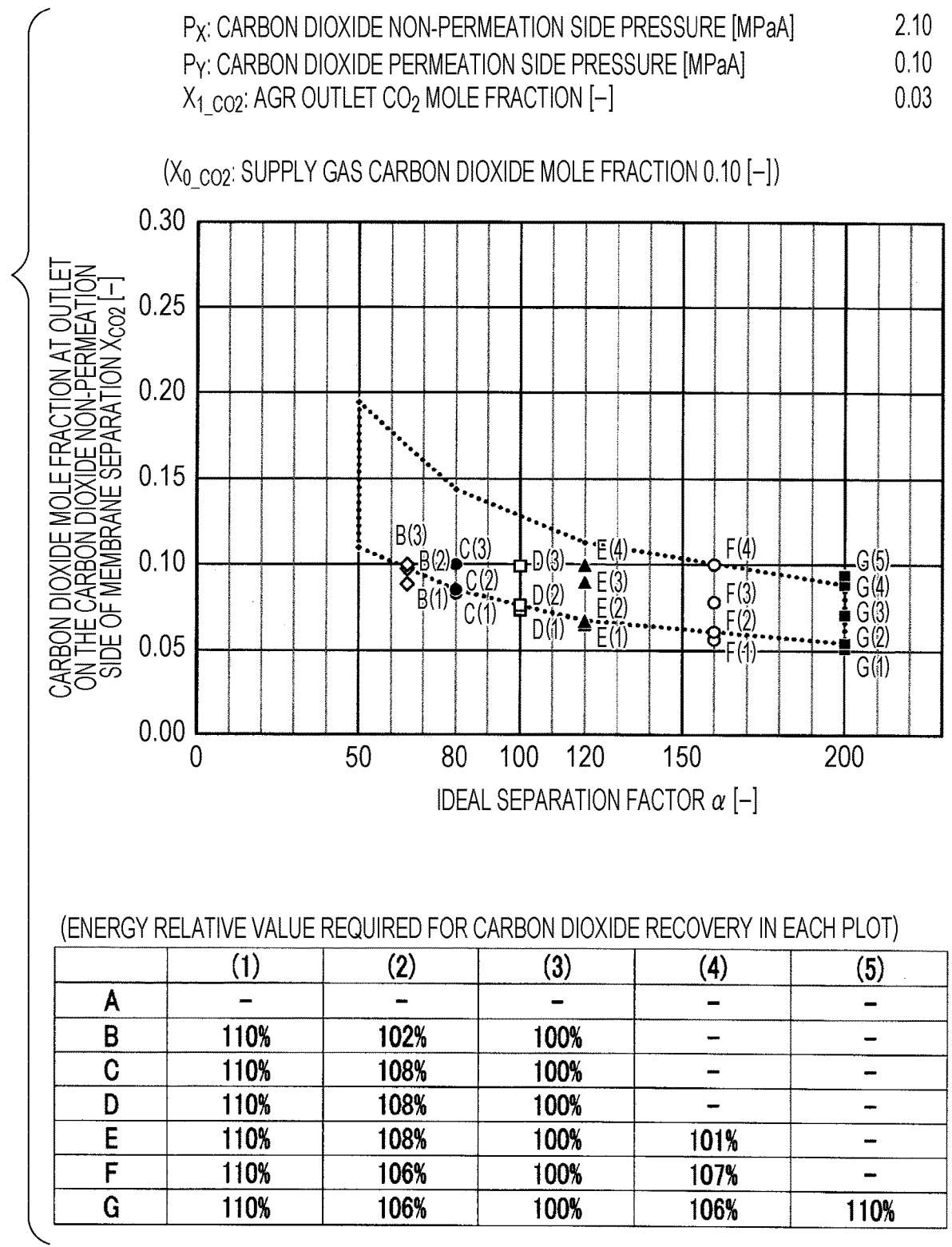
FIG. 55 is a diagram showing evaluation results by simulation.
Figure 56:
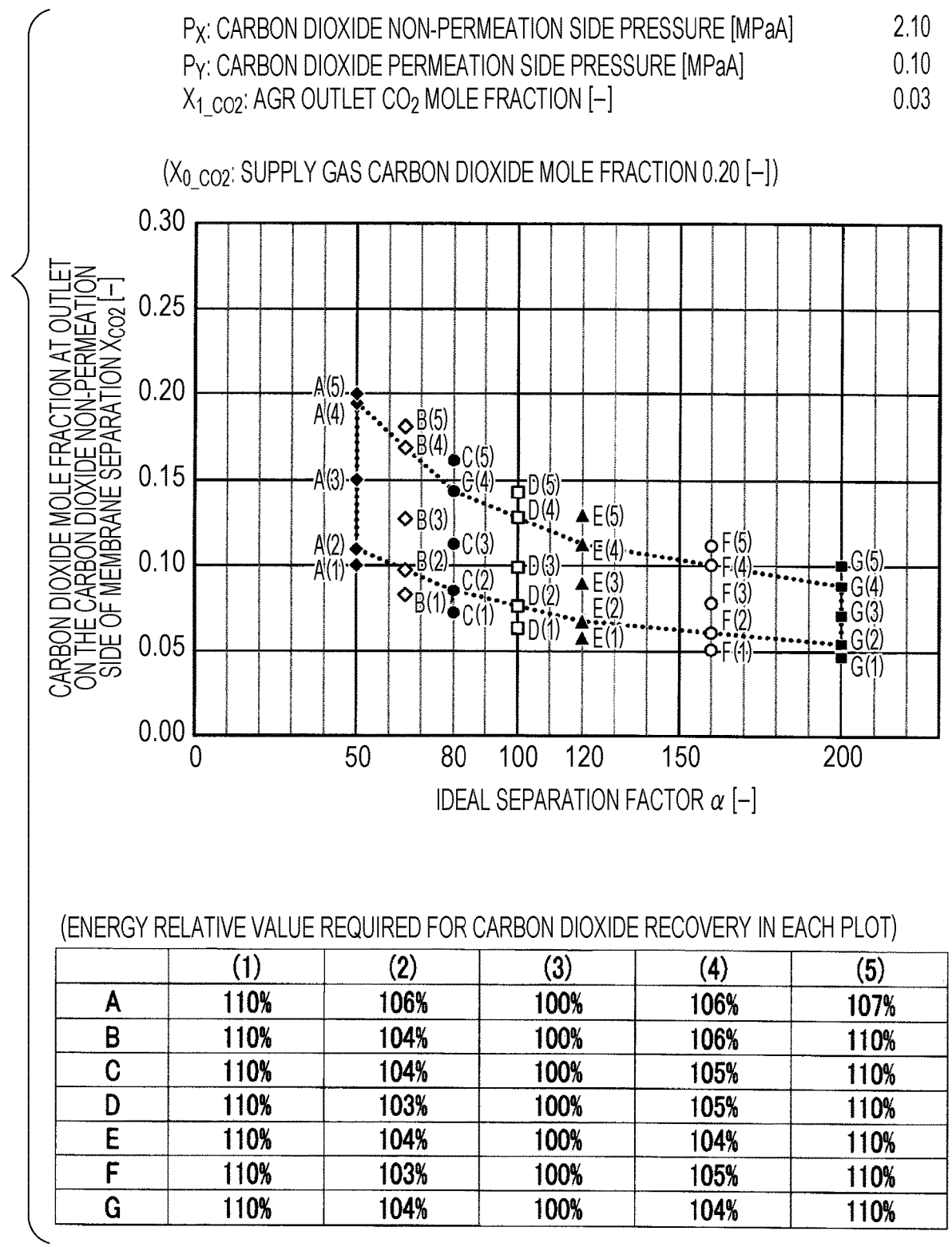
FIG. 56 is a diagram showing evaluation results by simulation.
Figure 57:
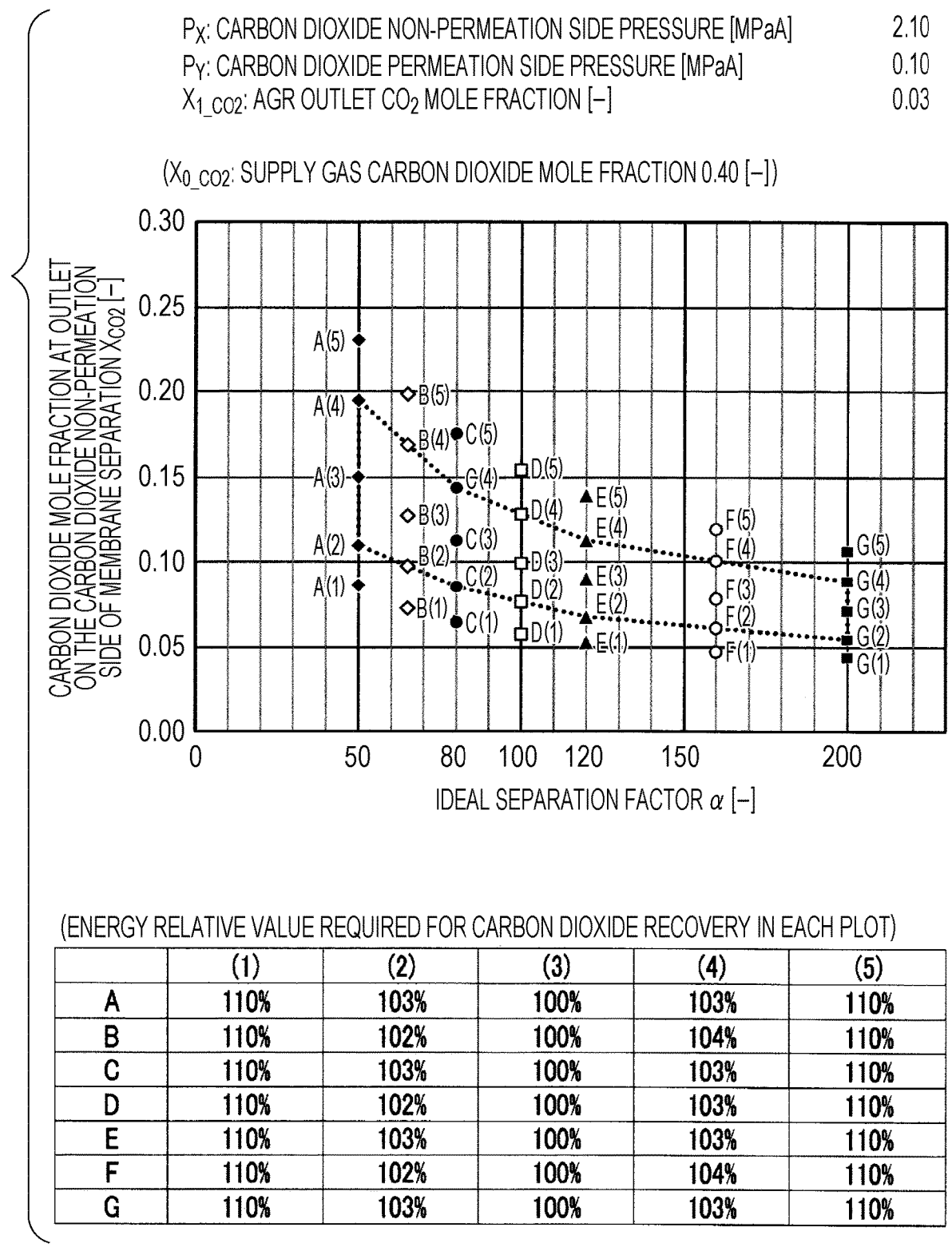
FIG. 57 is a diagram showing evaluation results by simulation.
Figure 58:
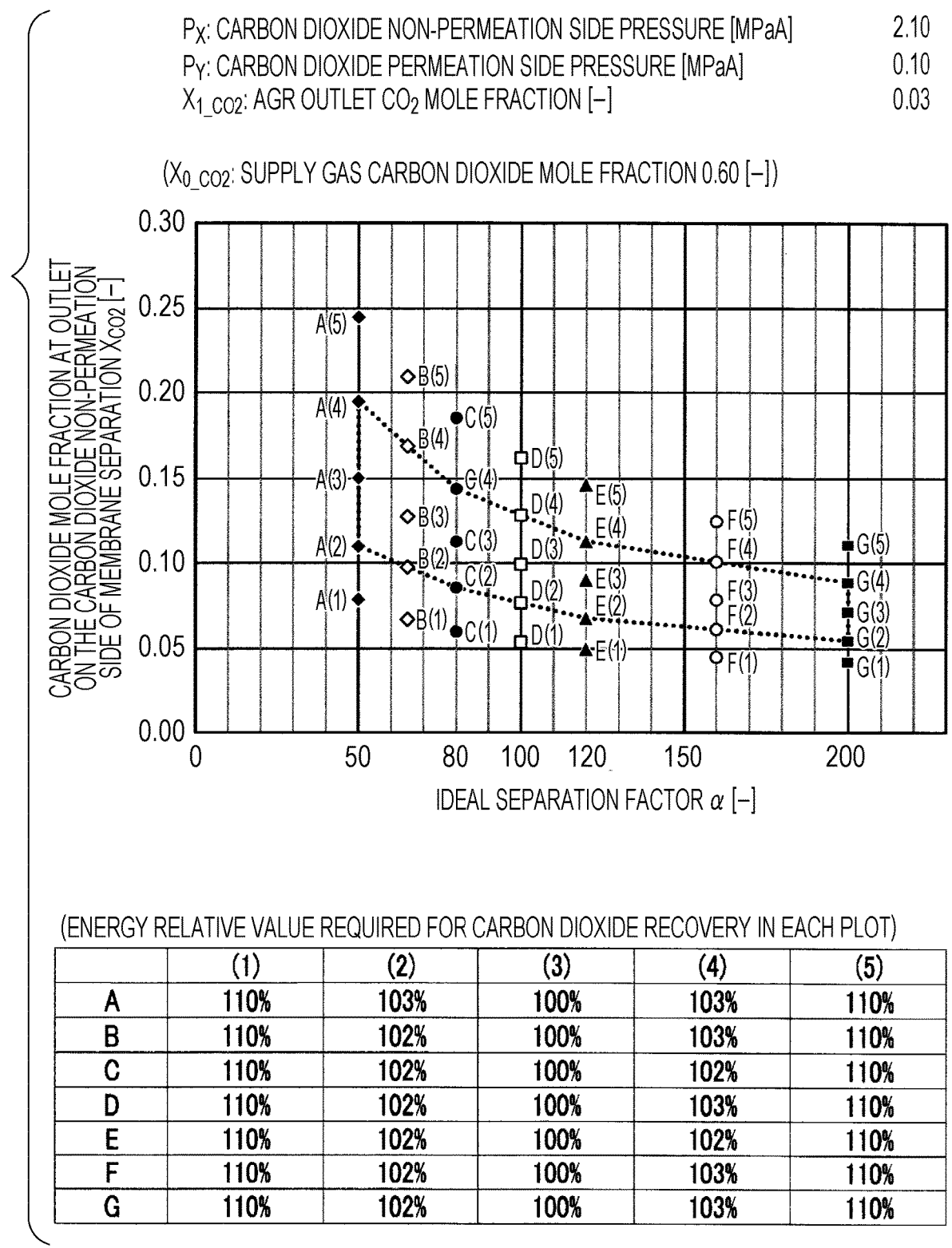
FIG. 58 is a diagram showing evaluation results by simulation.
Figure 59:
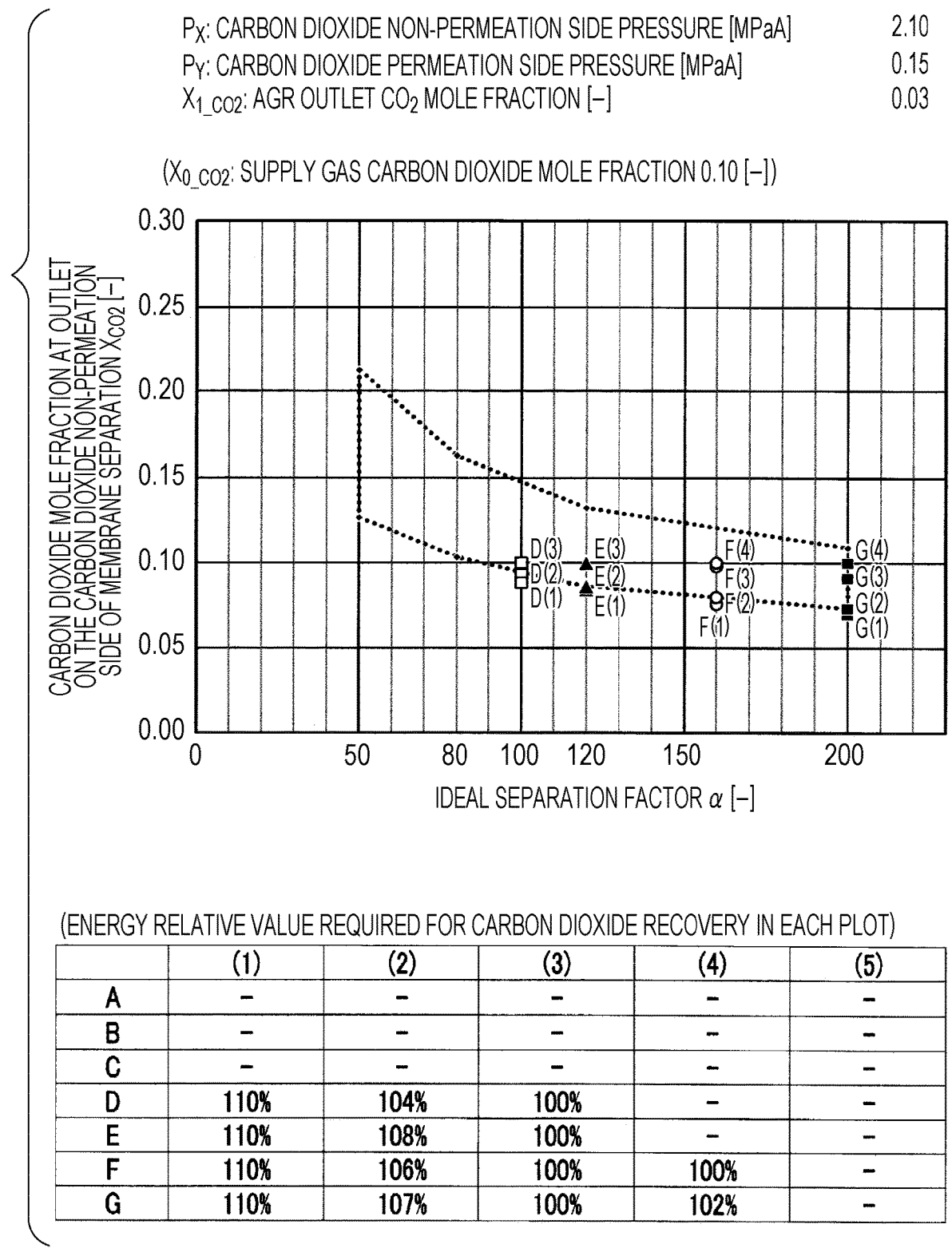
FIG. 59 is a diagram showing evaluation results by simulation.
Figure 60:
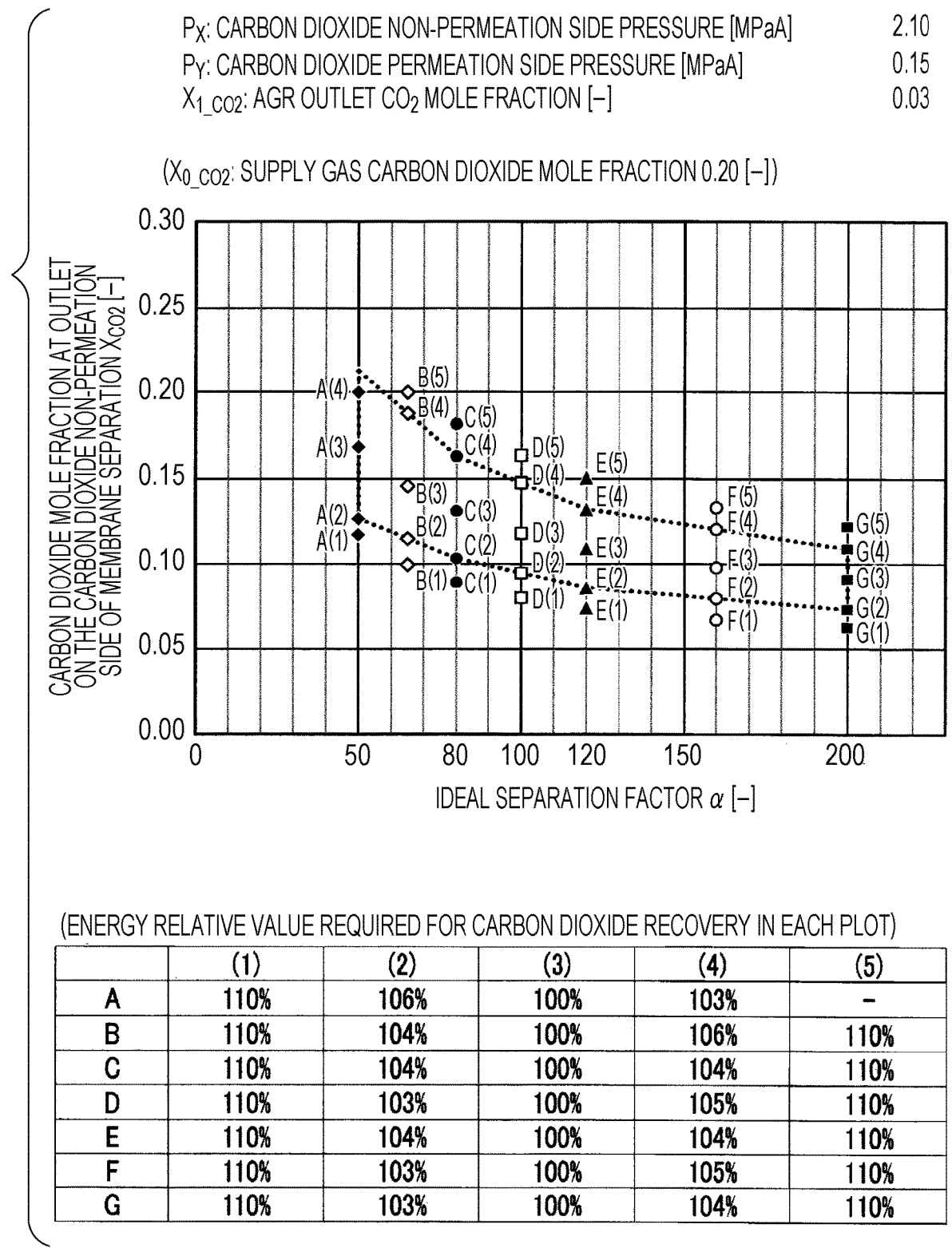
FIG. 60 is a diagram showing evaluation results by simulation.
Figure 61:
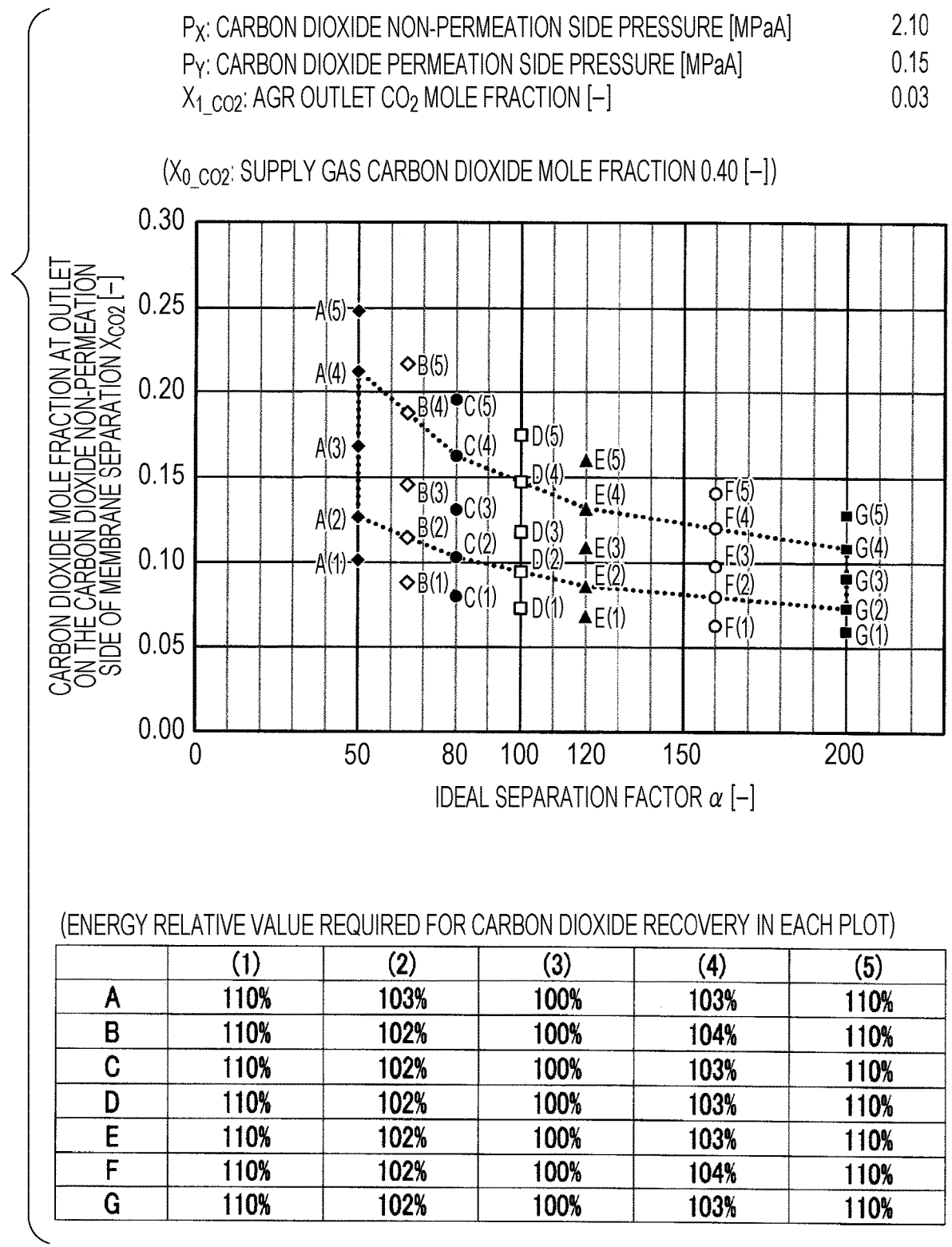
FIG. 61 is a diagram showing evaluation results by simulation.
Figure 62:
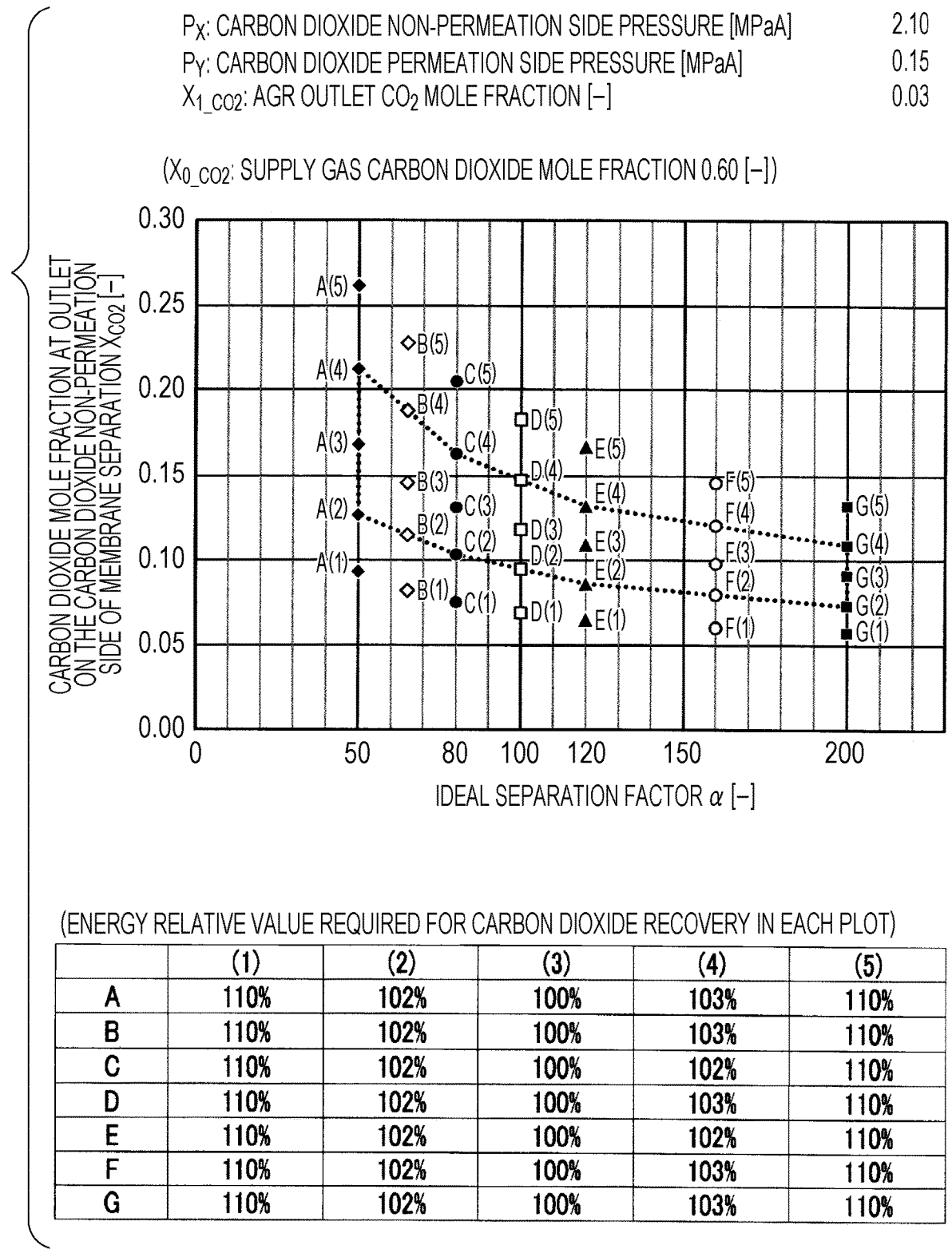
FIG. 62 is a diagram showing evaluation results by simulation.
Figure 63:
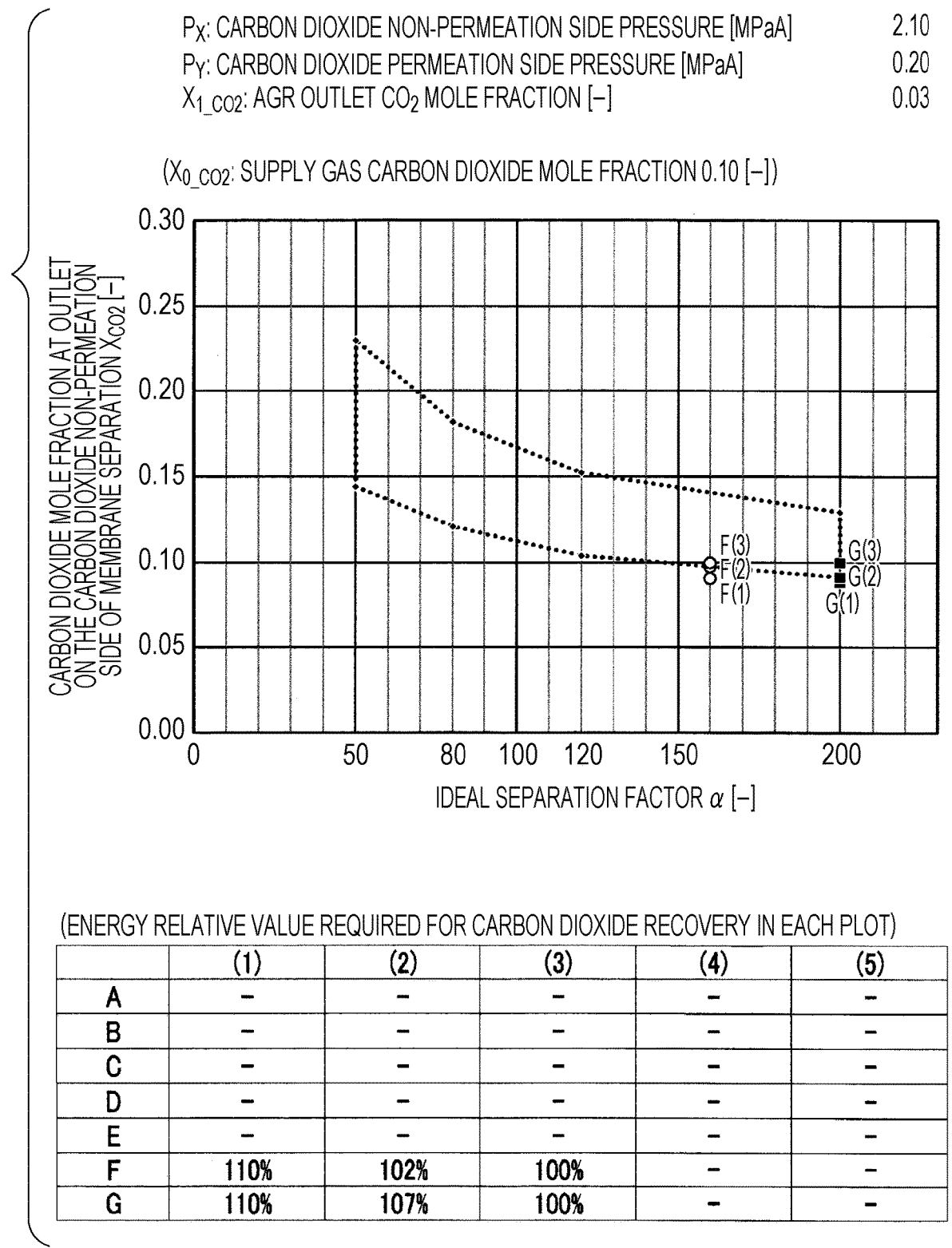
FIG. 63 is a diagram showing evaluation results by simulation.
Figure 64:
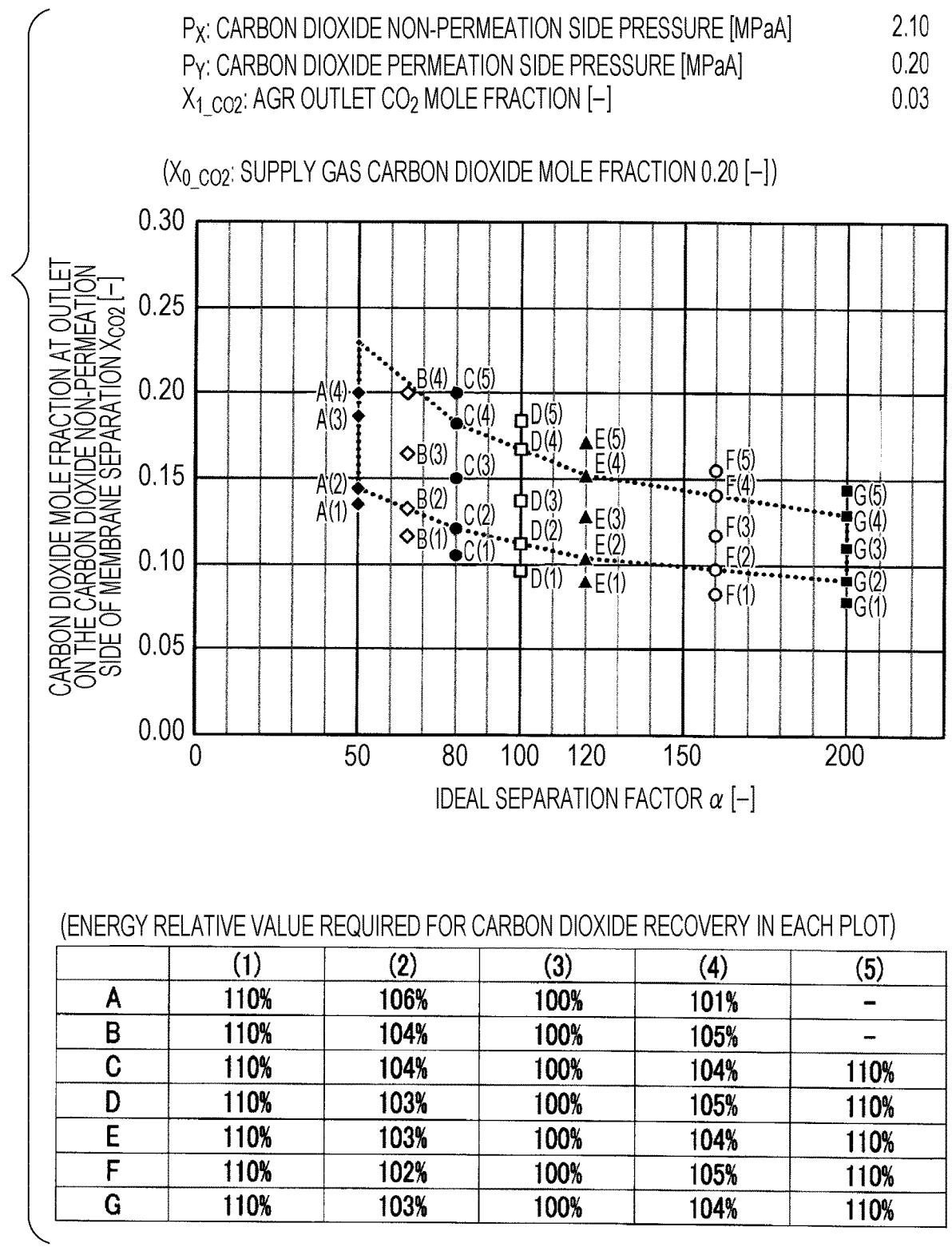
FIG. 64 is a diagram showing evaluation results by simulation.
Figure 65:
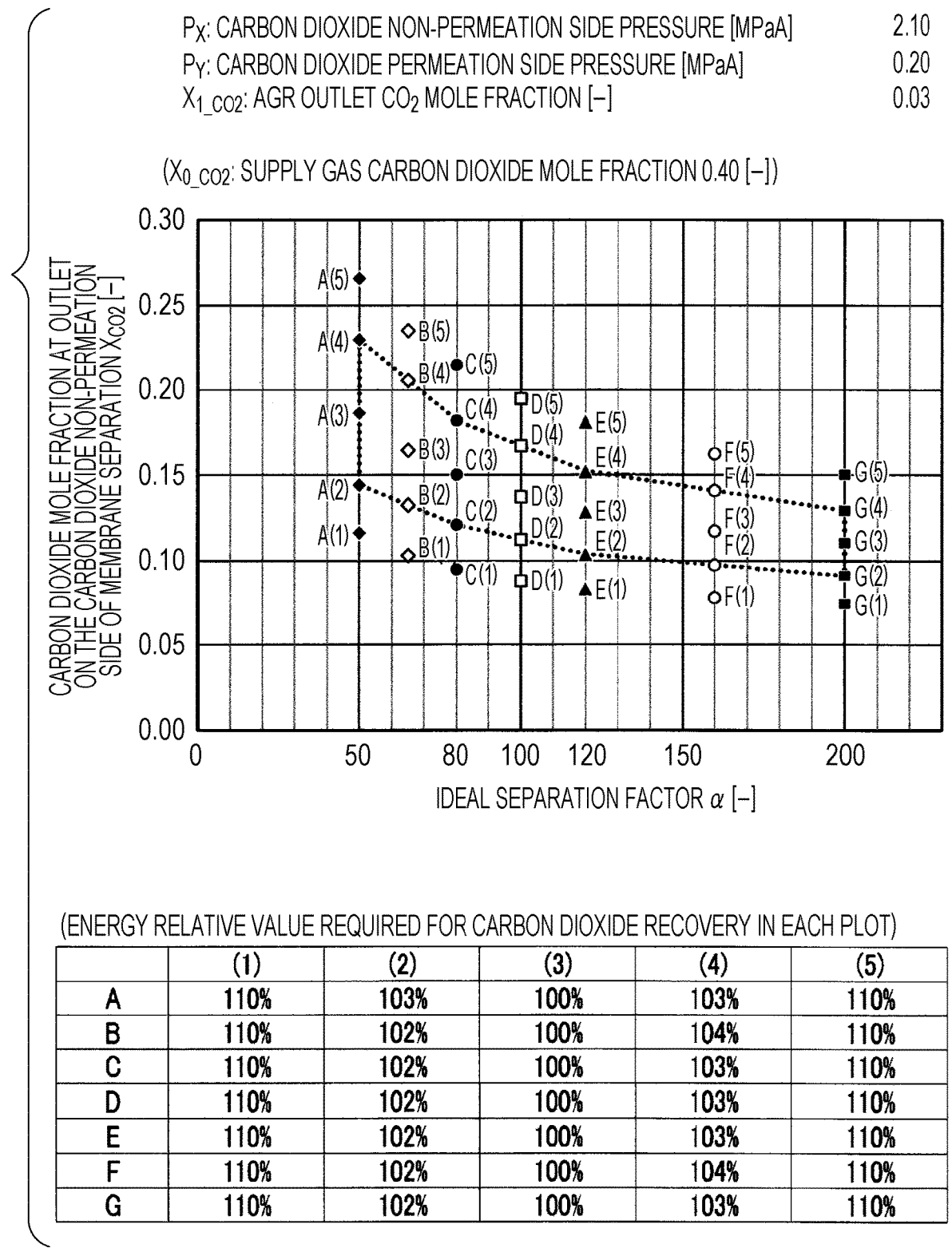
FIG. 65 is a diagram showing evaluation results by simulation.
Figure 66:
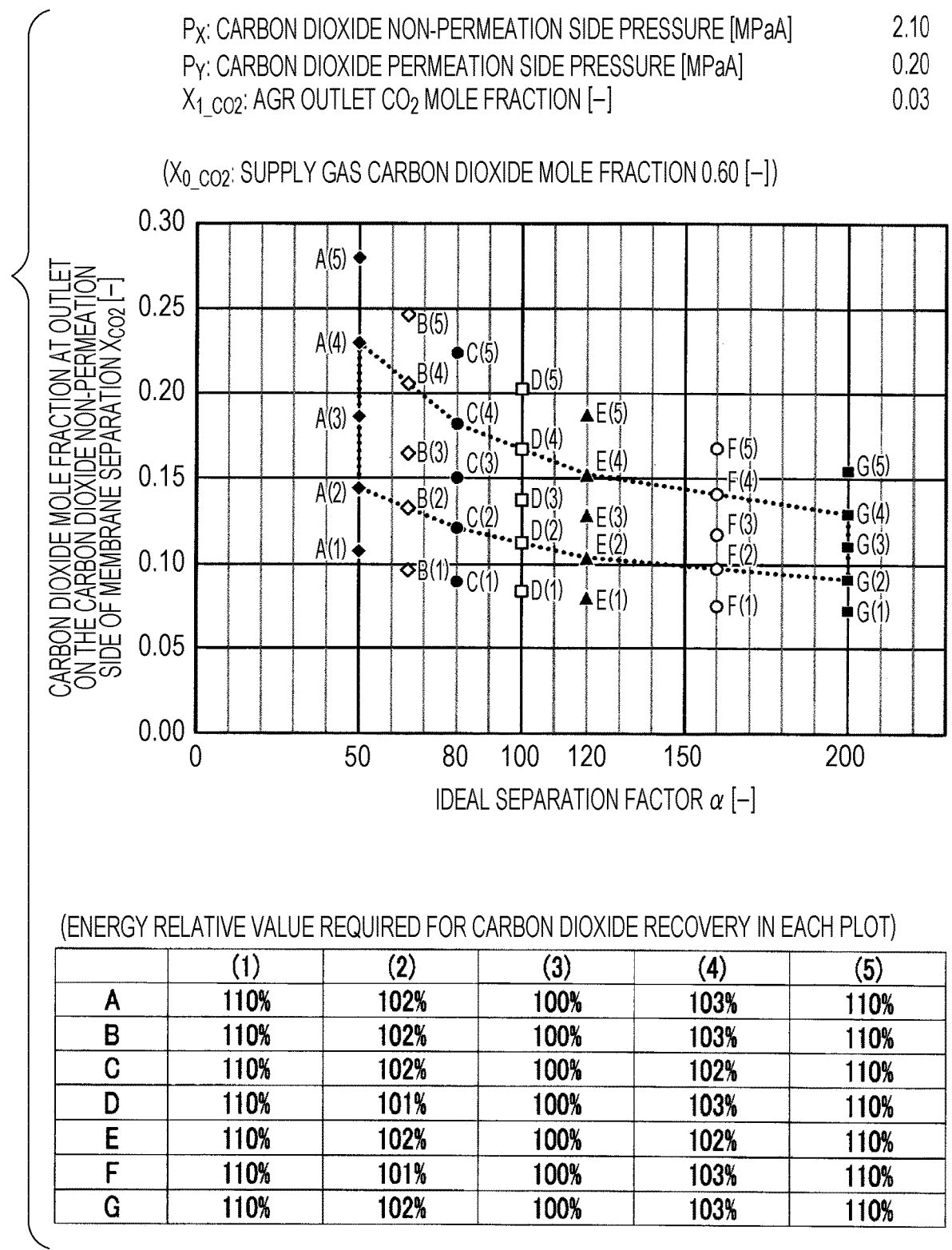
FIG. 66 is a diagram showing evaluation results by simulation.
Figure 67:
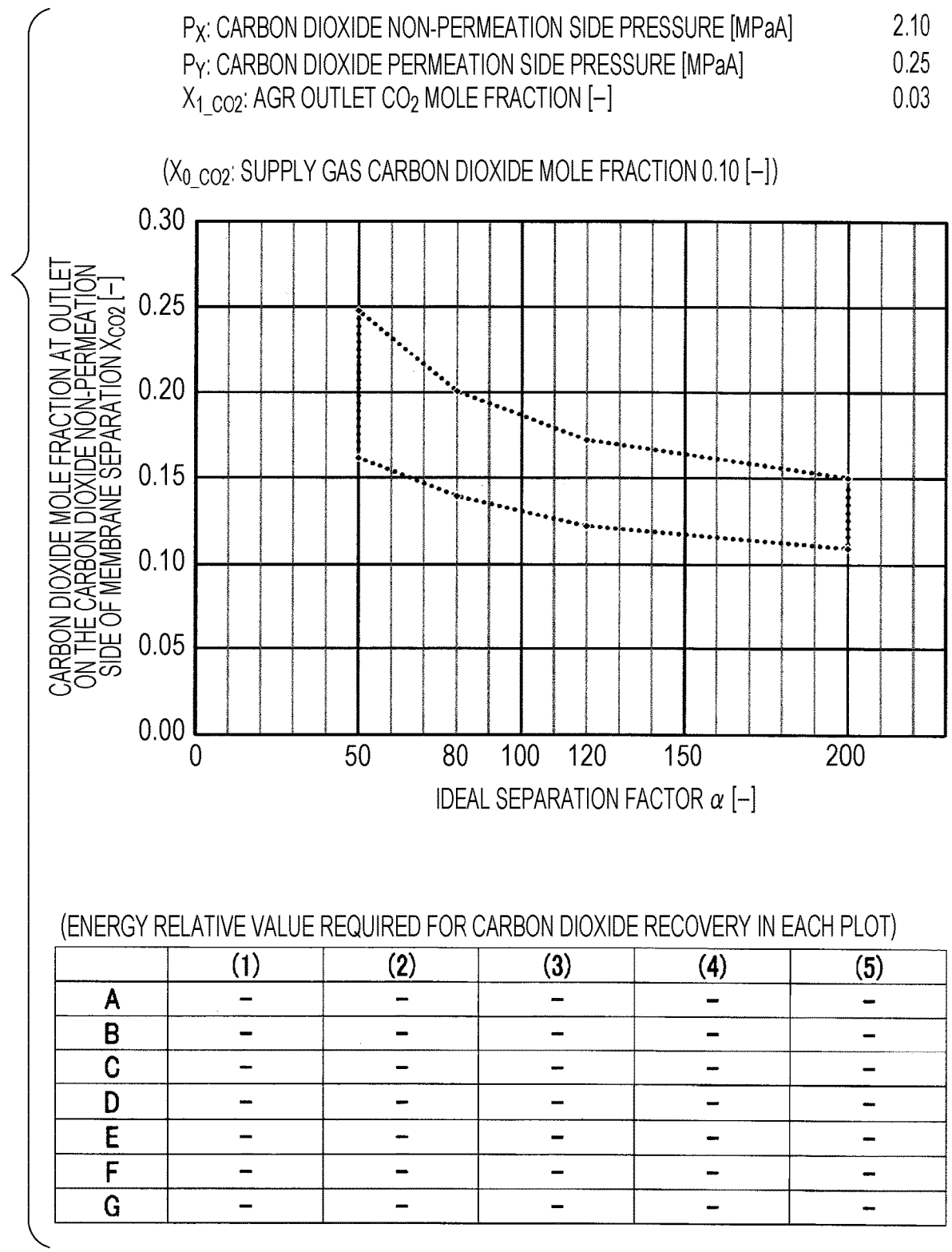
FIG. 67 is a diagram showing evaluation results by simulation.
Figure 68:
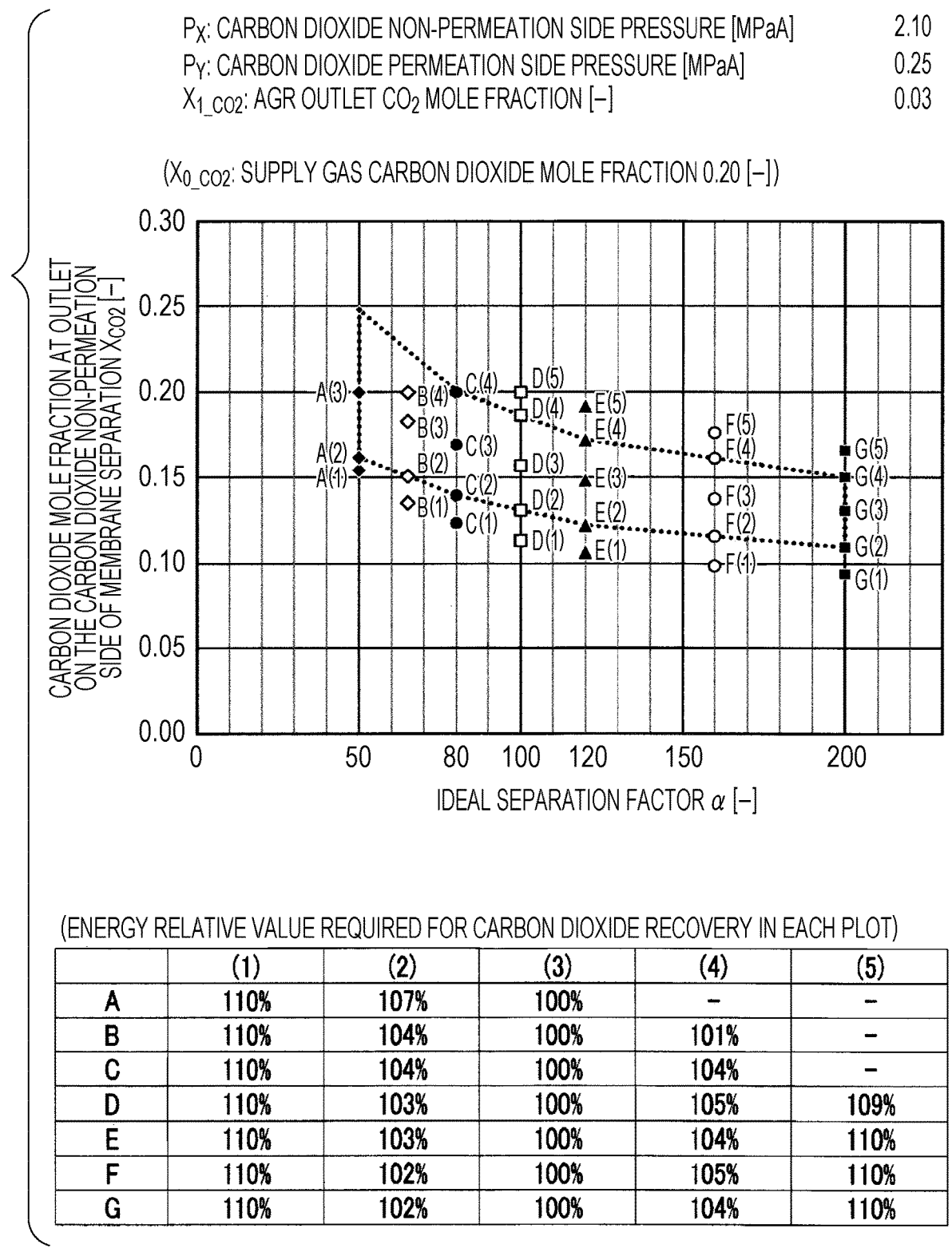
FIG. 68 is a diagram showing evaluation results by simulation.
Figure 69:
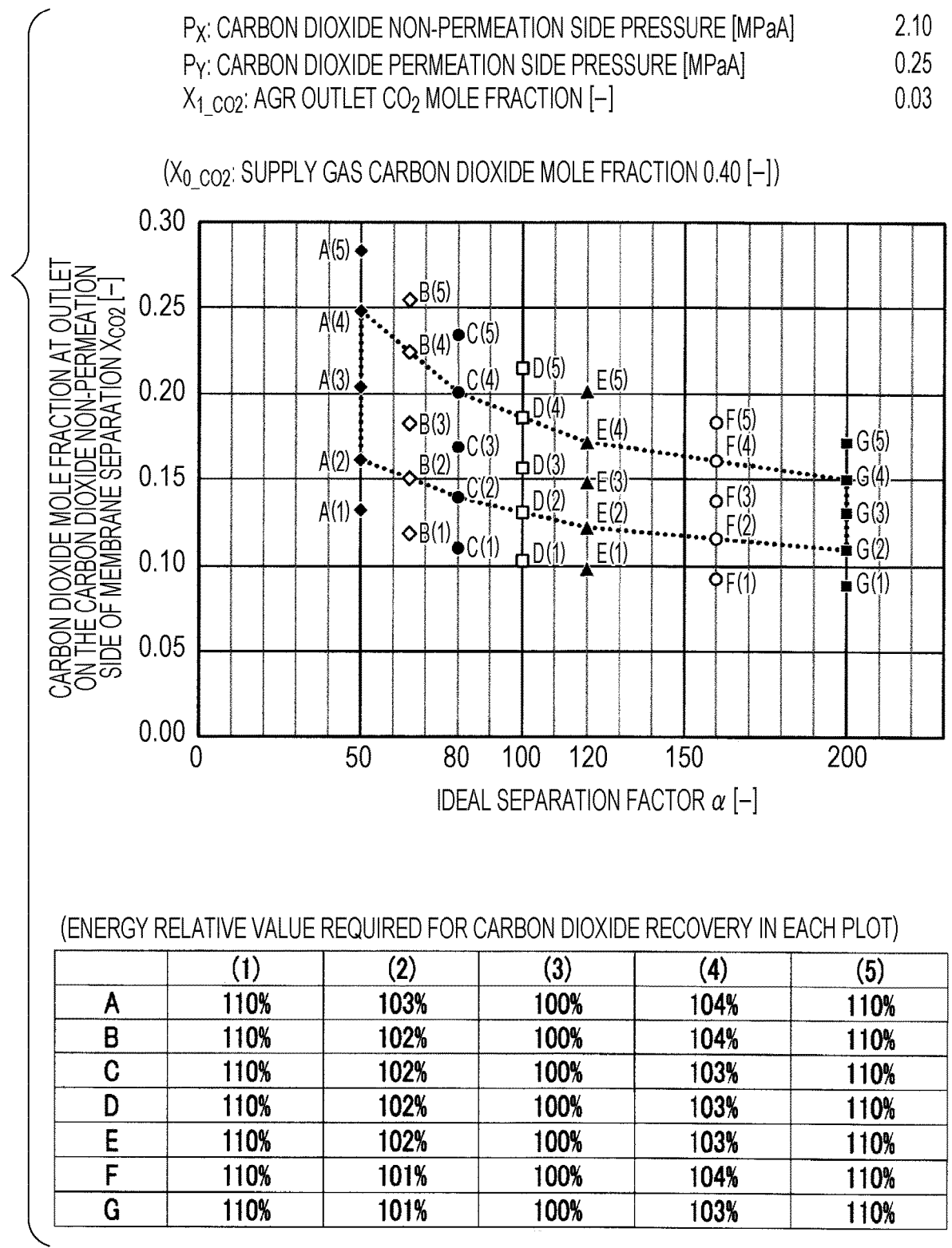
FIG. 69 is a diagram showing evaluation results by simulation.
Figure 70:
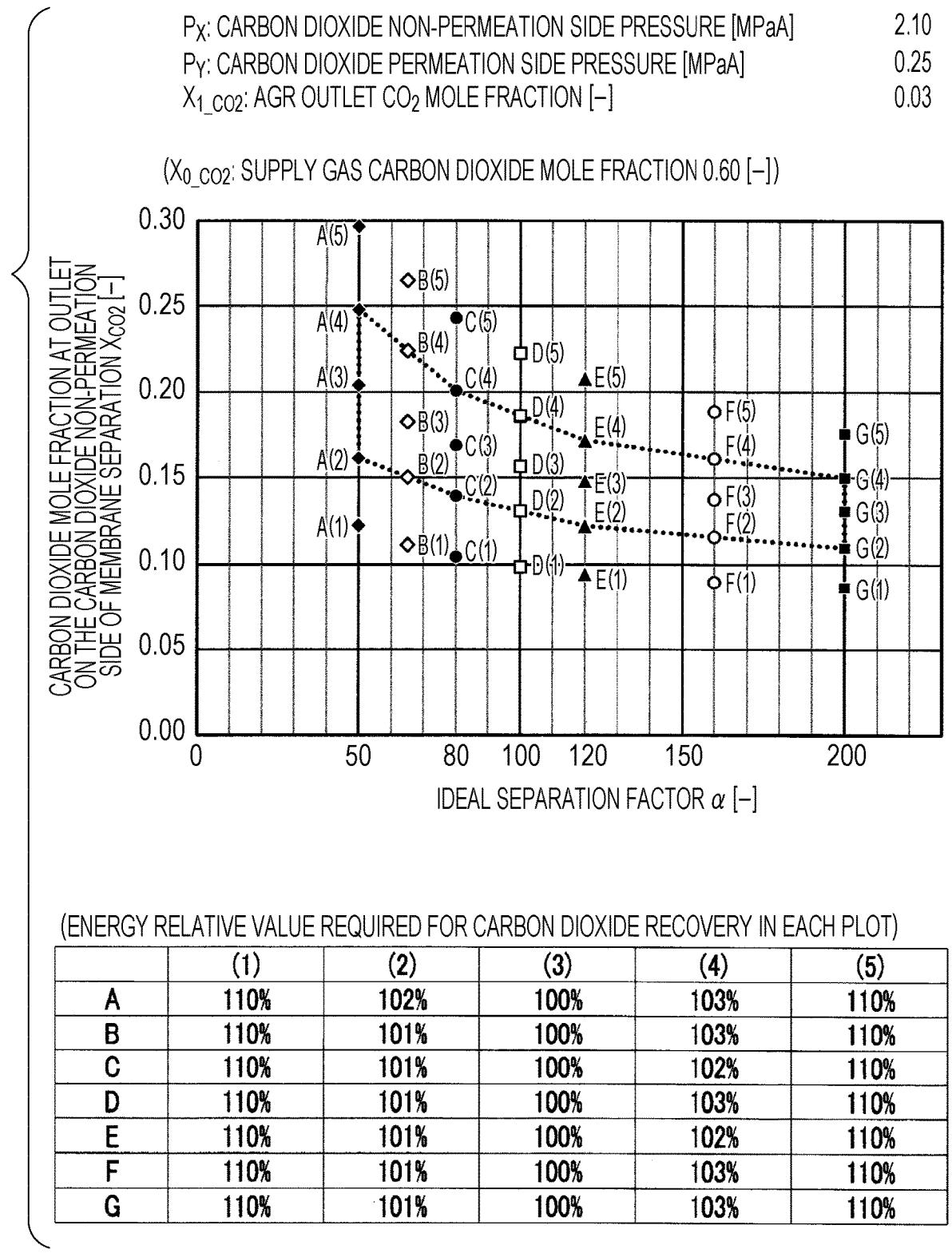
FIG. 70 is a diagram showing evaluation results by simulation.
Figure 71:
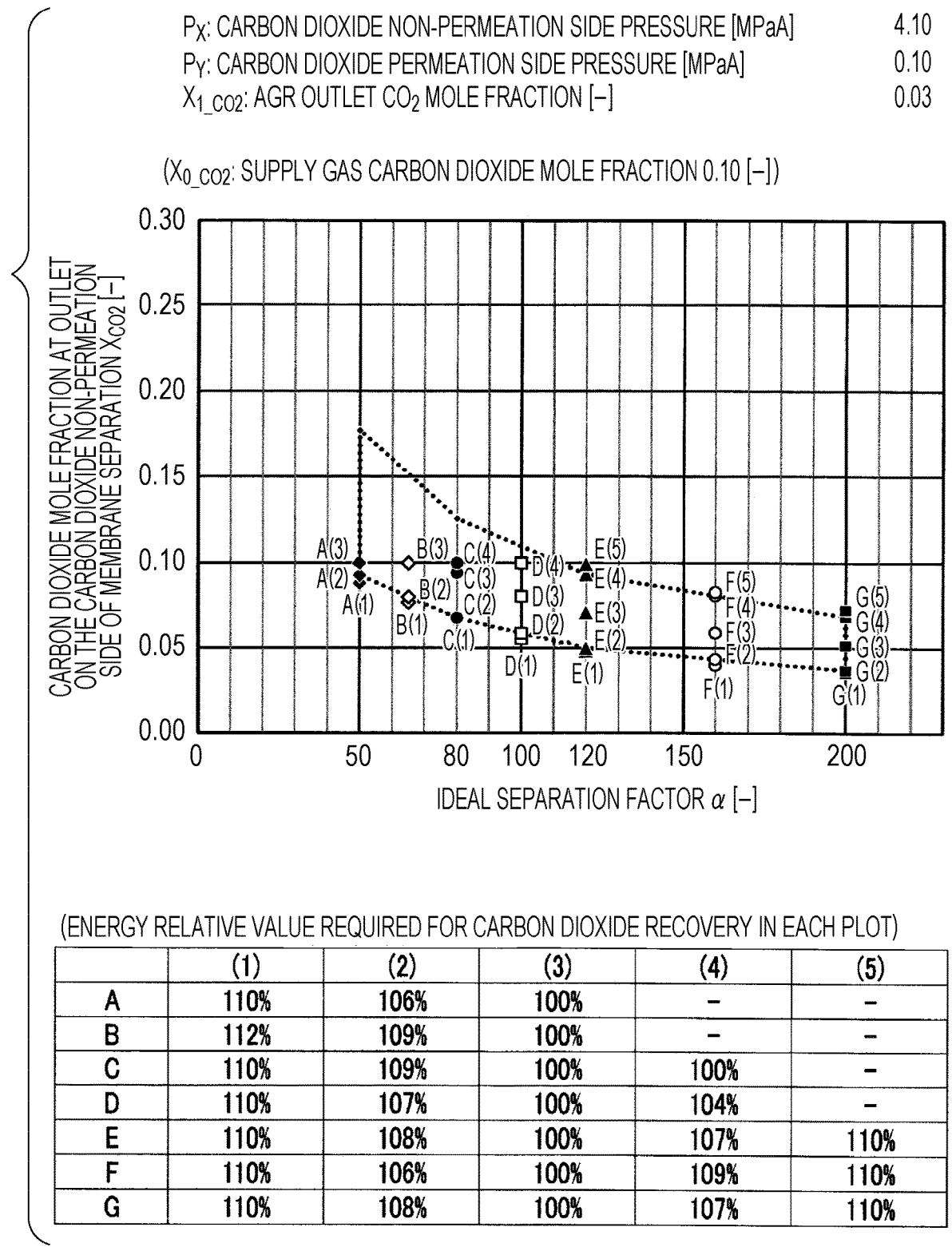
FIG. 71 is a diagram showing evaluation results by simulation.
Figure 72:
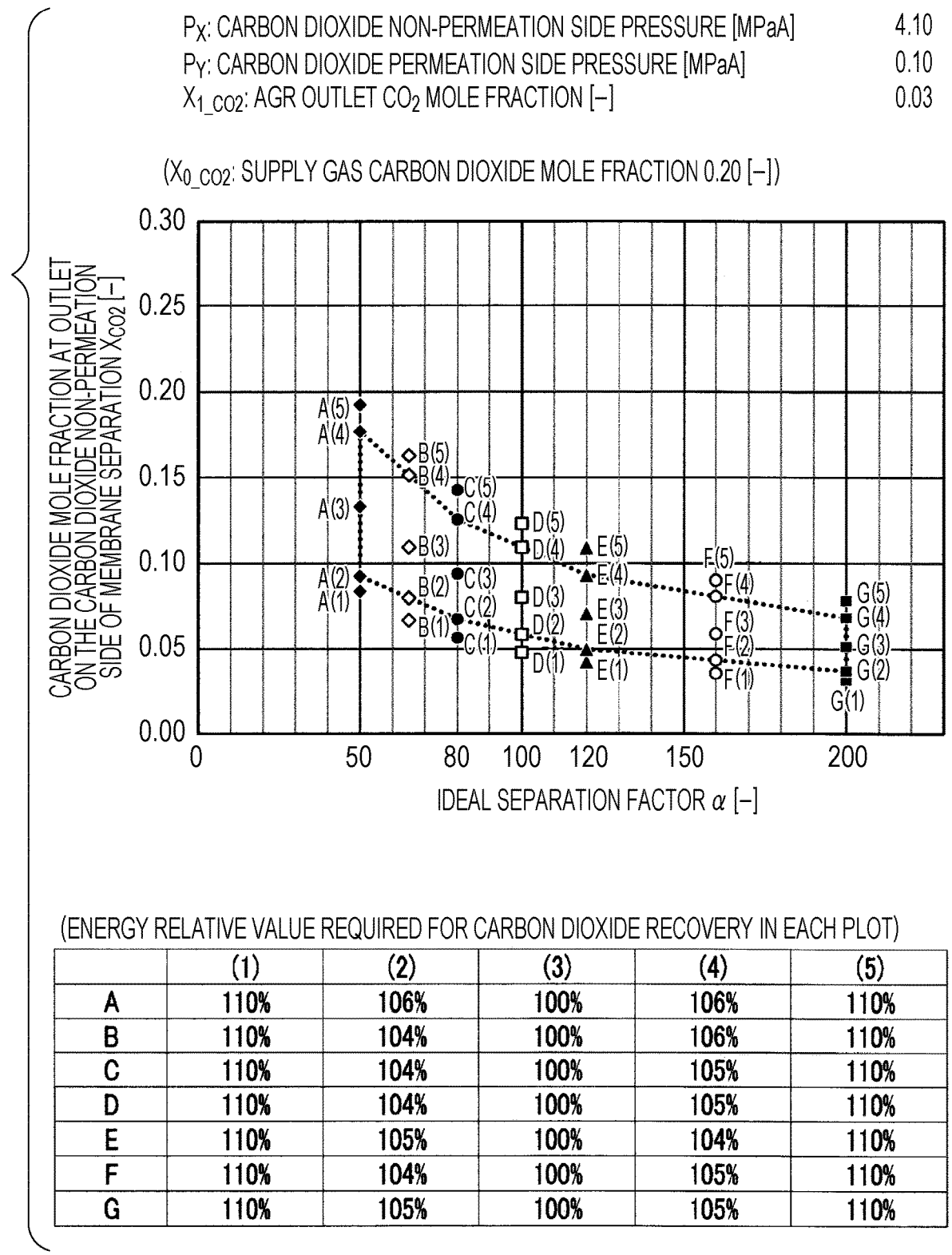
FIG. 72 is a diagram showing evaluation results by simulation.
Figure 73:
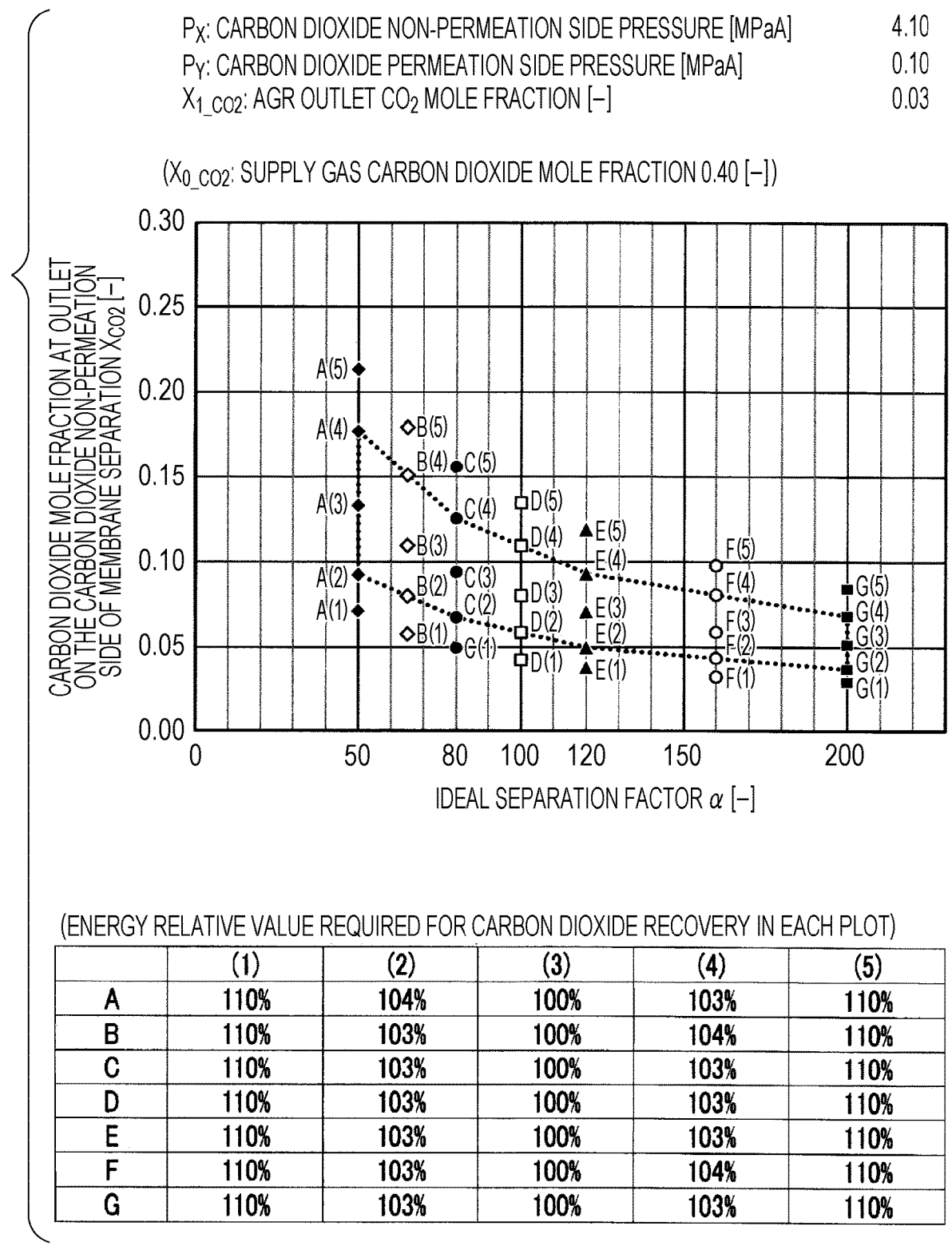
FIG. 73 is a diagram showing evaluation results by simulation.
Figure 74:
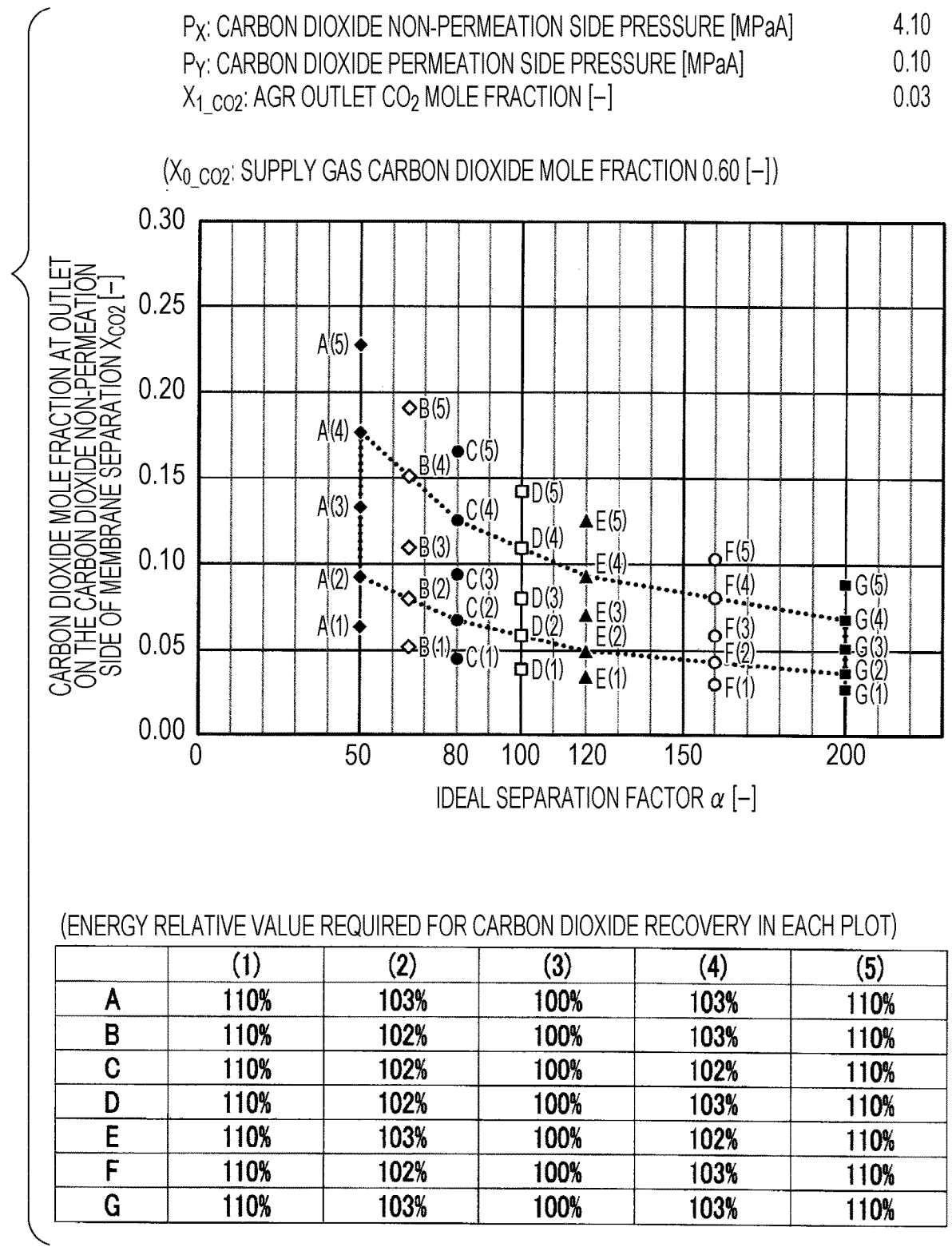
FIG. 74 is a diagram showing evaluation results by simulation.
Figure 75:
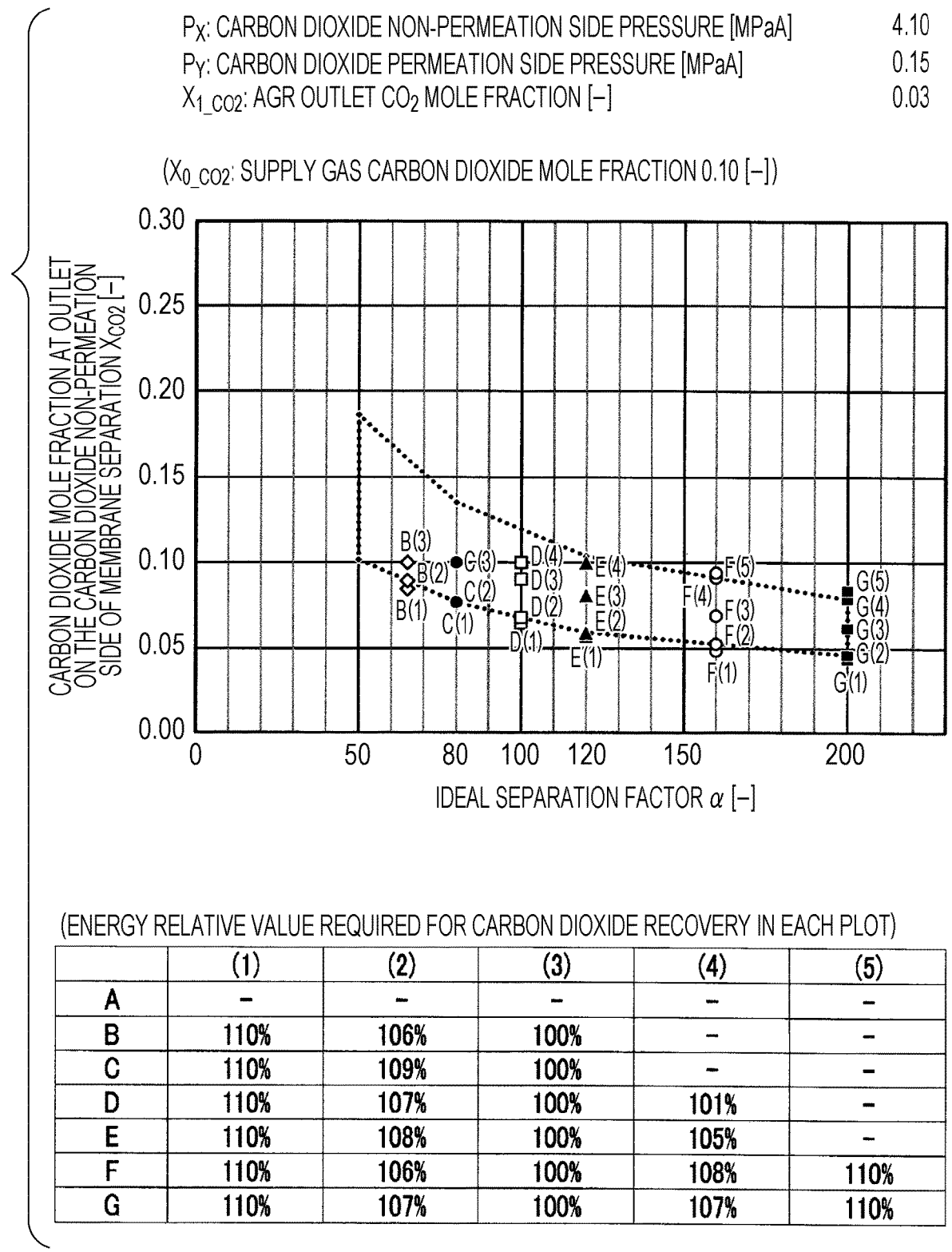
FIG. 75 is a diagram showing evaluation results by simulation.
Figure 76:
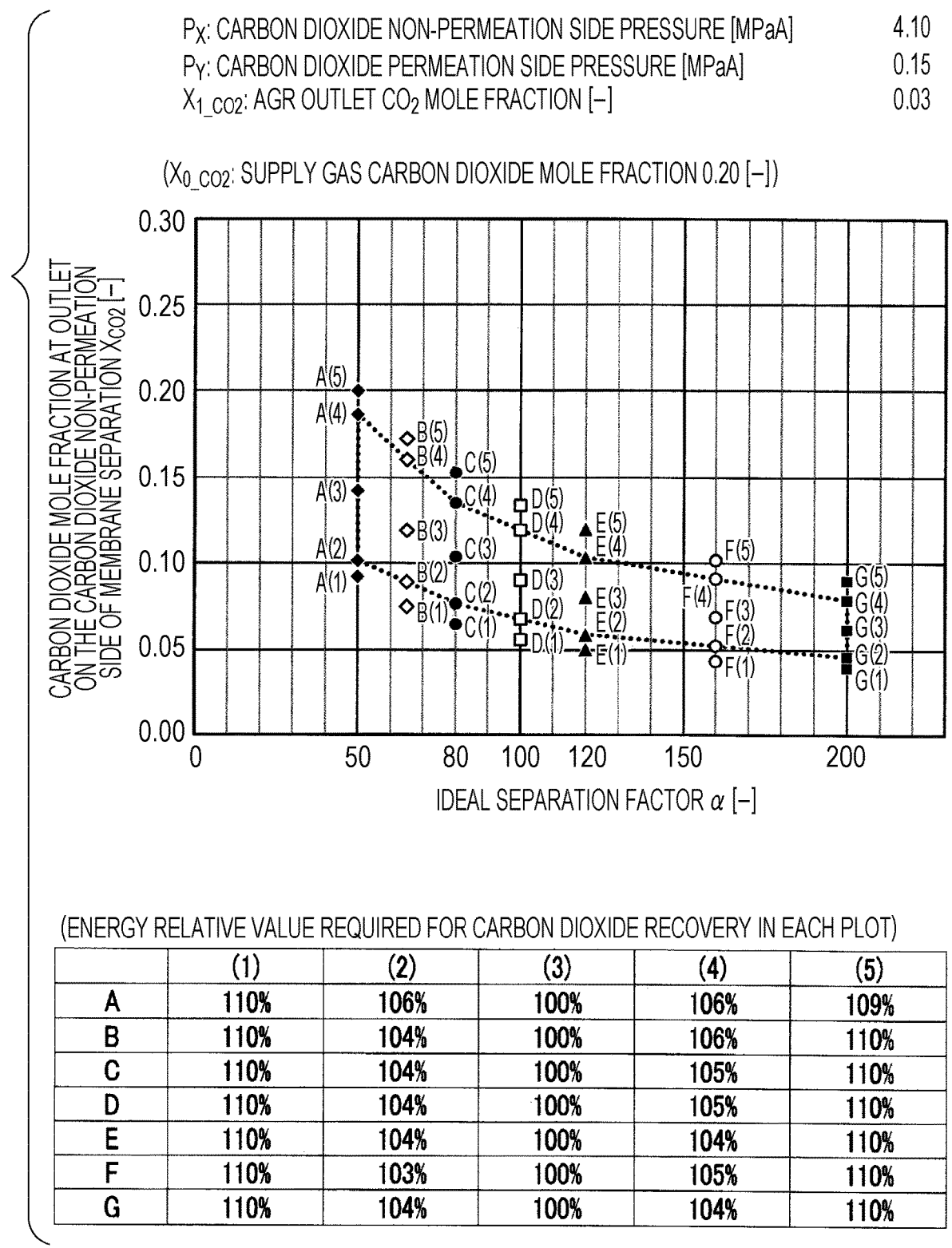
FIG. 76 is a diagram showing evaluation results by simulation.
Figure 77:
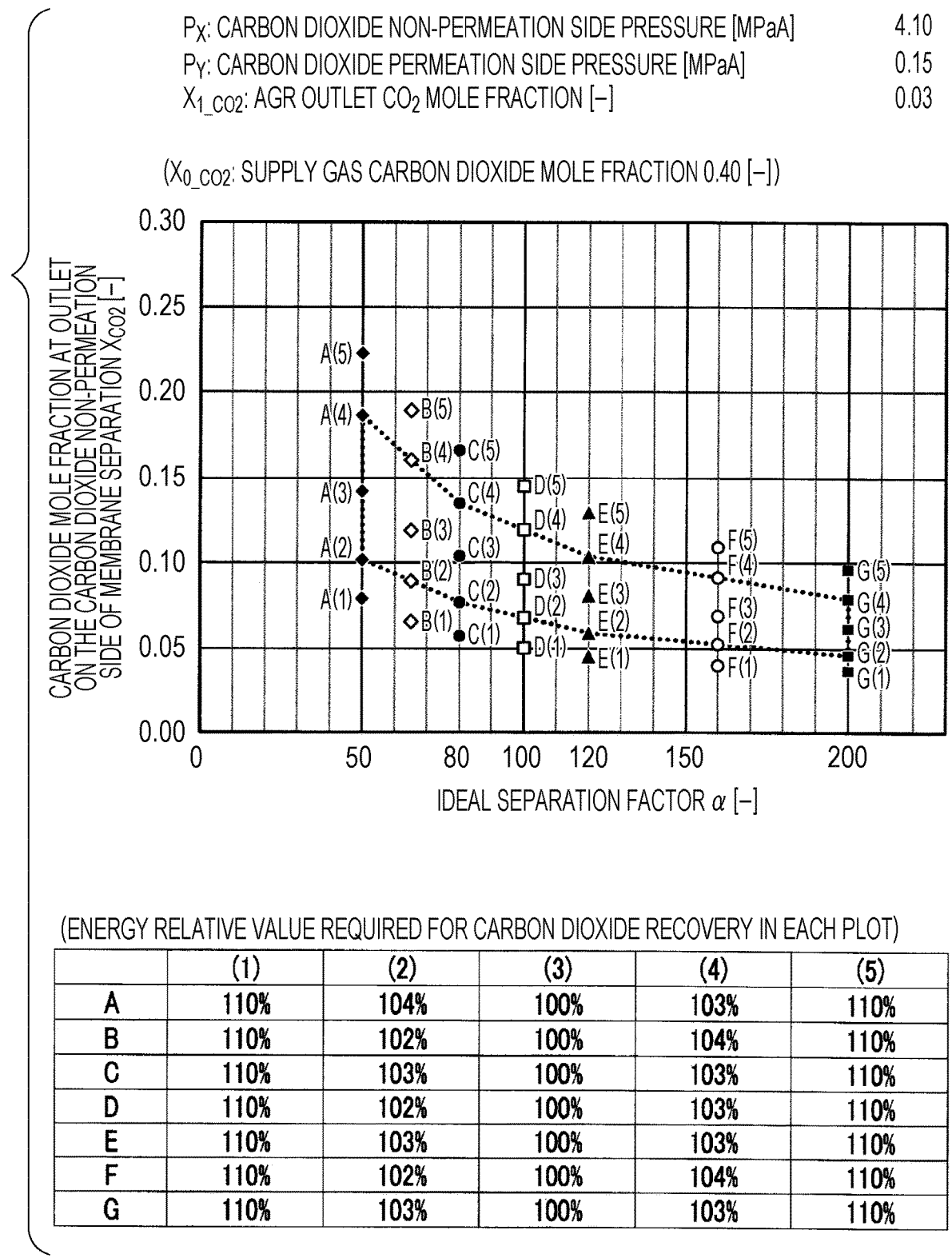
FIG. 77 is a diagram showing evaluation results by simulation.
Figure 78:
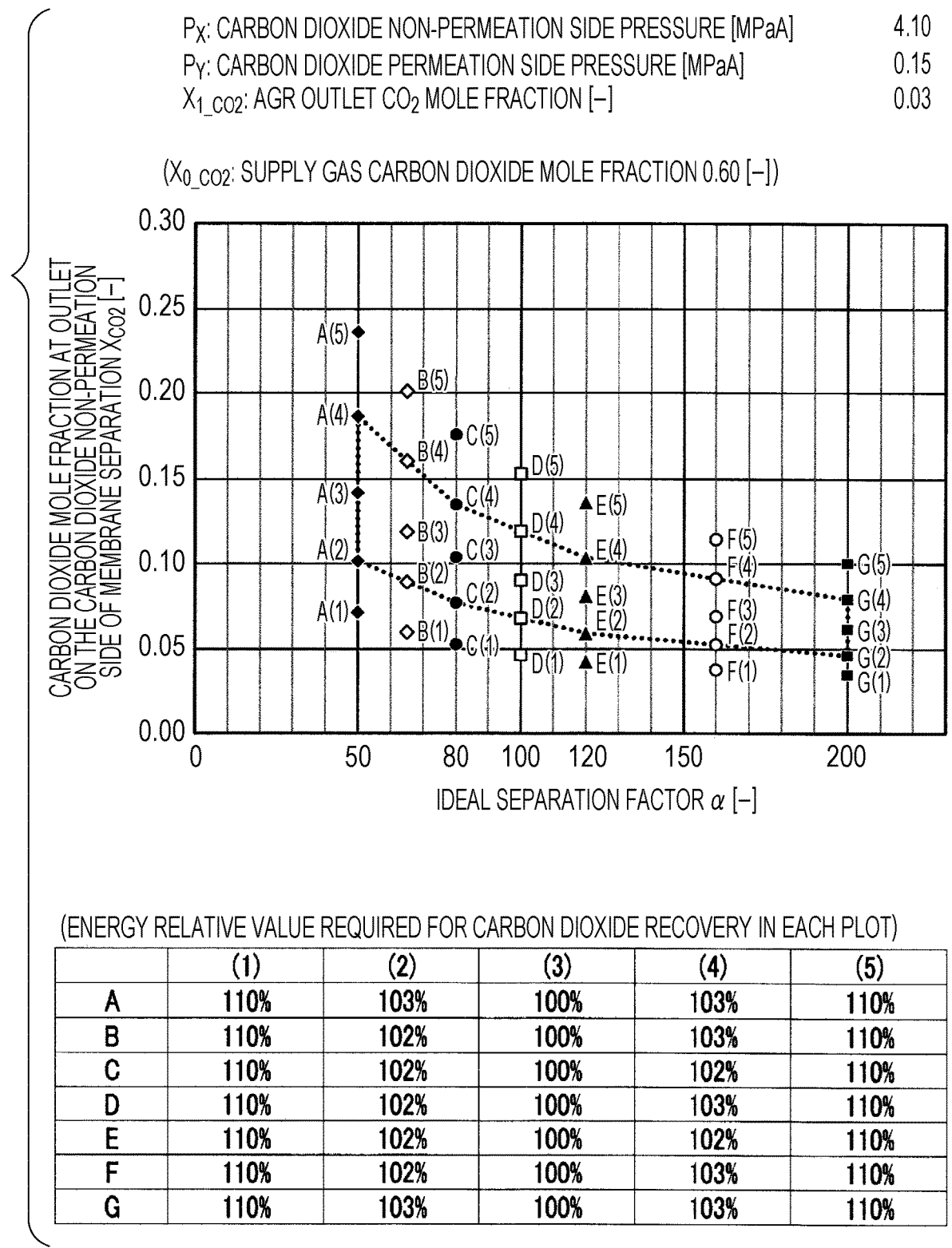
FIG. 78 is a diagram showing evaluation results by simulation.
Figure 79:
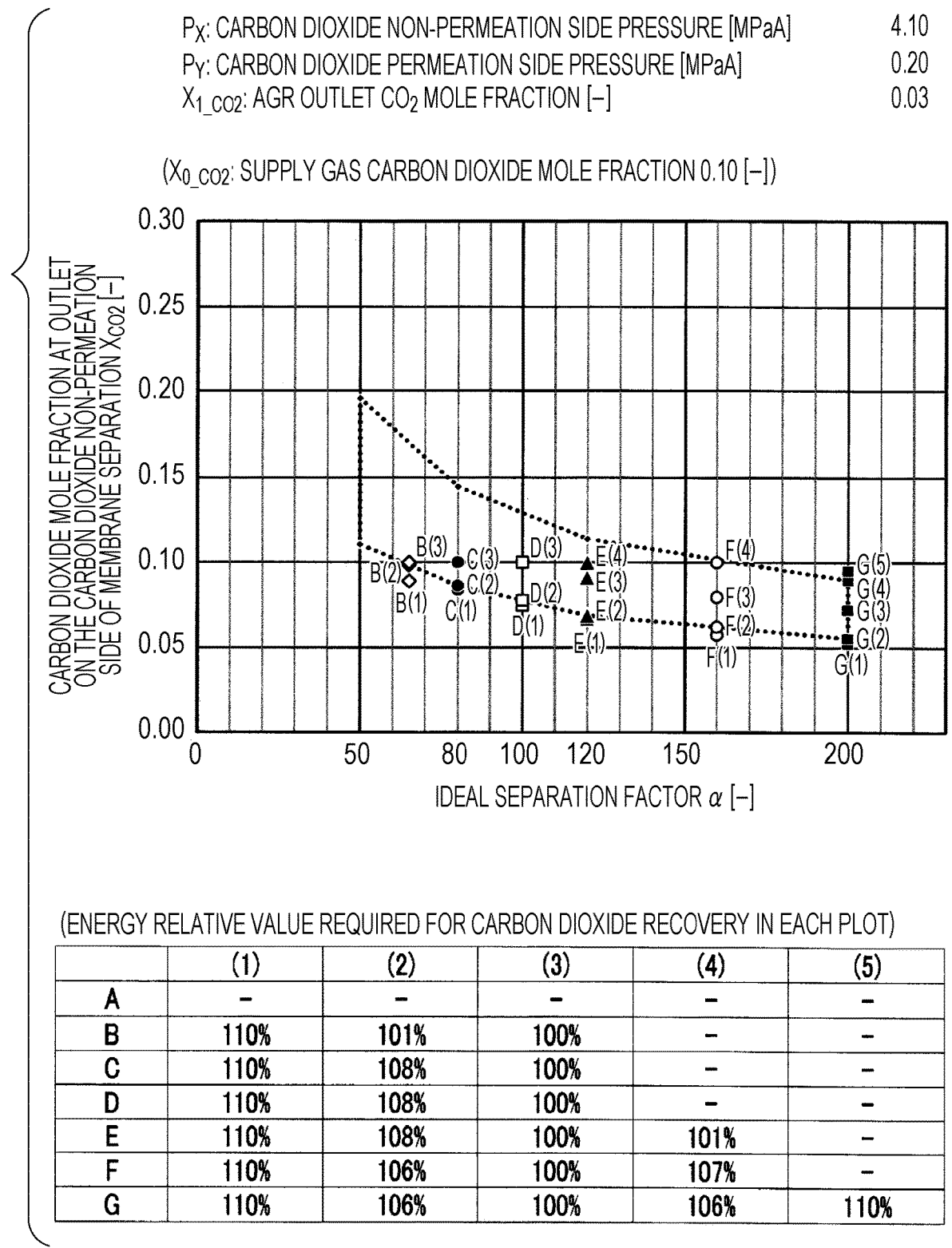
FIG. 79 is a diagram showing evaluation results by simulation.
Figure 80:
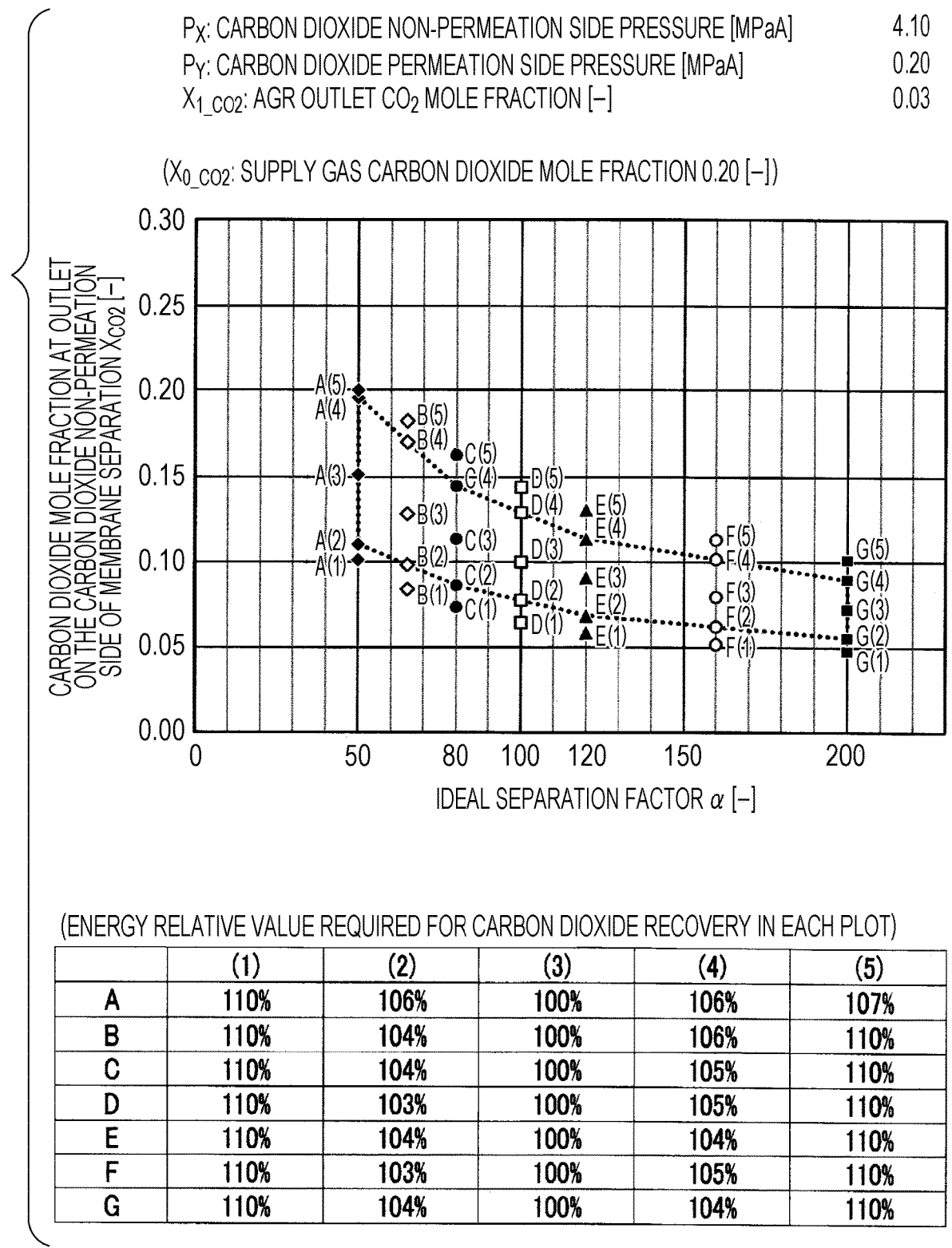
FIG. 80 is a diagram showing evaluation results by simulation.
Figure 81:
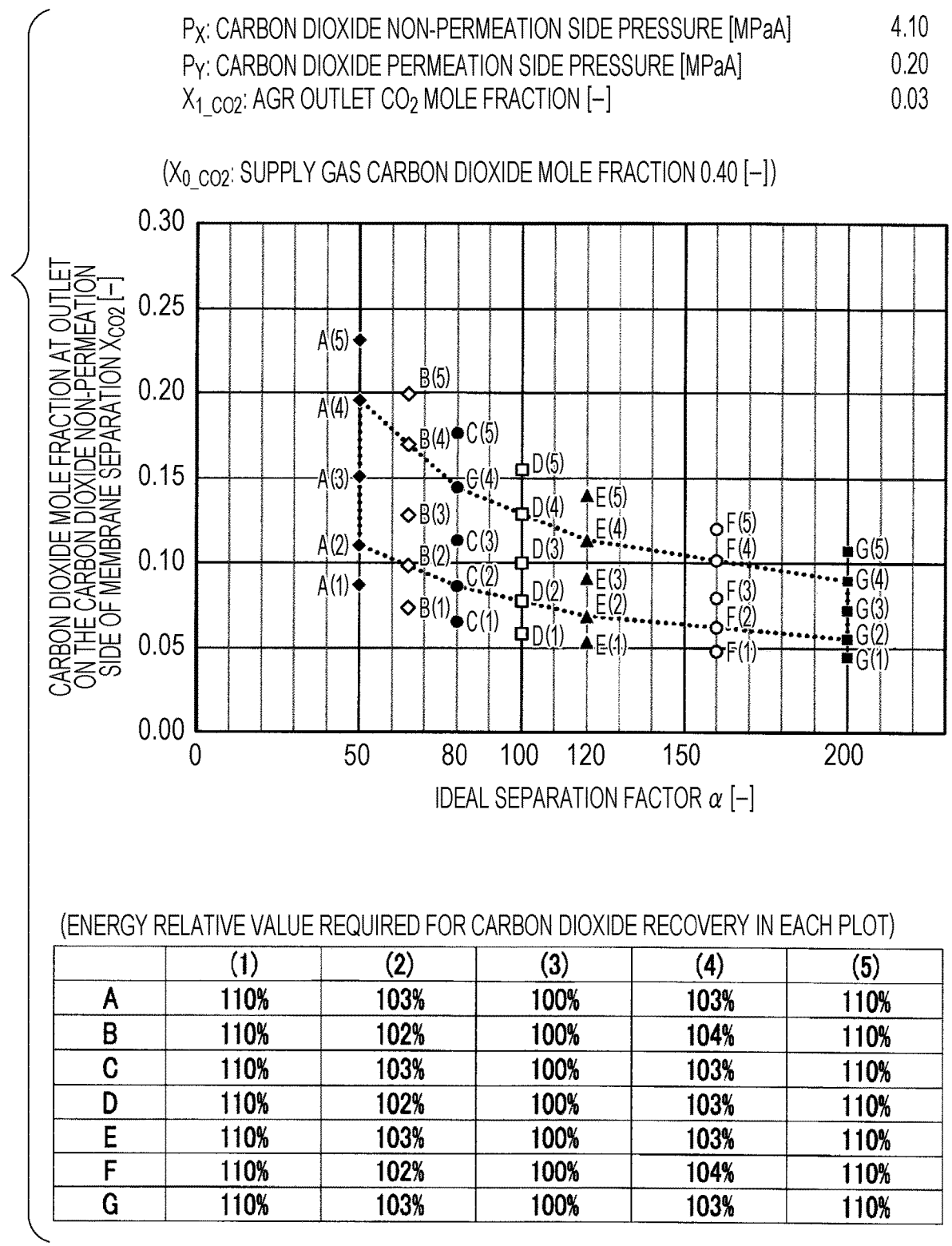
FIG. 81 is a diagram showing evaluation results by simulation.
Figure 82:
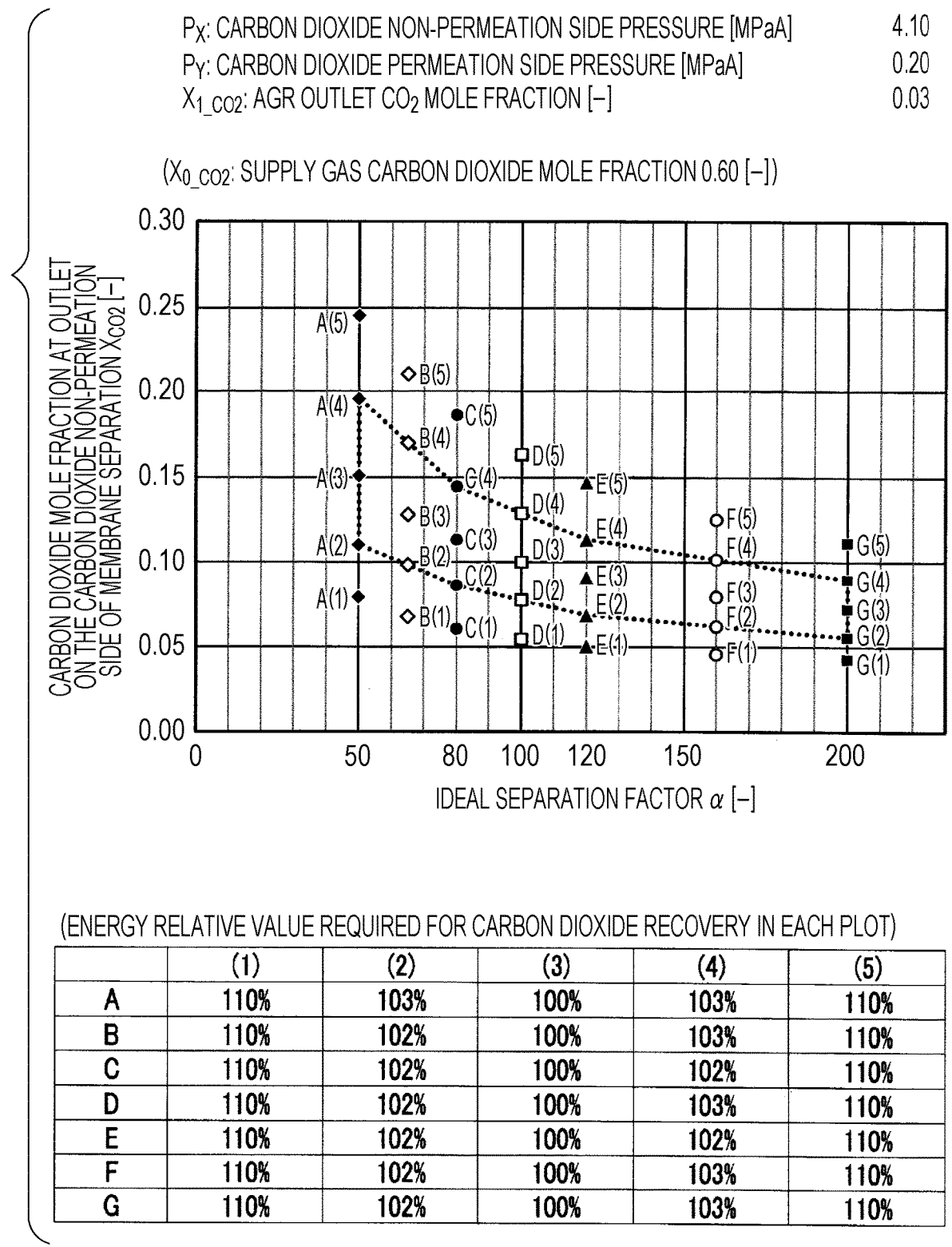
FIG. 82 is a diagram showing evaluation results by simulation.
Figure 83:
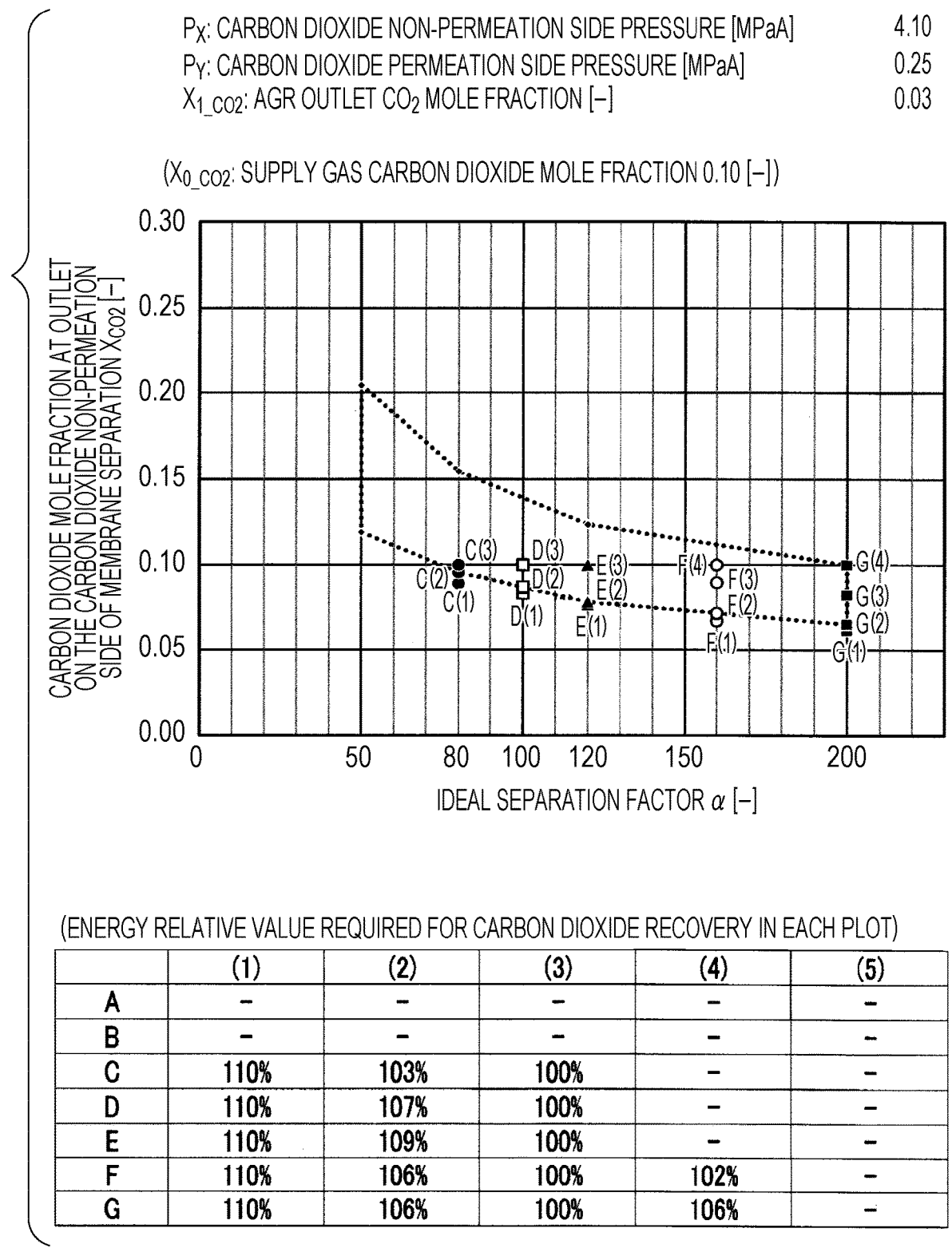
FIG. 83 is a diagram showing evaluation results by simulation.
Figure 84:
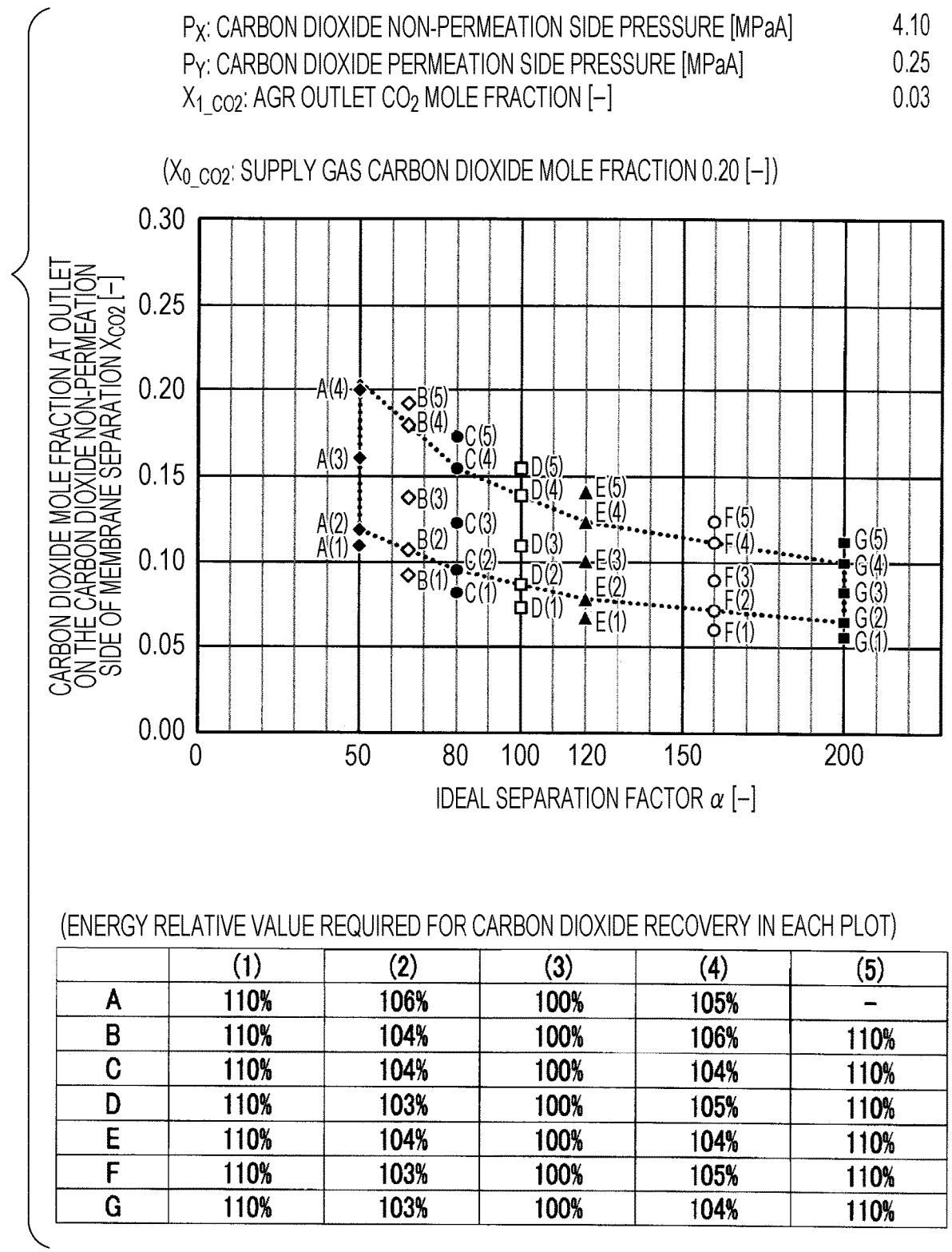
FIG. 84 is a diagram showing evaluation results by simulation.
Figure 85:
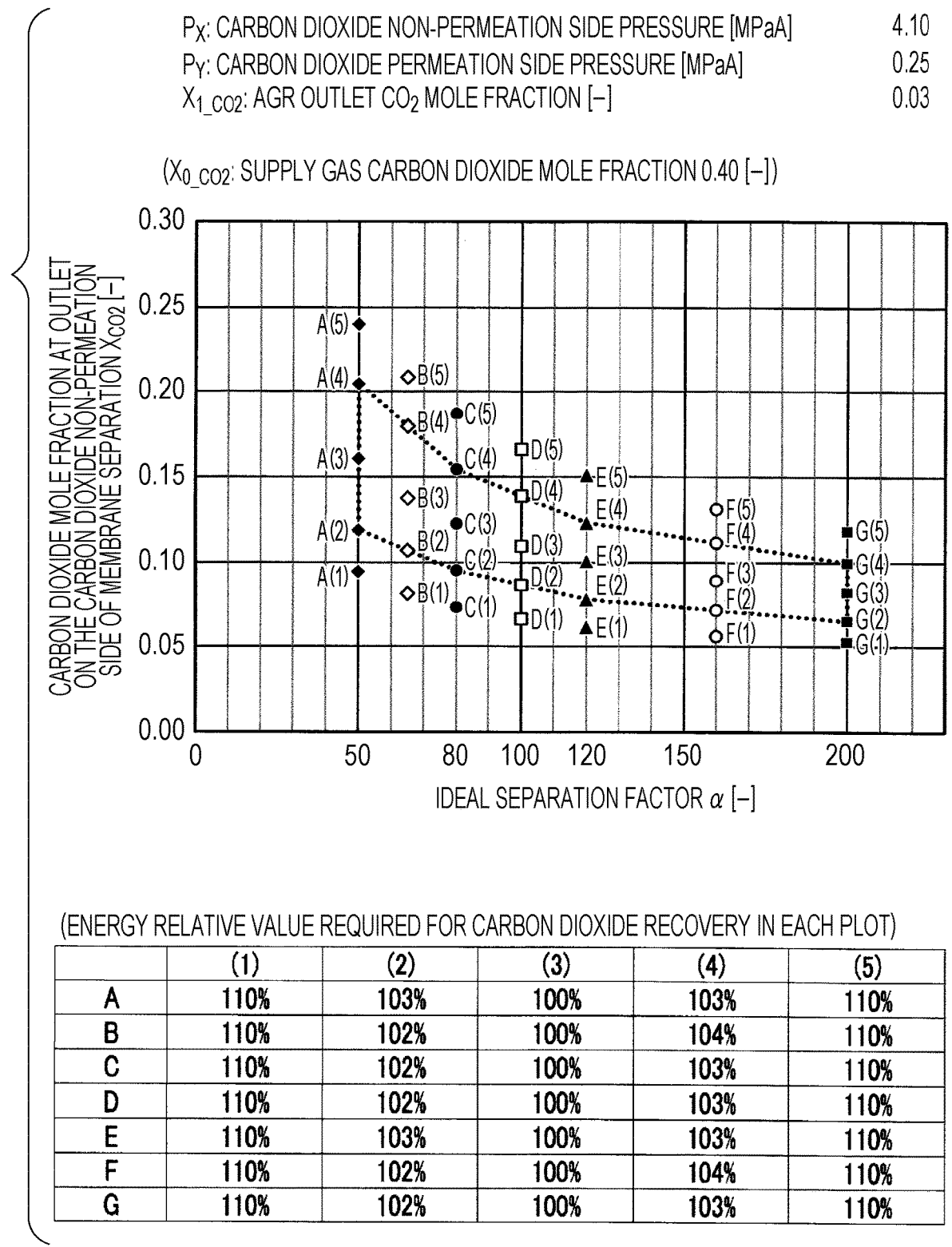
FIG. 85 is a diagram showing evaluation results by simulation.
Figure 86:
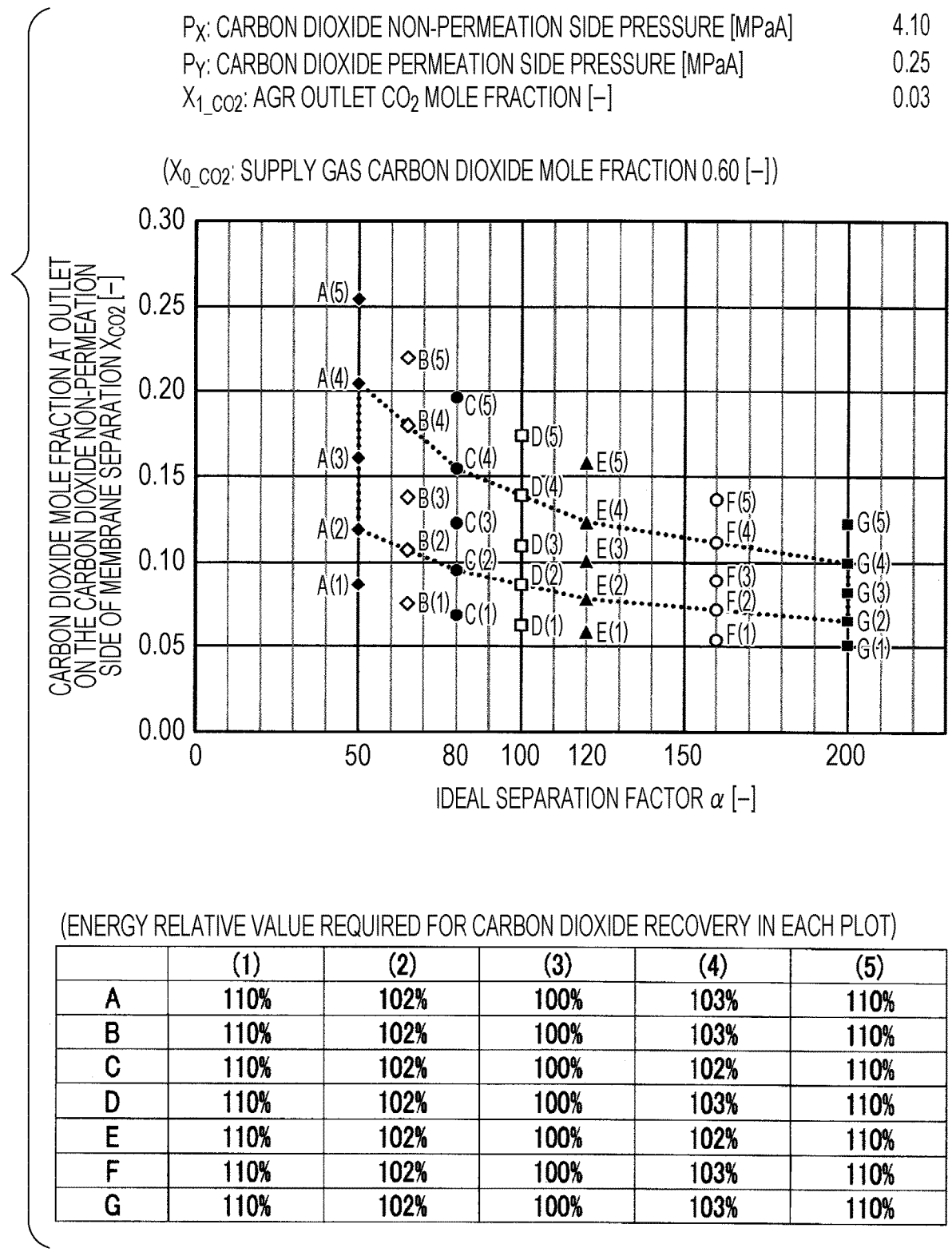
FIG. 86 is a diagram showing evaluation results by simulation.
Figure 87:
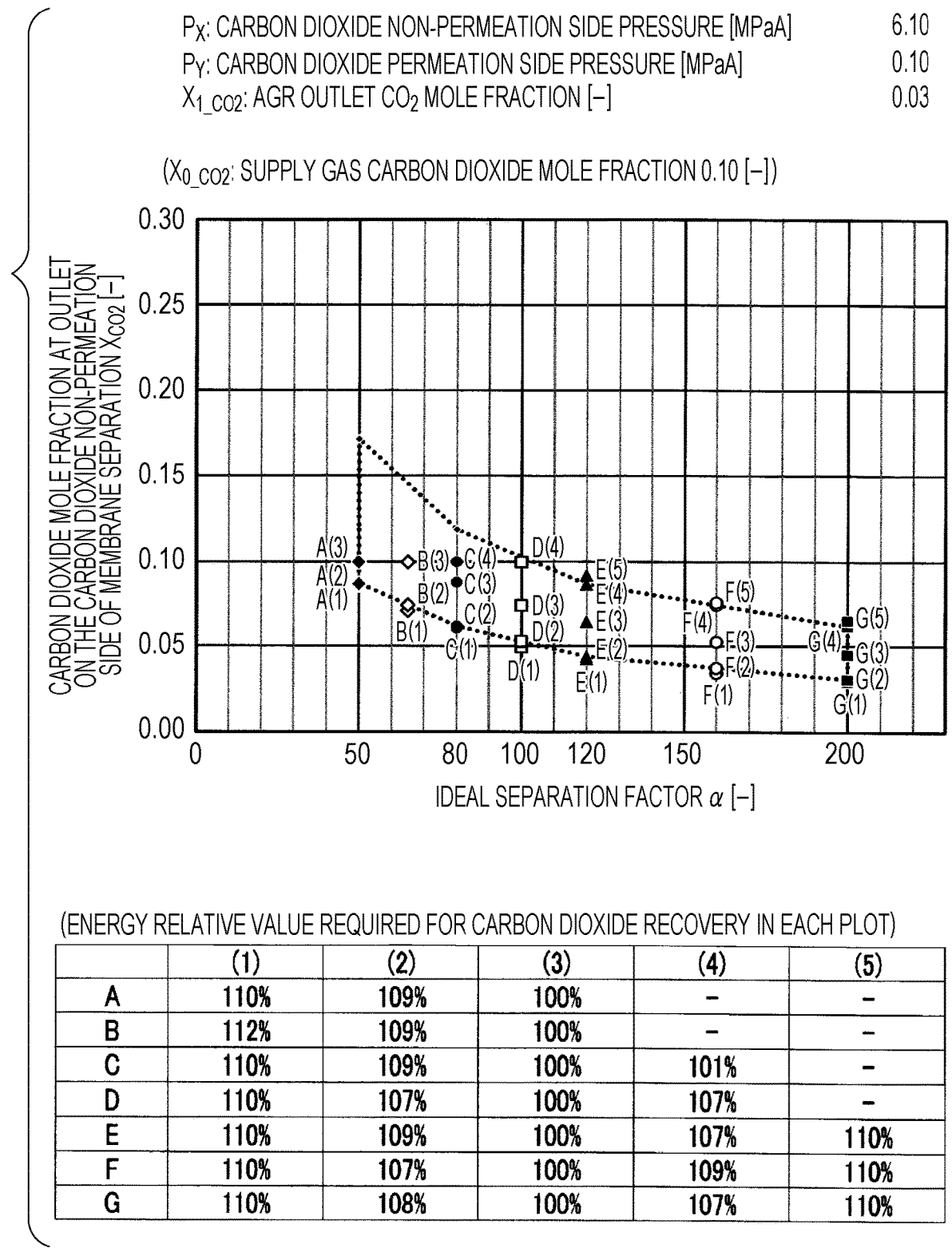
FIG. 87 is a diagram showing evaluation results by simulation.
Figure 88:
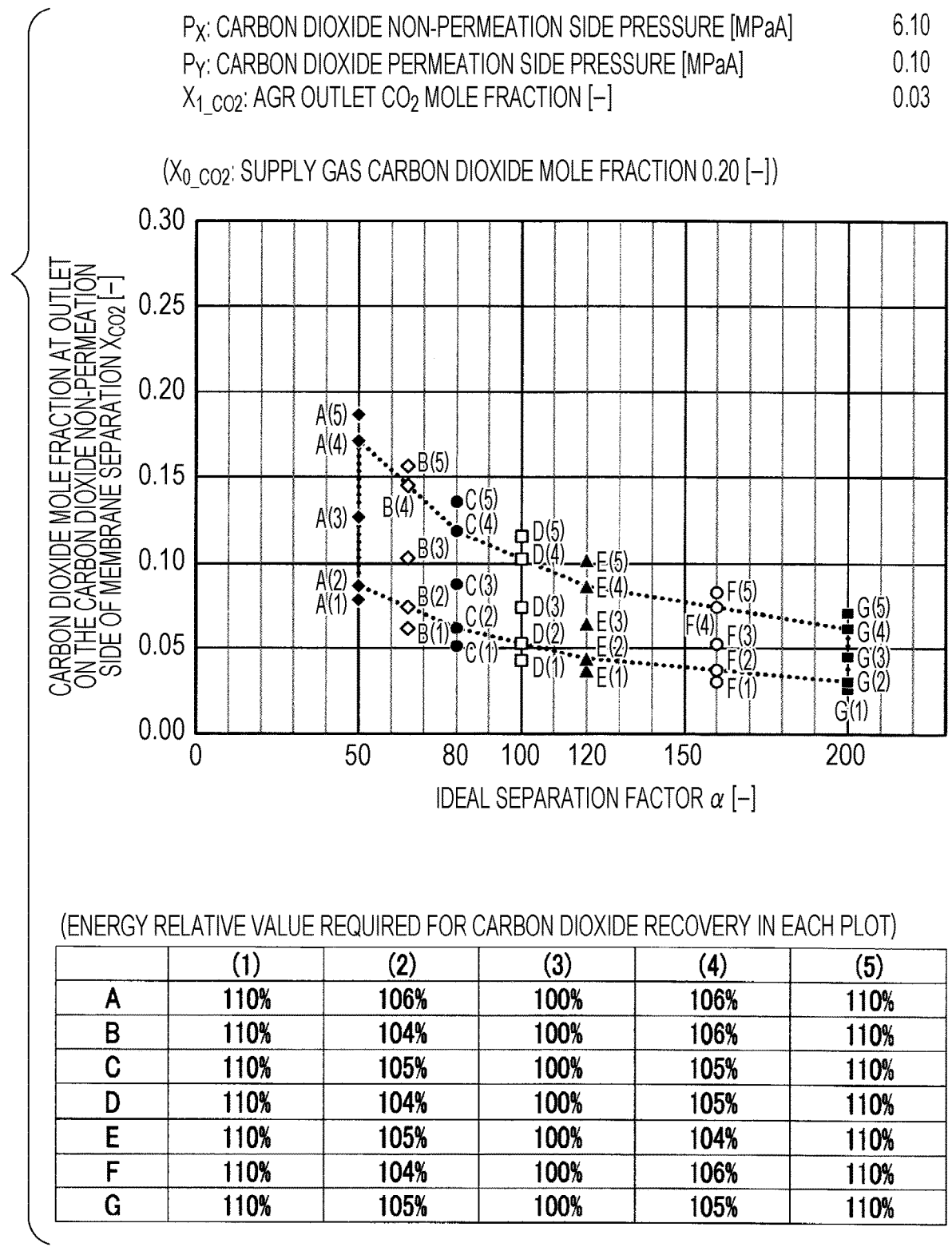
FIG. 88 is a diagram showing evaluation results by simulation.
Figure 89:
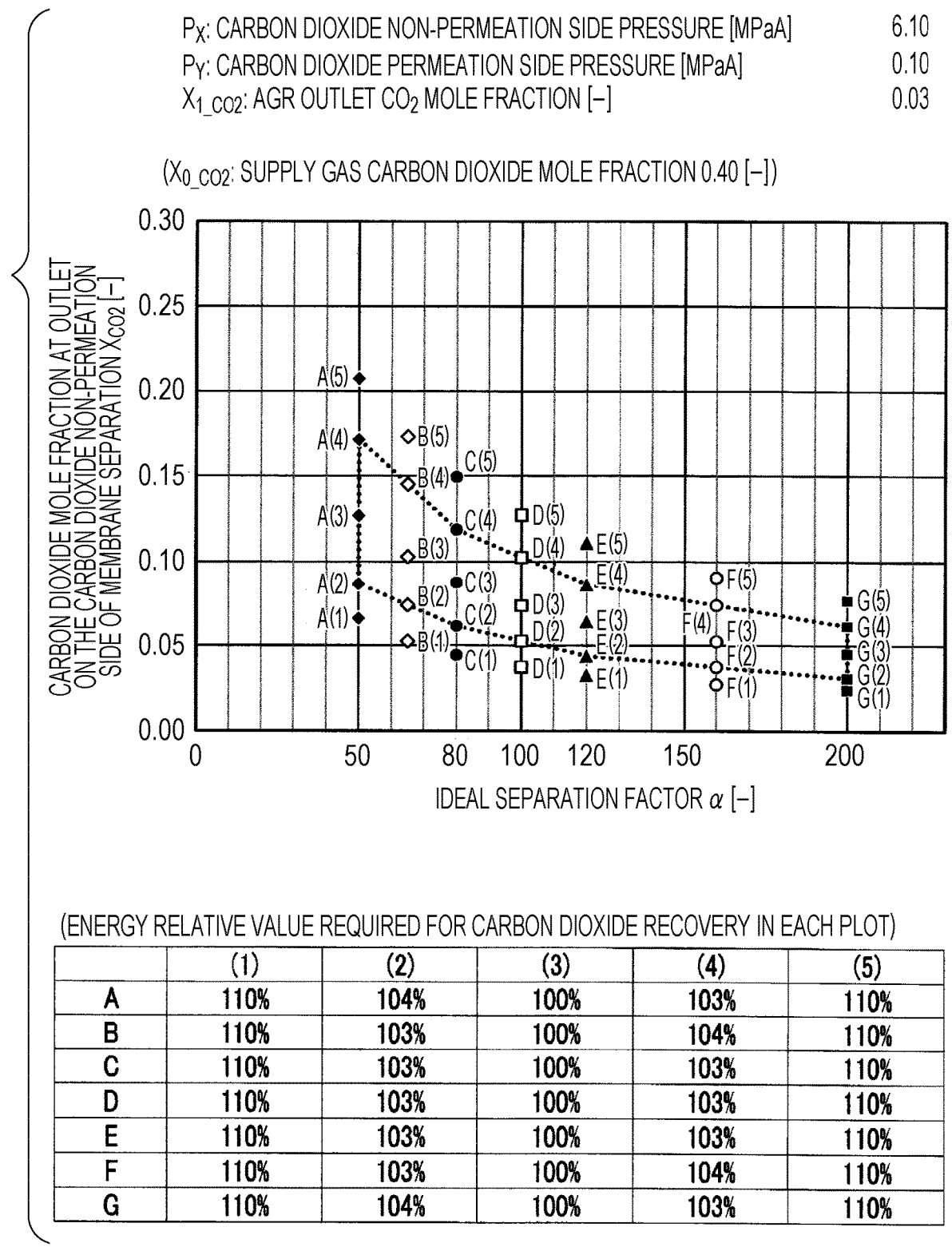
FIG. 89 is a diagram showing evaluation results by simulation.
Figure 90:
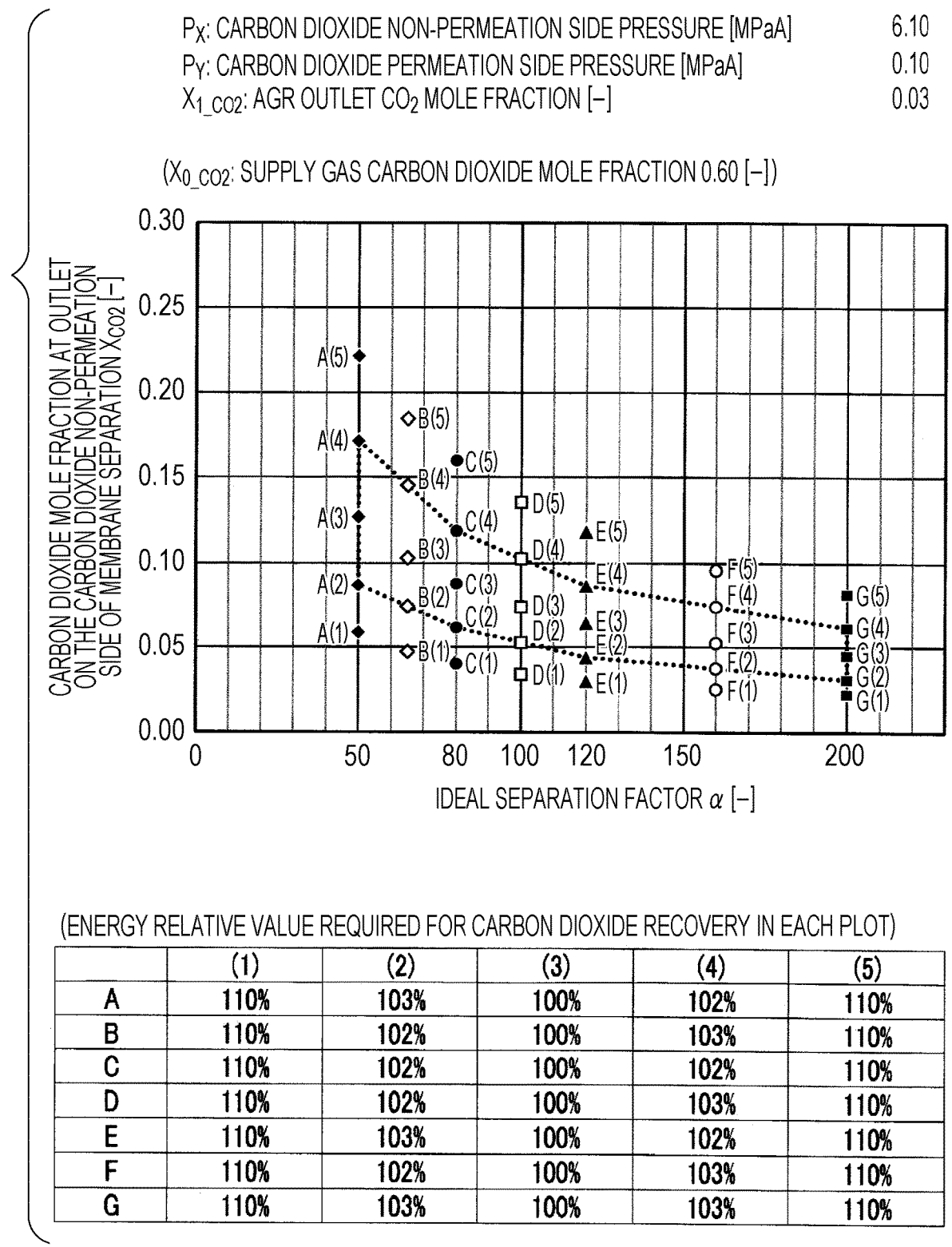
FIG. 90 is a diagram showing evaluation results by simulation.
Figure 91:
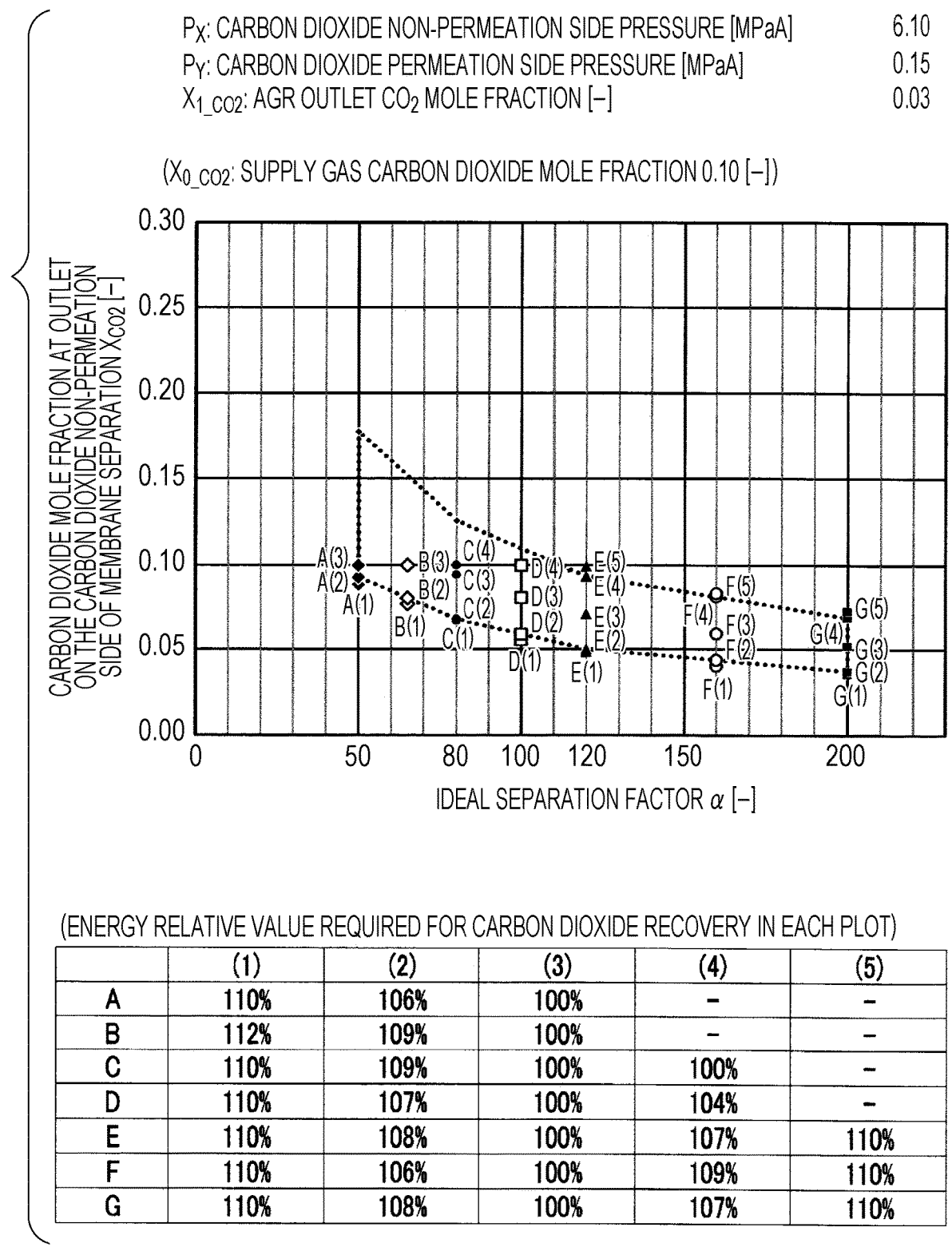
FIG. 91 is a diagram showing evaluation results by simulation.
Figure 92:
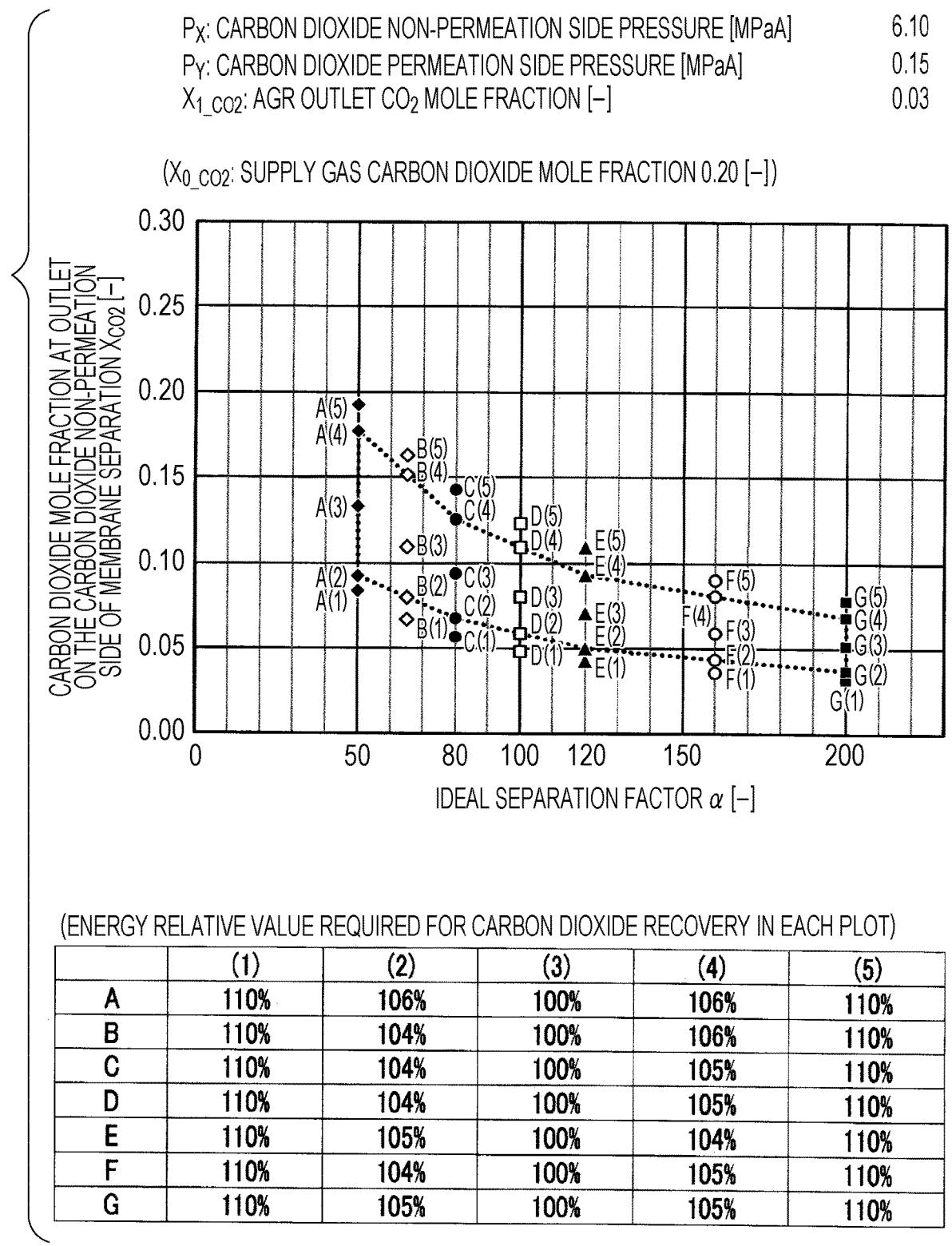
FIG. 92 is a diagram showing evaluation results by simulation.
Figure 93:
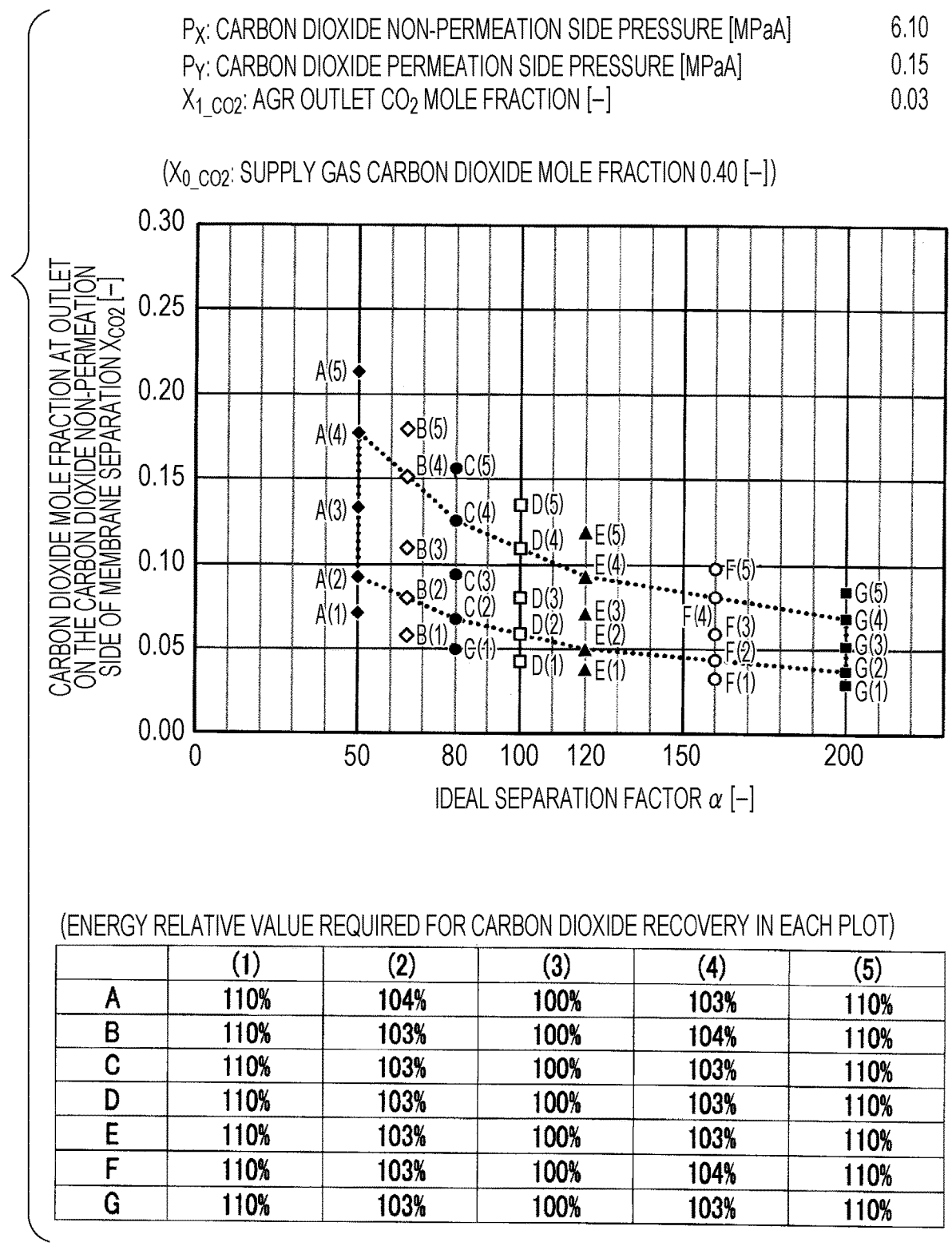
FIG. 93 is a diagram showing evaluation results by simulation.
Figure 94:
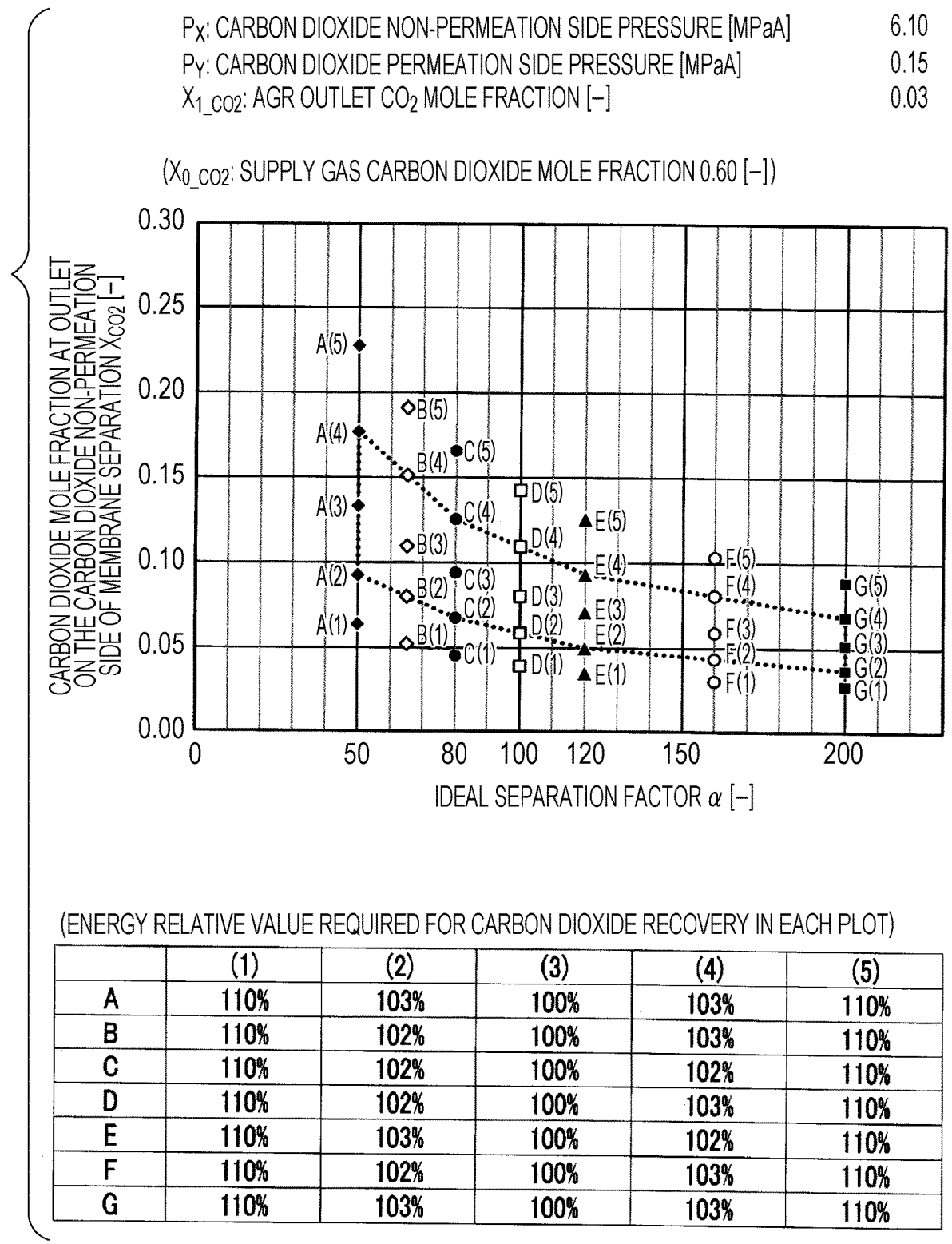
FIG. 94 is a diagram showing evaluation results by simulation.
Figure 95:
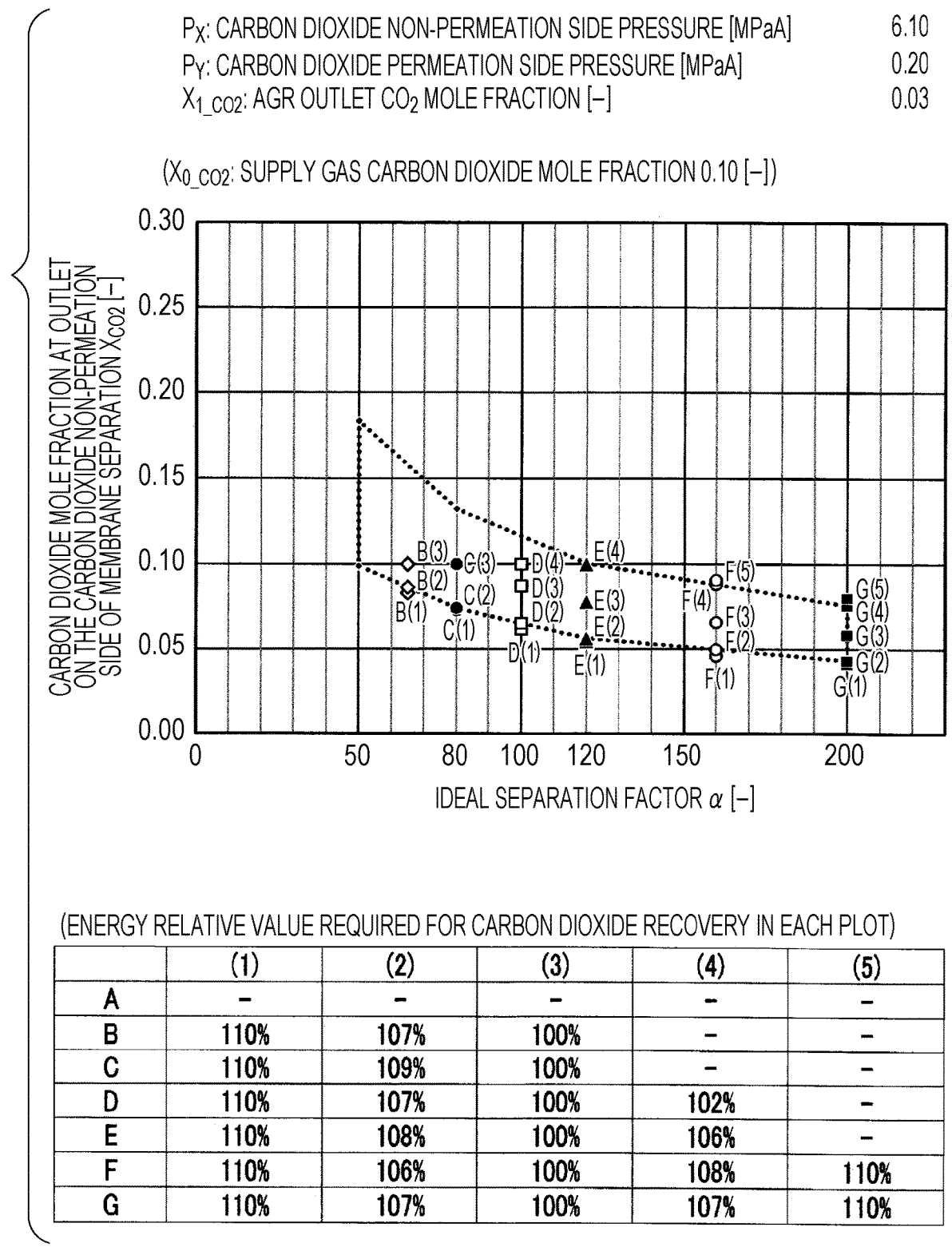
FIG. 95 is a diagram showing evaluation results by simulation.
Figure 96:
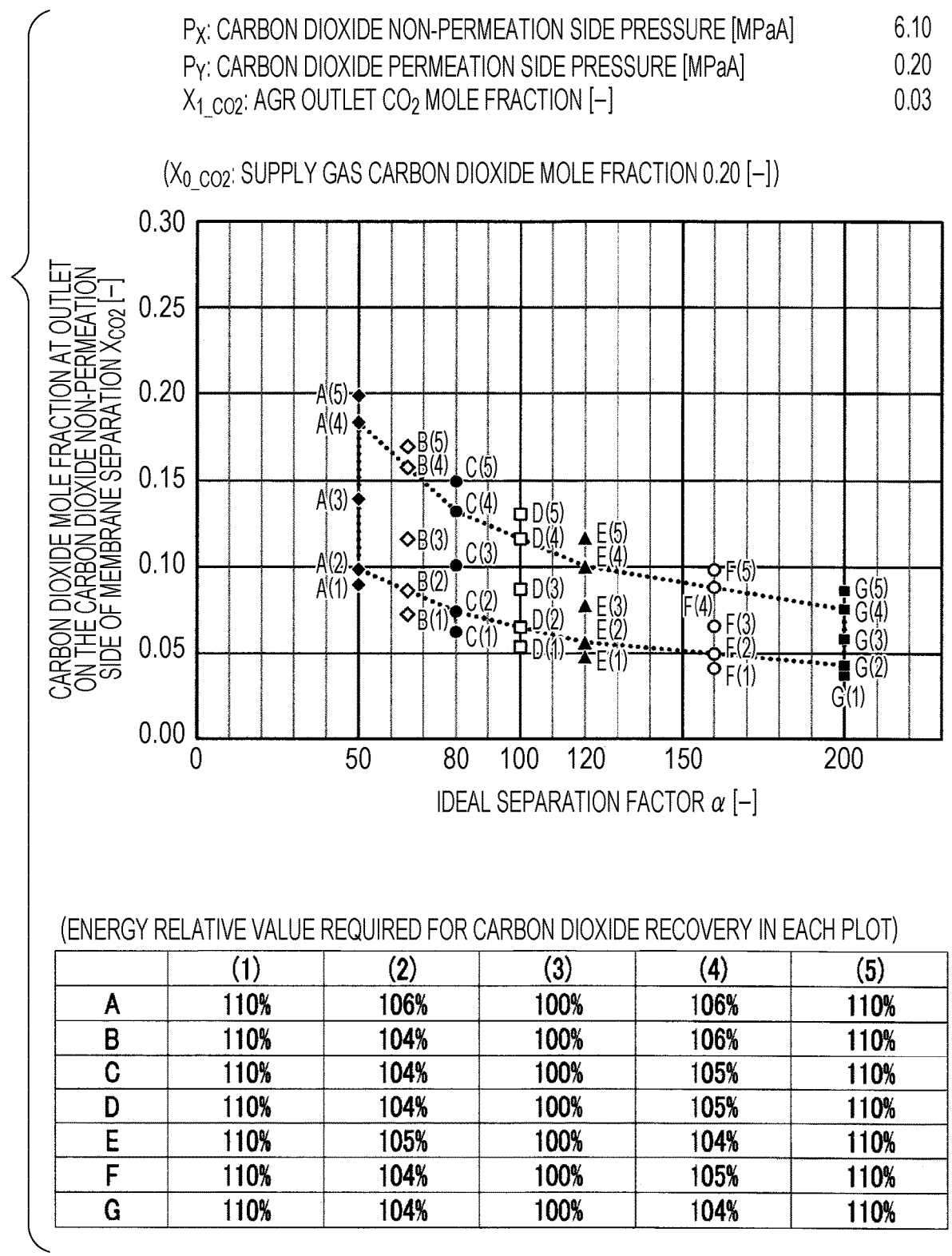
FIG. 96 is a diagram showing evaluation results by simulation.
Figure 97:
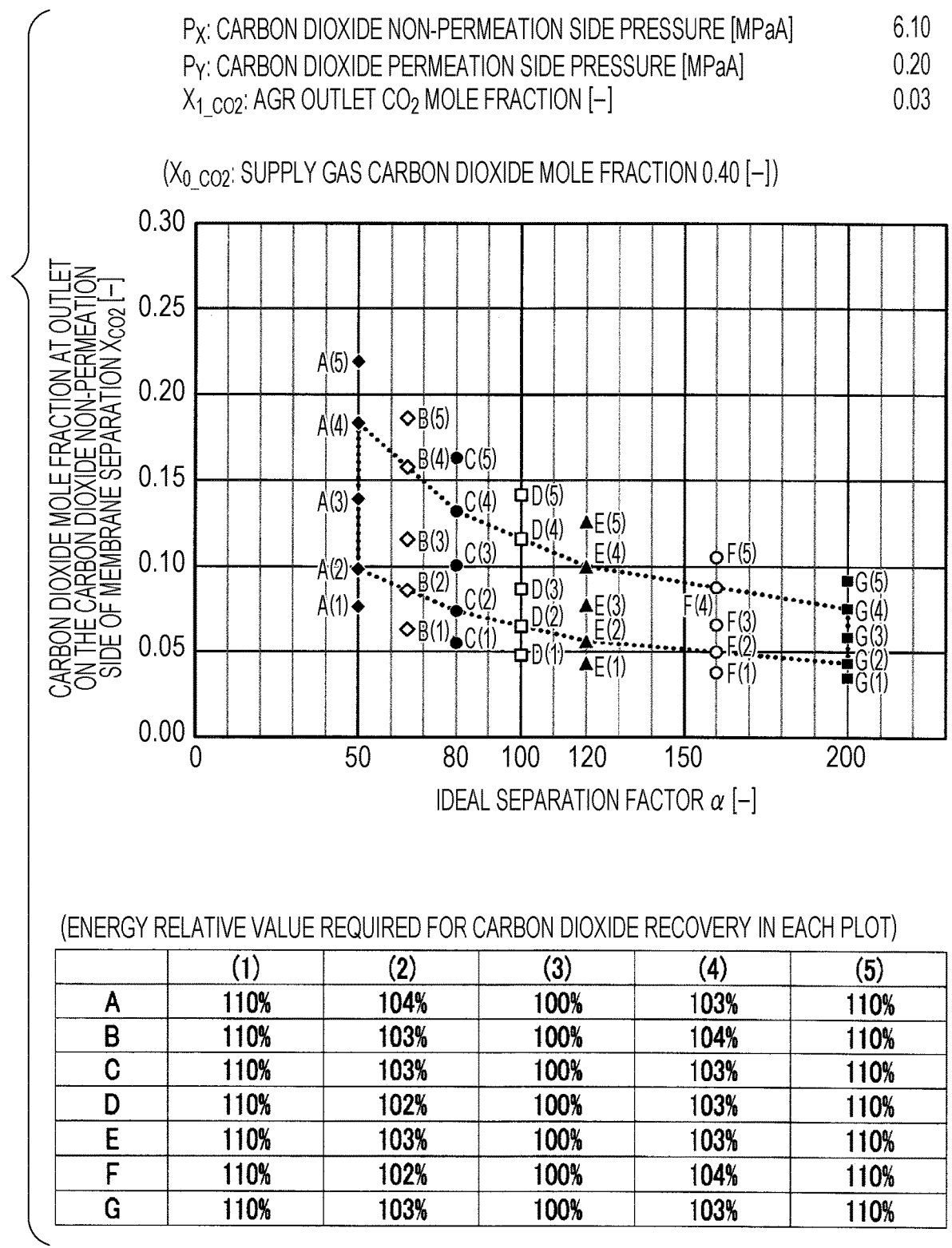
FIG. 97 is a diagram showing evaluation results by simulation.
Figure 98:
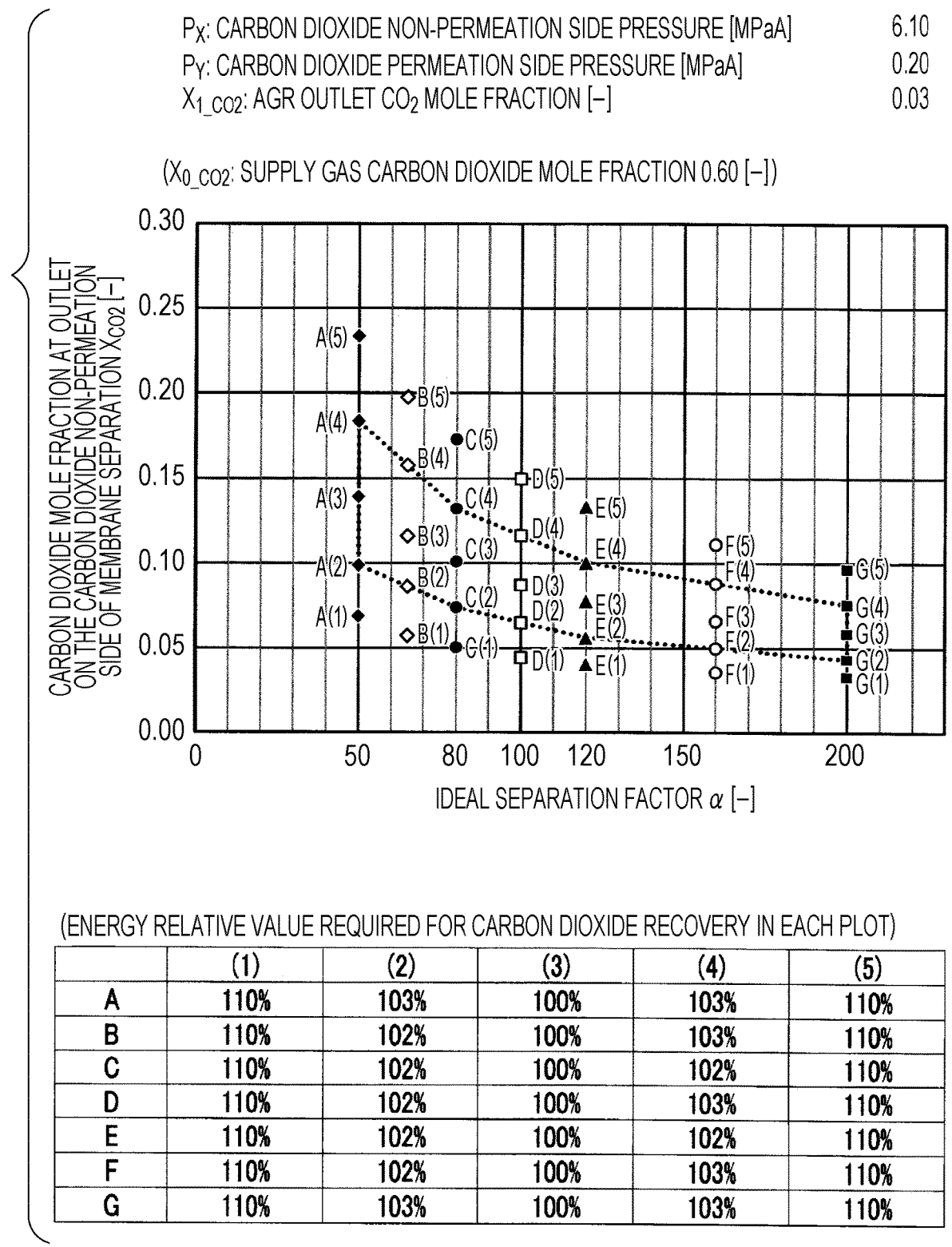
FIG. 98 is a diagram showing evaluation results by simulation.
Figure 99:
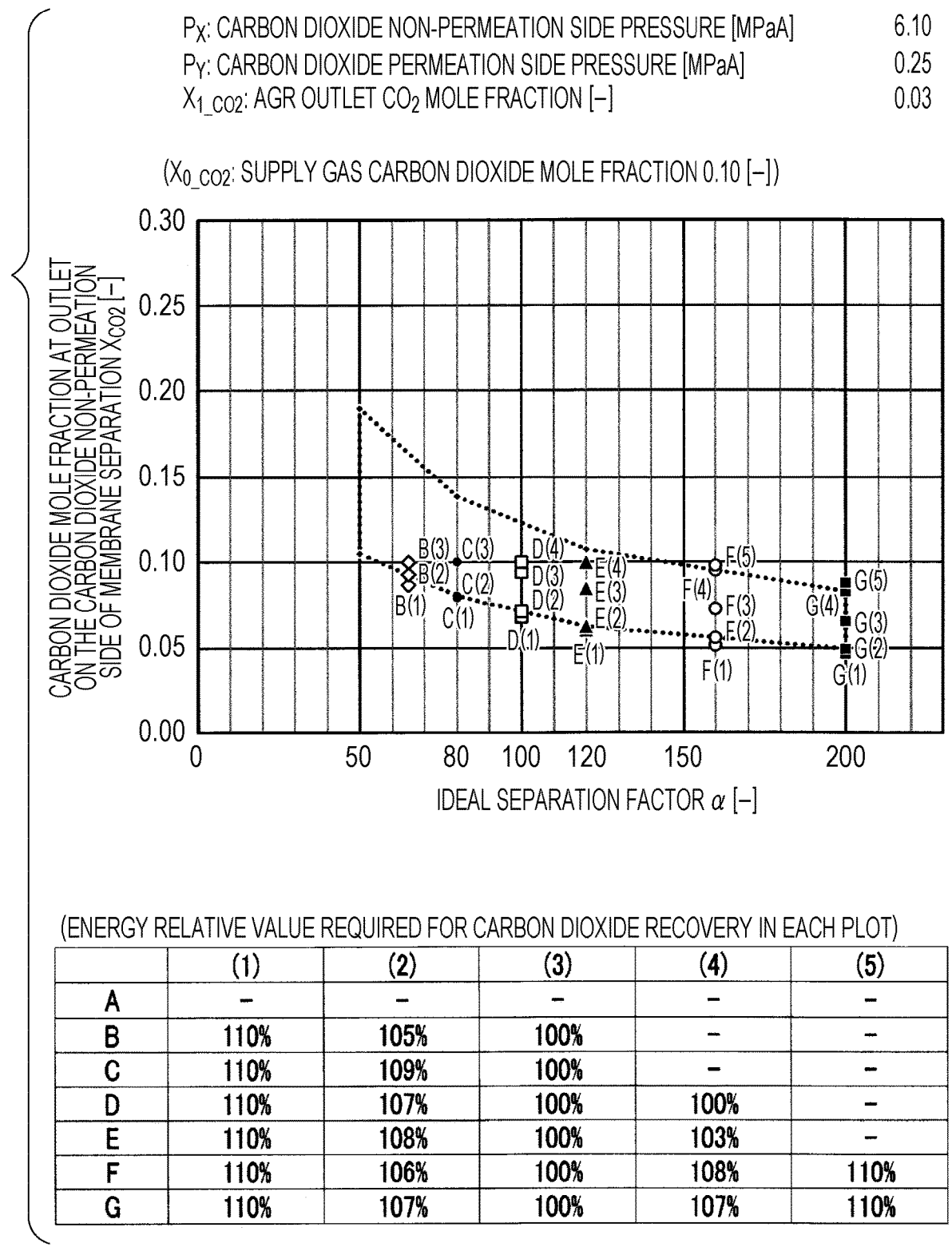
FIG. 99 is a diagram showing evaluation results by simulation.
Figure 100:
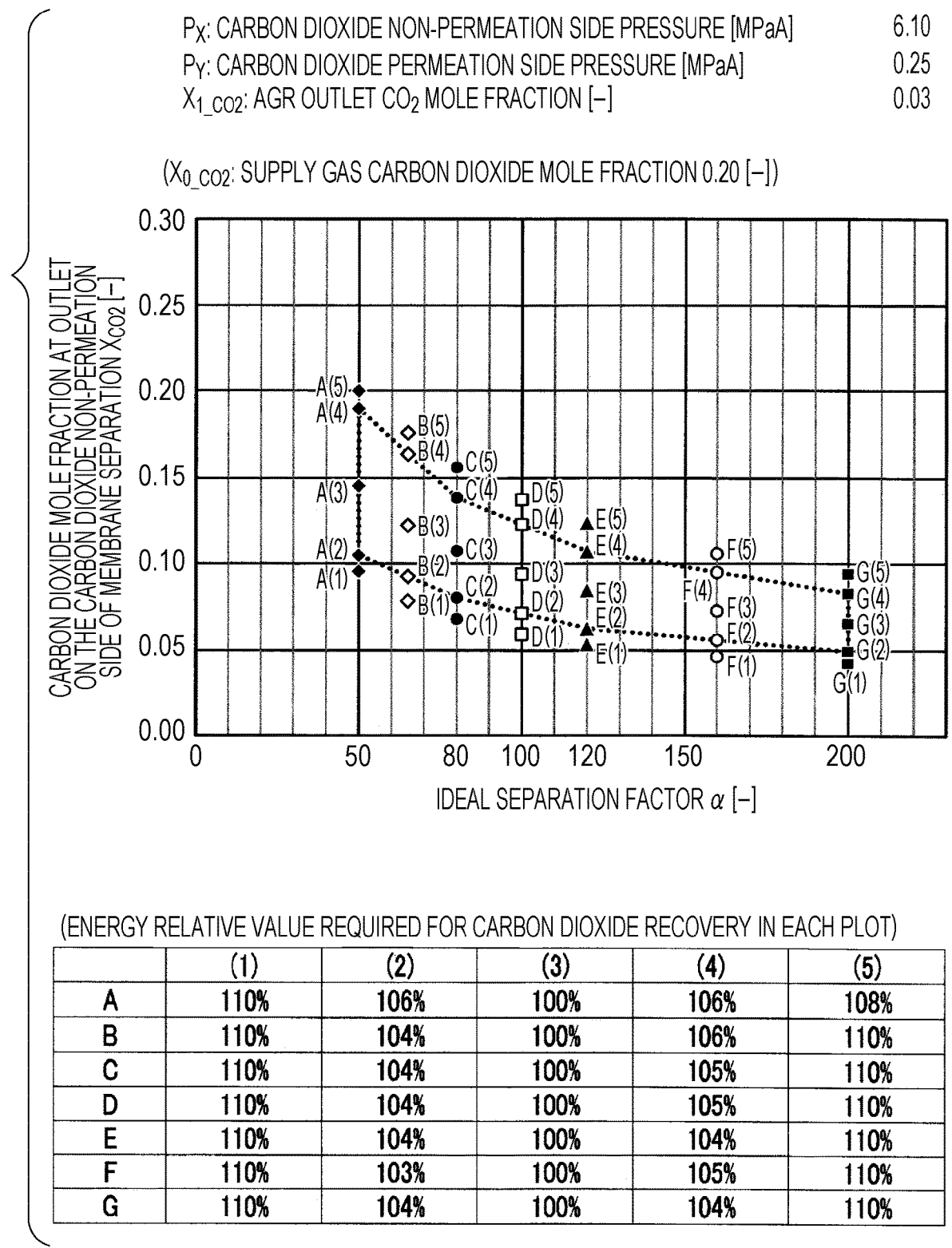
FIG. 100 is a diagram showing evaluation results by simulation.

Further, in FIG. 19 or 67, there is no plot for the given pressure conditions. This is because the supply gas carbon dioxide mole fraction $X_{0\_CO2}$ (the value is 0.10) is lower than the carbon dioxide mole fraction under the proper distribution conditions corresponding to the given pressure conditions. Under the given conditions in FIG. 19 or 67, the membrane separation is not preferably used in view of energy in the carbon dioxide separation, and it is preferred to use only the acid gas removal process using an absorbent in view of energy. Further, in FIG. 15 or the like, there are less plots than those in other drawings for the given pressure conditions. This is on the basis that there is a case where the supply gas carbon dioxide mole fraction $X_{0\_CO2}$ is lower than the carbon dioxide mole fraction under the proper distribution conditions corresponding to the given conditions. Accordingly, the present invention is characterized in that the carbon dioxide mole fraction at the outlet on the carbon dioxide non-permeation side $X_{CO2}$ of the membrane separation is expressed in the range surrounded by $a_1$, $a_2$, $a_3$, $a_4$, $a_5$, $a_6$, $a_7$, and $a_8$ in FIG. 1, but is required that the supply gas carbon dioxide mole fraction $X_{0\_CO2}$ is the value or more corresponding to the given ideal separation factor of inorganic separation membrane 2 on the range connected $a_2$, $a_4$, $a_6$, and $a_8$ with a straight line in FIG. 1.

As shown in FIGS. 7 to 102, for each of the ideal separation factors α expressed by A to G in the range of the above-described parameters, it can be confirmed that $X_{CO2}$ corresponding to (1) and (5) are outside the proper range, and the energy relative values corresponding to (2) and (3) are less than 110% and within the proper range. Accordingly, it can be understood that under the conditions of each pressure and each carbon dioxide mole fraction, carbon dioxide can be separated in the range where the energy relative value required in the scope of the present invention is smaller than 110%.

According to the present invention explained above, when a membrane separation is performed by a separation membrane system using an inorganic separation membrane 2 for a mixed gas containing methane and carbon dioxide, and then carbon dioxide is separated by an acid gas removal process using an absorbent, by specifying the suitable range of the carbon dioxide mole fraction at the outlet on the carbon dioxide non-permeation side $X_{CO2}$ of the membrane separation, corresponding to an ideal separation factor of the inorganic separation membrane, the proper distribution conditions become feasible. Accordingly, the method for separating carbon dioxide in which the decrease of the production amount by methane permeation and the energy loss accompanying the decrease are suppressed in a membrane separation, and further the energy consumption in an acid gas removal process using an absorbent, which is a post-process, can be suppressed is performed.

In addition, the embodiment described above shows one embodiment of the present invention, the present invention is not limited to the above-described embodiment, and it goes without saying that modifications and improvements within the range in which the constitution of the present invention is provided and the object and effect of the present invention can be achieved are included in the content of the present invention. Further, there is no problem that even if other structures, shapes and the like are used as the specific structures, shapes and the like in performing the present invention within the range in which the object and effect of the present invention can be achieved. The present invention is not limited to the above-described each embodiment, and the modifications and improvements within the range in which the object of the present invention can be achieved are included in the present invention.

For example, in the above-described embodiment, the configuration shown in FIG. 2 has been explained as an example of the carbon dioxide separation system 1, but as the configuration of the carbon dioxide separation system 1, an arbitrary configuration with a combination of a membrane separation by a separation membrane system arranged with an inorganic separation membrane 2 and an acid gas removal process using an absorbent can be applied.

As the separation membrane system in a carbon dioxide separation system 1 in which the method for separating carbon dioxide according to the present invention is performed, a separation membrane system configured by connecting an arbitrary plural number of inorganic separation membranes 2 in series, a separation membrane system configured by including an arbitrary number of inorganic separation membranes 2 regardless of whether in parallel or in series, or the like may be used. For example, the system may be a separation membrane system or the like configured by including (n×m) number of inorganic separation membranes 2 in total, in which plural (n number) of inorganic separation membranes 2 are connected in series and m number of the connected inorganic separation membranes in series are arranged in parallel.

Further, in the present invention, when the carbon dioxide mole fraction in a gas after the separation of carbon dioxide by an acid gas removal process using an absorbent in a carbon dioxide separation system 1 is obtained to be 0.03 or less, carbon dioxide may be separated from a mixed gas in the range of $P_X$ from 2.10 to 6.10 [MPaA] and $P_Y$ from 0.10 to 0.25 [MPaA] by using an inorganic separation membrane 2 having an ideal separation factor $\alpha$ of 50 to 200.

In addition, the specific structures, shapes and the like in performing the present invention may be another structure or the like within the range in which the object of the present invention can be achieved.

The present invention can be advantageously used as a measure in which a membrane separation is performed by using an inorganic separation membrane that is permeated by carbon dioxide preferentially, and then carbon dioxide is separated from a mixed gas such as a natural gas containing the carbon dioxide and methane by an acid gas removal process using an absorbent, and the industrial applicability is extremely high.

What is claimed is:

1. A method for separating carbon dioxide, comprising:
   separating carbon dioxide from a mixed gas containing methane and the carbon dioxide, wherein
   in separating carbon dioxide by a membrane separation using an inorganic separation membrane that is permeated by the carbon dioxide preferentially from the mixed gas, and then by an acid gas removal process using an absorbent,
   a carbon dioxide mole fraction at an outlet on a carbon dioxide non-permeation side $X_{CO2}$ of the membrane separation, corresponding to an ideal separation factor $\alpha$ of the inorganic separation membrane in the membrane separation, is expressed in the range surrounded by data points $a_1$, $a_2$, $a_3$, $a_4$, $a_5$, $a_6$, $a_7$, and $a_8$ in a graph of $\alpha$ versus $X_{CO2}$,
   wherein $\alpha$ is an ideal separation factor of the inorganic separation membrane and is a ratio ($\alpha = K_{CO2}/K_{CH4}$) of the permeance of carbon dioxide ($K_{CO2}$)(mol/(m²·Pa·s) to the permeance of methane ($K_{CH4}$)(mol/(m²·Pa·s), $X_{CO2}$ is a carbon dioxide mole fraction at an outlet on a carbon dioxide non-permeation side of a membrane separation using an inorganic separation membrane, and $X_{CO2}$ is expressed by the following Formula (I) with a carbon dioxide non-permeation side pressure $P_X$ [MPaA] and a carbon dioxide permeation side pressure $P_Y$ [MPaA] in the membrane separation,

[Mathematical Formula 1]

$$X_{CO2} = A \cdot P_R + B \quad (I)$$

wherein $P_R$ indicates $P_Y/P_X$, each of A and B in Formula (I) is a value shown in the following Correspondence Table of A and B, corresponding to each ideal separation factor $\alpha$ of $a_1$, $a_2$, $a_3$, $a_4$, $a_4$, $a_6$, $a_7$, and $a_8$,
wherein a range of the ideal separation factor $\alpha$ of the inorganic separation membrane in the membrane separation is 50 to 200

TABLE 1

(Correspondence Table of A and B)

| | α | A | B |
|---|---|---|---|
| $a_1$ | 50 | 0.7452 | 0.1593 |
| $a_2$ | 50 | 0.7273 | 0.0751 |
| $a_3$ | 80 | 0.7986 | 0.1059 |
| $a_4$ | 80 | 0.7566 | 0.0493 |
| $a_5$ | 120 | 0.8314 | 0.0732 |
| $a_6$ | 120 | 0.7641 | 0.0314 |
| $a_7$ | 200 | 0.8614 | 0.0476 |
| $a_8$ | 200 | 0.7689 | 0.0181. |

2. The method for separating carbon dioxide according to claim 1, wherein
   in obtaining a carbon dioxide mole fraction of 0.03 or less in a gas after separating carbon dioxide by the acid gas removal process using an absorbent,
   in the range of $P_X$ from 2.10 to 6.10 [MPaA], and
   in the range of $P_Y$ from 0.10 to 0.25 [MPaA].

* * * * *